(12) United States Patent
Dupray et al.

(10) Patent No.: US 11,145,212 B2
(45) Date of Patent: Oct. 12, 2021

(54) UNMANNED AERIAL VEHICLE SYSTEMS

(71) Applicant: Warren F. LeBlanc, Coconut Creek, FL (US)

(72) Inventors: Dennis J. Dupray, Golden, CO (US); Frederick W. LeBlanc, Coconut Creek, FL (US)

(*) Notice: Subject to any disclaimer, the term of this patent is extended or adjusted under 35 U.S.C. 154(b) by 0 days.

(21) Appl. No.: 16/813,487

(22) Filed: Mar. 9, 2020

(65) Prior Publication Data
US 2020/0265726 A1 Aug. 20, 2020

Related U.S. Application Data

(63) Continuation of application No. 15/224,497, filed on Jul. 29, 2016, now Pat. No. 10,586,464.
(Continued)

(51) Int. Cl.
G08G 5/00 (2006.01)
G05D 1/10 (2006.01)
(Continued)

(52) U.S. Cl.
CPC ......... *G08G 5/0069* (2013.01); *B64C 39/024* (2013.01); *G05D 1/104* (2013.01); *G08G 5/0008* (2013.01); *G08G 5/0013* (2013.01); *G08G 5/0021* (2013.01); *G08G 5/0043* (2013.01); *H04B 7/18504* (2013.01);
(Continued)

(58) Field of Classification Search
CPC ............ B64C 39/024; B64C 2201/123; B64C 2201/128; B64C 2201/122; B64C 2201/20; B64C 2201/121; B64C 2201/143; G08G 5/0021; G08G 5/0013; G08G 5/0008;
(Continued)

(56) References Cited

U.S. PATENT DOCUMENTS 4,954,837 A 9/1990 Baird et al.
5,960,097 A 9/1999 Pfeiffer et al.
(Continued)

OTHER PUBLICATIONS

"Introduction to ADS-B," available at http://www.trig-avionics.com/knowledge-bank/ads-b/introduction-to-ads-b, 2011, 5 pages.
(Continued)

*Primary Examiner* — Peter D Nolan
*Assistant Examiner* — Demetra R Smith-Stewart
(74) *Attorney, Agent, or Firm* — Au Law Office, P.C.; Yiu F. Au

(57) ABSTRACT

Various systems, methods, for unmanned aerial vehicles (UAV) are disclosed. In one aspect, UAVs operation in an area may be managed and organized by UAV corridors, which can be defined ways for the operation and movement of UAVs. UAV corridors may be supported by infrastructures and/or systems supported UAVs operations. Support infrastructures may include support systems such as resupply stations and landing pads. Support systems may include communication UAVs and/or stations for providing communications and/or other services, such as aerial traffic services, to UAV with limited communication capabilities. Further support systems may include flight management services for guiding UAVs with limited navigation capabilities as well as tracking and/or supporting unknown or malfunctioning UAVs.

17 Claims, 15 Drawing Sheets

Related U.S. Application Data

(60) Provisional application No. 62/198,389, filed on Jul. 29, 2015.

(51) Int. Cl.
*B64C 39/02* (2006.01)
*H04B 7/185* (2006.01)
*H04W 88/04* (2009.01)

(52) U.S. Cl.
CPC .... *H04B 7/18506* (2013.01); *B64C 2201/122* (2013.01); *B64C 2201/128* (2013.01); *B64C 2201/143* (2013.01); *B64C 2201/20* (2013.01); *H04W 88/04* (2013.01)

(58) Field of Classification Search
CPC .. G08G 5/0043; G05D 1/104; H04B 7/18506; H04B 7/18504; H04W 84/04
See application file for complete search history.

(56) References Cited

U.S. PATENT DOCUMENTS

| | | | |
|---|---|---|---|
| 6,236,365 | B1 | 5/2001 | LeBlanc et al. |
| 6,952,181 | B2 | 10/2005 | Karr et al. |
| 7,469,183 | B2 | 12/2008 | Bodin et al. |
| 7,737,878 | B2 | 6/2010 | van Tooren et al. |
| 7,764,231 | B1 | 7/2010 | Karr et al. |
| 7,970,532 | B2 | 6/2011 | Tehan et al. |
| 8,315,794 | B1 | 11/2012 | Strelow et al. |
| 8,543,265 | B2 | 9/2013 | Ekhaguere et al. |
| 8,798,922 | B2 | 8/2014 | Tillotson et al. |
| 8,909,391 | B1 | 12/2014 | Peeters et al. |
| 8,965,679 | B2 | 2/2015 | Euteneuer et al. |
| 8,983,682 | B1 | 3/2015 | Peeters et al. |
| 8,994,591 | B2 | 3/2015 | Dupray et al. |
| 9,022,324 | B1 | 5/2015 | Abhyanker |
| 9,056,676 | B1 | 6/2015 | Wang |
| 9,087,451 | B1 | 7/2015 | Jarrell |
| 9,108,729 | B2 | 8/2015 | Duggan et al. |
| 9,129,520 | B2 | 9/2015 | Limbaugh et al. |
| 9,139,310 | B1 | 9/2015 | Wang |
| 9,158,304 | B2 | 10/2015 | Fleck |
| 9,254,363 | B2 | 2/2016 | Levien et al. |
| 9,262,929 | B1 | 2/2016 | Roy et al. |
| 9,273,981 | B1 | 3/2016 | Downey et al. |
| 9,274,521 | B1 | 3/2016 | Stefani et al. |
| 9,284,062 | B2 | 3/2016 | Wang |
| 9,302,783 | B2 | 4/2016 | Wang |
| 9,305,280 | B1 | 4/2016 | Berg et al. |
| 9,311,760 | B2 | 4/2016 | Downey et al. |
| 9,313,667 | B1 | 4/2016 | Daoura |
| 9,317,036 | B2 | 4/2016 | Wang et al. |
| 9,334,052 | B2 | 5/2016 | Pasko et al. |
| 9,412,278 | B1* | 8/2016 | Gong .................. G08G 5/0091 |
| 9,997,080 | B1* | 6/2018 | Chambers ............ G08G 5/0034 |
| 2003/0050008 | A1* | 3/2003 | Patterson ........... H04B 7/18578 455/12.1 |
| 2009/0248287 | A1* | 10/2009 | Limbaugh ............ G08G 5/0013 701/120 |
| 2009/0260511 | A1 | 10/2009 | Melnychuk et al. |
| 2010/0224732 | A1 | 9/2010 | Olson et al. |
| 2010/0332136 | A1 | 12/2010 | Duggan et al. |
| 2011/0184590 | A1 | 7/2011 | Duggan et al. |
| 2012/0038501 | A1 | 2/2012 | Schulte et al. |
| 2012/0078451 | A1 | 3/2012 | Ohtomo et al. |
| 2012/0215382 | A1 | 8/2012 | Lee et al. |
| 2013/0061276 | A1* | 3/2013 | Urban ................ H04N 21/6118 725/109 |
| 2014/0018979 | A1 | 1/2014 | Goossen et al. |
| 2014/0032034 | A1 | 1/2014 | Raptopoulos et al. |
| 2014/0080535 | A1* | 3/2014 | Gauvreau ............. H04W 16/14 455/513 |
| 2014/0124621 | A1 | 5/2014 | Godzdanker et al. |
| 2014/0129059 | A1 | 5/2014 | Scarlatti et al. |
| 2014/0192193 | A1 | 7/2014 | Zufferey et al. |
| 2014/0219124 | A1* | 8/2014 | Chang .................. H04B 7/0413 370/252 |
| 2014/0249693 | A1 | 9/2014 | Stark et al. |
| 2014/0288730 | A1 | 9/2014 | Fucke et al. |
| 2015/0142211 | A1 | 5/2015 | Shehata et al. |
| 2016/0205560 | A1* | 7/2016 | Hyslop ............. H04B 7/18504 455/454 |
| 2016/0207637 | A1* | 7/2016 | Campillo ............. B64C 39/024 |
| 2016/0364989 | A1* | 12/2016 | Speasl ................. G08G 5/0069 |

OTHER PUBLICATIONS

"Introduction to TCAS II Version 7.1," Federal Aviation Administration, United States, Feb. 28, 2011, 50 pages.

"Unmanned Aircraft Systems: Federal Actions Needed to Ensure Safety and Expand Their Potential Uses within the National Airspace System," United States Government Accountability Office, May 2008, 73 pages.

Corrigan et al., "Quantum Cascade Lasers and the Kruse Model on Free Space Optical Communications," Optic Express, Mar. 16, 2009, vol. 17(6), pp. 4355-4359.

Data Sheet, "PING-2020 ADS-B Transceiver," 2016, 2 pages.

Department of Transportation (DOT), Federal Aviation Administration (FAA) Notice of Proposed Rulemaking (NPRM), Docket No. FAA-2015-0150, Notice No. 15-01, Federal Register 80(35), Feb. 23, 2015, 48 pages.

Galkin et al., "Deployment of UAV-mounted access points according to spatial user locations in two-tier cellular networks," Wireless Days, Mar. 23-25, 2016, 6 pages.

Grackin, Ann, "The Year of the Last Mile," Chainlink Research, Dec. 11, 2014, available at http://www.clresearch.com/research/detail.cfm?guid=3283ClFB-3048-79ED-999E-536DD384B656, 5 pages.

McBeath, Bill, "Home Delivery," ibid, ChainLink Research, 2013, website: http://www.chainlinkresearch.com/homedelivery/index.cfm, 1 page.

Moses et al., "Radar-Based Detection and Identification for Miniature Air Vehicles," 2011 IEEE International Conference on Control Applications (CCA), Sep. 28-30, 2011, pp. 933-940.

Peacock et al., "Towards Detection and Control of Civilian Unmanned Aerial Vehicles," Proceedings of the 14th Australian Information Warfare Conference, Edith Cowan University, Perth, Western Australia, Dec. 2-4, 2013, pp. 9-15.

Shi et al., "Detecting, Tracking and Identifying Airborne Threats with Netted Sensor Fence," Chapter 8 of Sensor Fusion—Foundation and Applications, book edited by Ciza Thomas, Jun. 13, 2011, pp. 139-158.

Strain et al., "A Lightweight, Low-cost ADS-B System for UAS Applications," The MITRE Corporation, Case No. 07-0634, 2007, 9 pages.

Varga, "COMM-OPS: UAV Cellular Payload for First Responder Emergency Teams," Milsat Magazine, Jul. 2009, availale at http://www.milsatmagazine.com/story.php?number=1435005486, 9 pages.

Warren, "Bitmessage: A Peer-to Peer Message Authentication and Delivery System," Nov. 27, 2012, 5 pages.

Zimmerman, "ZRTP: Media Path Key Agreement for Unicast Secure RTP," Internet Engineering Task Force RFC6189, Apr. 11, 2011, 115 Pages.

* cited by examiner

RHO RHO Position Determination

Angle to Station Position Resolution THETA THETA

ADS-B General Layout

UNMANNED AERIAL VEHICLE SYSTEMS

CROSS REFERENCE TO RELATED APPLICATION

This application is a continuation of U.S. patent application Ser. No. 15/224,497 filed Jul. 29, 2016, which claims the benefit of U.S. Provisional Application No. 62/198,389 filed Jul. 29, 2015, each of which is herein incorporated by reference.

RELATED FIELD OF THE INVENTION

The present application is directed to methods and systems for unmanned aerial vehicles (UAV), including Unmanned Aircraft Systems (UAS), and small UAS (sUAS).

BACKGROUND

It has been estimated that as many as 30,000 unmanned aerial vehicles will be flying in America's skies by 2020. UAVs are being manufactured in over 70 countries around the world. 23 countries have developed or are developing armed UAVs and/or UASSs.

The Federal Aviation Administration (FAA) has granted 24 licenses to commercial UAV operators as of Feb. 3, 2015. Over 300 others have applied so far for such licenses. Individual operators may freely fly UAVs for personal use and enjoyment (non-commercial use). The following proposed rules have been developed for small UAV by the Federal Aviation Administration (FAA) on Feb. 23, 2015 for public commenting:

Operational Limitations:
- Unmanned aircraft must weigh less than 55 lbs. (25 kg).
- Visual line-of-sight (VLOS) only; the unmanned aircraft must remain within VLOS of the operator or visual observer.
- At all times the small unmanned aircraft must remain close enough to the operator for the operator to be capable of seeing the aircraft with vision unaided by any device other than corrective lenses.
- Small unmanned aircraft may not operate over any persons not directly involved in the operation.
- Daylight-only operations (official sunrise to official sunset, local time).
- Must yield right-of-way to other aircraft, manned or unmanned.
- May use visual observer (VO) but not required.
- First-person view camera cannot satisfy "see-and-avoid" requirement but can be used as long as requirement is satisfied in other ways.
- Maximum airspeed of 100 mph (87 knots).
- Maximum altitude of 500 feet above ground level.
- Minimum weather visibility of 3 miles from control station.
- No operations are allowed in Class A (18,000 feet & above) airspace.
- Operations in Class B, C, D and E airspace are allowed with the required Air Traffic Control (ATC) permission.
- Operations in Class G airspace are allowed without ATC permission
- No person may act as an operator or VO for more than one unmanned aircraft operation at one time.
- No careless or reckless operations.
- Requires preflight inspection by the operator.
- A person may not operate a small unmanned aircraft if he or she knows or has reason to know of any physical or mental condition that would interfere with the safe operation of a small UAV.
- Proposes a micro UAV option that would allow operations in Class G airspace, over people not involved in the operation, provided the operator certifies he or she has the requisite aeronautical knowledge to perform the operation.

Operator Certification and Responsibilities:
- Pass an initial aeronautical knowledge test at an FAA-approved knowledge testing center.
- Be vetted by the Transportation Security Administration.
- Obtain an unmanned aircraft operator certificate with a small UAV rating (like existing pilot airman certificates, never expires).
- Pass a recurrent aeronautical knowledge test every 24 months.
- Be at least 17 years old.
- Make available to the FAA, upon request, the small UAV for inspection or testing, and any associated documents/records required to be kept under the proposed rule.
- Report an accident to the FAA within 10 days of any operation that results in injury or property damage.
- Conduct a preflight inspection, to include specific aircraft and control station systems checks, to ensure the small UAV is safe for operation.

In Jun. 21, 2016, the FAA released a further "Summary of Small Unmanned Aircraft Rules (Part 107). An excerpt of these rules are as follows:
- Unmanned aircraft must weigh less than 55 lbs. (25 kg).
- Visual line-of-sight (VLOS) only; the unmanned aircraft must remain within VLOS of the remote pilot in command and the person manipulating the flight controls of the small UAS. Alternatively, the unmanned aircraft must remain within VLOS of the visual observer.
- At all times the small unmanned aircraft must remain close enough to the remote pilot in command and the person manipulating the flight controls of the small UAS for those people to be capable of seeing the aircraft with vision unaided by any device other than corrective lenses.
- Small unmanned aircraft may not operate over any persons not directly participating in the operation, not under a covered structure, and not inside a covered stationary vehicle.
- Daylight-only operations, or civil twilight (30 minutes before official sunrise to 30 minutes after official sunset, local time) with appropriate anti-collision lighting.
- Must yield right of way to other aircraft.
- May use visual observer (VO) but not required.
- First-person view camera cannot satisfy "see-and-avoid" requirement but can be used as long as requirement is satisfied in other ways.
- Maximum groundspeed of 100 mph (87 knots).
- Maximum altitude of 400 feet above ground level (AGL) or, if higher than 400 feet AGL, remain within 400 feet of a structure.
- Minimum weather visibility of 3 miles from control station.
- Operations in Class B, C, D and E airspace are allowed with the required ATC permission.
- Operations in Class G airspace are allowed without ATC permission.

No person may act as a remote pilot in command or VO for more than one unmanned aircraft operation at one time.

No operations from a moving aircraft.

No operations from a moving vehicle unless the operation is over a sparsely populated area.

No careless or reckless operations.

No carriage of hazardous materials.

The FAA UAV rules will be effective Aug. 29, 2016.

Present UAV technologies have certain deficiencies, as follows.

UAVs technology offers significant benefits to society in that UAVs can be flown economically, and in areas not suitable for larger aircraft. However, UAVs should not be flown into some areas, such as airports, where a collision can result in loss of human life or valuable properties. A UAV drawn into an aircraft engine can cause a total disaster to the aircraft. Moreover, since UAVs are capable of deploying explosives, chemical agents, and operating cameras to record information that may be regarded as private, UAVs can invade an endless variety of areas that could be regarded as illegal, or a breach of privacy, or create vulnerability to destruction of property. UAVs can be used to smuggle contraband and weapons across national borders, into prisons, and capture proprietary video of copyright sport events.

Private industry is addressing at least some, but not all, of these concerns. One such company, No Fly Zone, offers a database containing GPS coordinates of areas that UAV operators can help fill with information. The database is then sent to UAV manufacturers, who implement the database and provide restrictions on where the UAV can fly. It may be possible that UAV manufacturers can add or remove features without UAV owner knowledge. Presumably UAV owners would not be allowed to modify or bypass the "No fly Zone" capability, which may be considered a type of UAV digital rights management.

One UAV manufacturer, DJI of Hong Kong, has agreed to comply with the FAA's Notice to Airmen (NOTAM) 0/8326, which restricts unmanned flight around the Washington, D.C. area, 10,000 other airports, and prevents flight across national borders. Although the U.S. President has requested better federal regulations, it is likely that technology may find a way to defeat regulations.

In the US all airspace outside of a building is administered by the FAA. Additionally operations within a building, such as a stadium, are to a lesser extent controlled by the FAA when operations potentially affecting public safety are involved, such as flying over populated areas. FAA requirements generally are quite similar to International Civil Aviation Organization (ICAO) international standards.

Flight Rules and Weather Conditions

Weather is a significant factor in aircraft operations. Weather conditions determine the flight rules under which aircraft can operate, and can also affect aircraft separation (physical distance between aircraft).

Aircraft are separated from each other to ensure safety of flight. The required separation varies depending on aircraft type, weather, and flight rules. Aircraft separation requirements can increase during poor weather conditions, since it is more difficult for a pilot to see and/or detect other aircraft. Increased aircraft separation can reduce airport capacity, since fewer aircraft can use an airport during a given time interval. Conversely, reduced aircraft separation can increase airport capacity, since more aircraft can use an airport during a given time interval.

Aircraft operate under two distinct categories of operational flight rules: visual flight rules (VFR) and instrument flight rules (IFR). These flight rules are linked to the two categories of weather conditions: visual meteorological conditions (VMC) and instrument meteorological conditions (IMC). VMC exist during generally fair to good weather, and IMC exist during times of rain, low clouds, or reduced visibility. IMC generally exist whenever visibility falls below 3 statute miles (SM) or the ceiling drops below 1,000 feet above ground level (AGL). The ceiling is the distance from the ground to the bottom of a cloud layer that covers more than 50% of the sky. During VMC, aircraft may operate under VFR, and the pilot is primarily responsible for seeing other aircraft and maintaining safe separation.

Types of Airspace

In the early days of aviation, aircraft only flew during VMC, which allows a pilot to maintain orientation (e.g., up/down, turning, etc.) by reference to the horizon and visual ground references. Flight through clouds (e.g., an IMC) was not possible, as the aircraft instruments of the time did not provide orientation information, and thus a pilot could easily lose orientation and control of the aircraft. In a visual-only airspace environment, it was possible to see other aircraft and avoid a collision—and thus maintain aircraft separation. Flight through clouds became possible with the use of gyroscopic flight instruments. Because it is not possible to see other aircraft in the clouds, ATC was established to coordinate aircraft positions and maintain separation between aircrafts. Today, maintaining separation between VFR and IFR air traffic is still a fundamental mission of ATC. The evolution of the National Airspace System (NAS), and existing ATC procedures, can be directly tied to this requirement to maintain separation between aircrafts.

Airspace Classifications

Aircraft operating under VFR typically navigate by orientation to geographic and other visual references. During IMC, aircraft operate under IFR; the ATC exercises positive control (e.g., separation of all air traffic within designated airspace) over all aircrafts in controlled airspace, and the ATC is primarily responsible for aircraft separation. Aircraft operating under IFR must meet minimum equipment requirements. Pilots must also be specially certified and meet proficiency requirements. IFR aircraft fly assigned routes and altitudes, and use a combination of radio navigation aids (NAVAIDs) and vectors from ATC to navigate.

Aircraft may elect to operate IFR in VMC; however, the pilot, and not ATC, is primarily responsible for seeing and avoiding other aircraft. The majority of commercial air traffic (including all air carrier traffic), regardless of weather, operate under IFR as required by Federal Aviation Regulations. In an effort to increase airport capacity, ATC can allow IFR aircraft to maintain visual separation when weather permits.

The FAA has designated six classes of airspace, in accordance with International Civil Aviation Organization (ICAO) airspace classifications. Airspace is broadly classified as either controlled or uncontrolled. Airspace designated as Class A, B, C, D, or E is controlled airspace. Class F airspace is not used in the United States. Class G airspace is uncontrolled airspace. Controlled airspace means that IFR services are available to aircraft that elect to file IFR flight plans; it does not mean that all flights within the airspace are controlled by ATC. IFR services include ground-to-air radio communications, navigation aids, and air traffic (i.e., separation) services. Aircraft can operate under IFR in uncontrolled airspace; however, the aircraft cannot file an IFR flight plan for operation in uncontrolled airspace, and IFR services are not necessarily available. Controlled airspace is intended to ensure separation of IFR aircrafts from aircrafts using both IFR and VFR.

The FAA airspace classifications are as follows:

| | |
|---|---|
| Class A | Class A airspace encompasses the en route, high-altitude environment used by aircraft to transit from one area of the country to another. All aircraft in Class A must operate under IFR. Class A airspace exists within the United States from 18,000 feet mean sea level (MSL) to and including 60,000 feet MSL. |
| Class B | All aircraft, both IFR and VFR, in Class B airspace are subject to positive control from ATC. Class B airspace exists at 29 high-density airports in the United States for of managing air traffic activity around these airports. It is designed to regulate the flow of air traffic above, around, and below the arrival and departure routes used by airline carriers' aircrafts at major airports. The ATC can manage aircraft in and around the immediate vicinity of an airport. Aircrafts operating within this area are required to maintain radio communication with the ATC. No separation services are provided to VFR aircraft. |
| Class C | Class C airspace is defined around airports with airport traffic control towers and radar approach control. It normally has two concentric circular areas with a diameter of 10 and 20 nautical miles. Variations in the shape are often made to accommodate other airports or terrain. The top of Class C airspace is normally set at 4,000 feet AGL. The FAA has established Class C airspace at approximately 120 airports around the country. Aircraft operating in Class C airspace must have specific radio and navigation equipment, including an altitude encoding transponder, and must obtain ATC clearance. VFR aircraft are only separated from IFR aircraft in Class C airspace (i.e., ATC does not separate VFR aircraft from other VFR aircraft, as this is the respective pilot's responsibility). |
| Class D | Class D airspace is normally a circular area with a radius of five miles around the primary airport. This controlled airspace extends upward from the surface to about 2,500 feet AGL. When instrument approaches are used at an airport, the airspace is normally designed to encompass the aircraft flight control procedures. |
| Class E | Class E airspace is a general category of controlled airspace that is intended to provide air traffic service and adequate separation for IFR aircraft from other aircraft. Although Class E is controlled airspace, VFR aircraft are not required to maintain contact with ATC, but are only permitted to operate in VMC. In the eastern United States, Class E airspace generally exists from 700/1200 feet AGL to the bottom of Class A airspace at 18,000 feet MSL. It generally fills in the gaps between Class B, C, and D airspace at altitudes below 18,000 feet MSL. Federal Airways, including Victor Airways, below 18,000 feet MSL are classified as Class E airspace. |
| Class F | Not Applicable within United States |
| Class G | Airspace not designated as Class A, B, C, D, or E is considered uncontrolled, Class G, airspace. ATC does not have the authority or responsibility to manage of air traffic within this airspace. In the Eastern U.S., Class G airspace lies between the surface and 700/1200 feet AGL. |

There are also many types and areas of special use airspace administered by the FAA:

| | |
|---|---|
| Prohibited | Areas where, for reasons of national security, the flight of an aircraft is not permitted are designated as prohibited areas. Prohibited areas are depicted on aeronautical charts. For example, a prohibited area (P-56) exists over the White House and U.S. Capitol. |
| Restricted | In certain areas, the flight of aircraft, while not wholly prohibited is subject to restrictions. These designated often have invisible hazards to aircraft, such as artillery firing, aerial gunnery, or guided missiles. Aircraft operations in these areas are prohibited during times when it is "active." |
| Warning | A warning area contains many of the same hazards as a restricted area, but because it occurs outside of U.S. airspace, aircraft operations cannot be legally restricted within the area. Warning areas are typically established over international waters along the coastline of the United States. |
| Alert | Alert areas are shown on aeronautical charts to provide information of unusual types of aerial activities such as parachute jumping areas or high concentrations of student pilot training. |
| Military Operations Area | Military operations areas (MOA) are blocks of airspace in which military training and other military maneuvers are conducted. MOA's have specified floors and ceilings for containing military activities. VFR aircraft are not restricted from flying through MOAs while they are in operation, but are encouraged to remain outside of the area. |

Automated Dependent Surveillance-Broadcast (ADS-B) is a next generation surveillance technology incorporating both air and ground aspects and can provide the ATC with a more accurate information of the aircraft's three-dimensional position in the en route, terminal, approach, and surface environments. It has been shown to be an efficient and effective mechanism to replace the classic radar environment currently in use.

High level features of ADS-B include:
Automatic—properly-equipped aircraft automatically report their position, without need for a radar interrogation
Dependent—ADS-B depends on aircraft having an approved WAAS GPS on board and an ADS-B Out transmitter
Surveillance—it is a surveillance technology that allows ATC to watch airplanes move around
Broadcast—aircraft broadcast their position information to airplanes and ATC ADS-B doesn't need radar to work properly, but it will uses a network of ground stations to receive aircraft reports and send them back to ATC. These stations also transmit weather and traffic information back up to properly-equipped aircraft. This network currently consists of over 400 stations.

ADS-B is automatic because no external interrogation is required. It is dependent because it relies on onboard position sources and broadcast transmission systems to provide surveillance information to ATC and other users, such as ATC and nearby aircraft and pilots.

ADS-B is made up of two main parts: ADS-B Out and ADS-B In. ADS-B Out is of interest to controllers, while ADS-B In is mostly of interest to pilots. ADS-B Out is a surveillance technology for tracking aircraft—it's what ATC needs to manage traffic. It reports an aircraft's position, velocity, and altitude once per second. This transmission is received by ATC and nearby aircraft and this data makes up the equivalent of a radar display. Most aircraft will be required to have ADS-B Out by the year 2020. ADS-B In allows an aircraft to receive transmissions from ADS-B ground stations and other aircraft. Final ADS-B Out rules were finalized in 2011. All aircraft will be required to have ADS-B Out equipment to fly in Class A, B and C airspace, plus Class E airspace above 10,000 feet but not below 2,500 feet, by 2020.

The aircrafts forms the airborne portion of the ADS-B system as the aircrafts provide ADS-B information in the form of a broadcast of its identification, position, altitude, velocity, and other information. The ground portion of the ADS-B system consists of ADS-B ground stations, which receive such broadcasts from the aircrafts and direct them to ATC automation systems for presentation on a controller's display. Aircrafts that are equipped with ADS-B IN capability can also receive these broadcasts and display the information to improve the pilot's situation awareness of other traffic.

Security Issues

Since UAVs typically operate via digital wireless signals, the possibility exists for a malicious individual, bot, UAV or similar device, to wirelessly install UAV malware, or exploit software, and backdoor software that exploits (and overrides, or hacks into) the manufacturers intended operating software. UAVs can easily be identified via their radio frequency signals emitting from their transmitter. One such company, Domestic Drone Countermeasures, LLC, provides a plurality of sensor equipment that, when positioned in an area of interest, create a custom wireless mesh network among its sensors, to detect a UAVs' location using triangulation.

UAVs are capable of operating without RF communications (also "links" herein), or lost or jammed links. Typically, a flight plan is downloaded into the UAV's computing system that provides all required navigation data. These UAVs use the navigation data to operate an autopilot on the UAV, thus negating the requirement for constant radio communication between a UAV and its pilot or other navigation controller. In order to detect these types of UAV flights, one company, Droneshield, has a patent-pending acoustic detection technology to detect UAVs without RF links, such as those that operate on autopilot. Typical maximum range is on the order of 200 feet with low-wind conditions. The technology includes a database of common UAV acoustic signatures, to reduce the likelihood of generating false alarms, such as those from lawn mowers and leaf blowers.

Defense contractor, Israel Aerospace Industries, is designing a radar truck that specifically looks for UAV signatures. The U.S. Air Force Joint Surveillance Target Attack Radar System (JSTARS) is being mounted on a test jet for counter-UAV exercises.

A. Moses, M. J. Rutherford, and K. P. Valavanis, individuals at the University of Denver, Colo., have authored a 2011 paper that proposes means to detect miniature Air vehicles (<25 kg rotorcraft): "Radar-Based Detection and Identification for Miniature Air Vehicles," herein incorporated by reference. This paper proposes modifying a light weight X band (10.5 GHz) radar system to scan for Doppler signatures of small air vehicles (UAVs or drones).

W. Shi, et al, with the MITRE Corp., wrote a paper, "Detecting, Tracking and Identifying Airborne Threats with Netted Sensor Fence," herein incorporated by reference, using a low-power pulse-Doppler radar "fence," with a range of about 5 km. Other methods explored included IR detection with optical sensors, and acoustic sensors.

A paper in 2011 by M. Peacock, et al, with the ECU Security Research Institute (Australia), provided early details of wireless signal identification and control exploitation: "Towards Detection and Control of Civilian Unmanned Aerial Vehicles," herein incorporate by reference.

In November, 2014, the DoD issued an RFI called project Thunderstorm, with the intent to invite technologists to respond to the need to detecting and countering Commercial Off The Shelf (COTS) based UAV (Unmanned Aerial systems) with potential WMD payloads (Spiral 15-3b). Demonstrations are expected to be performed in Camp Shelby, Miss. in 2Q2015. Pennsylvania State University's Applied Research Laboratory (ARL/PSU) will act as the demonstration director for spiral 15 demonstrations.

The DoD is interested in remote detection ranges up to 1,000 feet. Beyond detection of target UAVs, the need exists to detect and identify chemical and/or biological agents and weapons. Chemical agents include biological warfare agents (e.g., Sarin, and vegetative cells, spores, and standard G, H and V series chemical agents), and radiological and nuclear materials The detectors are expected to be mounted on search UAVs, capable of 30 minute flights, an autonomous operation (takeoff, surveillance and landing), as well as utilizing and/or detecting wireless systems such as Wi-Fi and cellular radio system infrastructure. Location accuracy should be within +/−10 meters position, and 1 meter accuracy in altitude.

In the case of RF wireless controlled UAVs, malicious UAV software installations can occur quickly and without the knowledge or permission of UAV owner/manufacturer. In an area of interest, wireless signals are monitored to find UAV-specific characteristics (typically MAC addresses). Using standard wireless protocols and malware exploit software, wireless signal control is re-directed to a wireless, rogue controller system that assumes control of the targeted UAV. Once wireless signal control is achieved, other backdoor capabilities include access to various UAV, or quadcopter sensors, video feeds and control subsystems.

A specific UAV malware example is "SkyJack," provided on the Internet by Samy Kamkar (India). Skyjack is primarily a Perl application running on a Linux machine that also includes "aircrack-ng". This program, in communication with a wireless adapter such as the Alfa AWUS036H wireless card, listens to Wi-Fi signals and identifies wireless networks and clients. UAV manufacturers identities can be determined via their MAC addresses and the IEEE Registration Authority OUI. Once the UAV wireless network has been identified, such as Parrott, the clients or UAVs, can be compromised. The program "aireplay-ng," in addition to the wireless card, supports raw packet injection. This capability is used to deauthenticate the true owner of the UAV being targeted. Another program, "node-ar-drone," along with the wireless card, reauthenticates the targeted UAV with the wireless card associated with the malicious controller system, thus reconnecting it to the now free Parrot AR UAV as its new owner. A Java script called "node.js," with the wireless card, is then invoked that assumes control of the compromised UAV.

In addition to control, video and sensor data can be received by the malicious system. After the UAV is hijacked, backdoor payload program or botnet can be installed into the UAV's software operating system, such as Rahul Sasi's "Maldrone." Maldrone provides access to sensors via serial ports, such as: (a) inertial measurements unit (IMU), (b) 6 Degree Of Freedom gyroscope, (c) 3 DOF magnetometer, (d) ultrasound sensor (used for low altitude measurements), (e) a pressure sensor (altitude measurement at all altitudes, and (f) a GPS sensor.

An outline of the steps that Maldrone executes includes:
Step 1: Kills the drone program, e.g., program.elf
Step 2: Setup a proxy serial port for navboard and others.
Step 3: Redirect actual serial port communication to fake ports
Step 4: Patch program.elf and make it open our proxy serial ports.
Step 5: Maldrone communicates to serial ports directly Now all serial communication to navigation control board goes via Maldrone. Maldrone, also termed a botnet, can intercept and modify UAV data on the fly. The botnet uses the wireless UAV connection to connect to a botserver, operated by a botmaster. One wireless adapter useful in this regard is the Edimax EW-7811Un wireless USB adapter, which allows Skyjack to launch its own network of botserver(s).

A botmaster is a person who operates the command and control of botnets for remote execution. Botnets are typically installed on compromised machines via various forms of remote code installations. Detecting botnets and their servers are often difficult, and identities are hidden via proxies. TOR shells disguise their IP address, thus precluding detection by authorized investigators and law enforcement.

The botmaster can next create a man-in-the-middle attack, by re-establishing a wireless signal authorization request sent to the original UAV owner's wireless controller. Once wireless authentication is achieved, the UAV's botnet, in conjunction with the botserver, can re-direct signals and controls messages between the UAV and the original owner's wireless control system. This procedure provides the allusion that no UAV hacking has occurred, and that no compromises are in effect.

Other types of UAV malware, such as Dongcheol Hond's HSDrone, made at SEWORKS, can spread itself automatically to an entire army of UAVs in a wireless networked area.

UAV, often being constructed using stealth materials such as graphite composites, generally evade traditional FAA area controller, X-band radar. A DJI Phantom quad-copter UAV flew successfully and without notice onto the white house property, in January of 2015. Radar systems are designed to only detect larger objects, such as missiles and airplanes, that operate at higher altitudes. In commercial UAV management, Brian Field-Elliot's PixiePath startup provides services and tools, or adapters for DJI and PIXHawk-based UAVs to send telemetry to the cloud, then waits for positioning commands, to manage whole fleets of UAVs. Dan Patt, DARPA, is interested in promoting large aircraft that could air-drop smaller UAVs.

Last year, 3D Robotics announced its Iris quadcopter UAV. Like other similar products, it can either be flown manually using radio remote control, or it can use its onboard GPS to autonomously fly between a series of preprogrammed waypoints. The company announced its successor, the Iris+, that includes a Follow Me function, which allows it to automatically fly along above a moving ground-based GPS-enabled Android device. This means that when equipped with, for example, a GoPro actioncam, the UAV can get tracking footage of a person moving around, such as cycling, skiing or surfing.

SUMMARY

The present application is directed to methods and systems of using unmanned aerial vehicles (UAV).

In an embodiment, an unmanned aerial vehicle system for providing communication service to a plurality of unmanned aerial vehicles (UAVs) operating within a predetermined operational area of the unmanned aerial vehicle system includes a communication unmanned aerial vehicle (UAV), where the communication UAV includes a communication component for communicating with the plurality of UAVs and a second communication component for communicating with a communication point, where the communication point including one of (a) a terrestrial communication station, (b) a communication satellite, and (c) a second communication UAV, when the communication UAV is active within the predetermined operational area, wherein the communication UAV provides the plurality of UAVs communication with the communication point.

In an embodiment, an unmanned aerial vehicle system for providing communication service to a plurality of unmanned aerial vehicles (UAVs) operating within a predetermined operational area of the unmanned aerial vehicle system includes, where a plurality of communication unmanned aerial vehicles (UAVs), where each of the communication UAVs includes a first communication component for communicating with the plurality of UAVs and a second communication component for communicating with a communication point, the communication point including one of (a) a terrestrial communication station, (b) a communication satellite, and (c) a second communication UAV, when the each communication UAV is active within the operational area, wherein the plurality of communication UAVs are arranged spatially for providing a communication coverage through the first communication component within the predetermined operational area for the plurality of UAVs, and wherein the communication UAV provides the plurality of UAVs communication with the communication point through the second communication component. In an aspect, the second communication component includes an orientable directional antenna for accessing a directed communication signal. In an aspect, one of the communication UAVs further includes a third communication component, the third communication component including a second orientable directional antenna for accessing a second directed communication signal different from the directed communication signal, where the third communication component for communicating with at least one other communication point, and wherein the one communication UAV includes a flight control component for orientating the one communication UAV to a position for according sufficient signal strengths to each of the directed communication signal and the second directed communication signal. In an aspect, the plurality of communication UAVs are arranged in a daisy-chain configuration.

In an embodiment, an unmanned aerial vehicle system for providing communication service to a plurality of unmanned aerial vehicles (UAVs) operating within a predetermined operational area of the unmanned aerial vehicle system includes a communication unmanned aerial vehicle (UAV), where the communication UAV including (A) through (C) following: (A) a first communication component for communicating with the plurality of UAVs; (B) a second communication component for communicating with a communication point, the communication point being one of (a) a terrestrial communication station, (b) a communication satellite, and (c) another of the communication UAVs; and (C) a third communication component for communicating with one other communication point, when the communication UAV is active within the predetermined operational area of the unmanned aerial vehicle system, where a processor for performing a channel bonding operation with communication with the communication point through the second communication component and communication with the one other communication point through the third communication component, wherein the communication UAV provides the plurality of UAVs communication with the communication point and the other communication point. In an aspect, communication with the plurality of UAVs through the first communication component uses an unallocated spectrum. In an aspect, the communication through the second communication component and the communication through the third communication component each uses a different one of an allocated spectrum. In an aspect, the communication through the second communication component and the communication through the third communication component each uses a same one of an allocated spectrum.

In an embodiment, an unmanned aerial vehicle system for providing communication service to a plurality of unmanned aerial vehicles (UAVs) operating within a predetermined operational area of the unmanned aerial vehicle system includes a communication unmanned aerial vehicle (UAV), where the communication UAV including a communication component for communicating with the plurality of UAVs and a second communication component for communicating with a communication point, the communication point being one of (a) a terrestrial communication station, (b) a communication satellite, and (c) a second communication UAV, when the communication UAV is active within the predetermined operational area, wherein the communication point includes a cellular base station, and wherein cellular communication with the plurality of UAVs through the communication component is routed through communication with the cellular base station through the second communication component.

In an embodiment, an unmanned aerial vehicle system for providing an aerial traffic service to a plurality of unmanned aerial vehicles (UAVs) operating within a predetermined operational area of the unmanned aerial vehicle system includes a communication station, where the communication station including a communication component for communicating with the plurality of UAVs and a second communication component for communicating with a system providing the aerial traffic service, when the communication station is active within the operational area, wherein information related to communications for the aerial traffic service through the second communication component is provided by the communication station to the plurality of UAVs through the communication component. In an aspect, the communication station is a communication unmanned aerial vehicle (UAV). In an aspect, the aerial traffic service includes one of an air traffic control (ATC) system, aircraft communications addressing and reporting system (ACARS), traffic collision avoidance system (TCAS), and automatic dependent surveillance—broadcast (ADS-B) system. In an aspect, the communication station further comprises a processor for determining an applicability of a communication from the system providing the aerial traffic service to at least one of the plurality of the UAVs, and wherein, responsive to a determination of the applicability, information related to the communication is sent to an operator of the at least one UAV. In an aspect, the communication station further includes a processor for determining an applicability of at least one of the plurality of UAVs to the system providing the aerial traffic service for a direct communication between an operator of the at least one UAV and the system providing the aerial traffic service, and wherein information for establishing the direct communication is transmitted to the system providing the aerial traffic service. In an aspect, the information includes information for establishing a voice communication over a packet network. In an aspect, the communication station further comprises a processor for aggregating communications related to the aerial traffic service from the plurality of UAVs and wherein the aggregated communications is transmitted through the second communication component.

In an embodiment, an unmanned aerial vehicle system for providing a location service for a plurality of unmanned aerial vehicles (UAVs) operating within a predetermined operational area of the unmanned aerial vehicle system includes a communication station, where the communication station including a communication component for communicating with the plurality of UAVs and a second communication component for communicating with a communication point being a terrestrial communication station, when the communication UAV is active within the predetermined operational area, wherein the communication station includes a processor for determining a location estimate of at least one of the plurality of UAVs using signal characteristics of communication with the at least one UAV and the communication station. In an aspect, one or more additional location estimates of the at least one UAV are accessible to the communication station, the one or more location estimates based on one or more of (a) a location estimate from a geolocation component of the at least one UAV, (b) a location estimate provided by a aerial traffic service, and (c) a location estimate based on tracking data of the at least one UAV from the UAV system, wherein the determining by the processor includes weighting the location estimate and the one or more additional location estimates based on a reliability of each of the location estimate and the one or more additional location estimates.

In an embodiment, an unmanned aerial vehicle system for tracking a plurality of unmanned aerial vehicles (UAVs) operating within a predetermined operational area of the unmanned aerial vehicle system includes a plurality of communication stations, where each of the communication stations including a first communication component for communicating with at least one of the plurality of UAVs, when the communication station are active within the operational area, wherein the plurality of communication UAVs are arranged spatially for providing a communication coverage through the first communication component within the predetermined operational area for the plurality of UAVs; and a station including a processor for estimating a path of one of the plurality of UAVs operating in the operational area using one or more previous location estimates of the one UAV, where the location estimates based on one or more of (a) signal characteristics of communication with the at least one UAV and the communication station, (b) a location estimate from a geolocation component of the at least one UAV, (c) a location estimate provided by a aerial traffic service, and (d) a location estimate based on tracking data of the plurality of UAVs from the UAV system. In an aspect, the one UAV is not communicating with the plurality of communication stations. In an aspect, the one UAV has exited the predetermined operational area. In an aspect, the estimating the path by the processor includes comparing a previous path of the one UAV with a plurality of flight patterns of UAVs.

In an embodiment, an unmanned aerial vehicle system for controlling a predetermined operational area of the unmanned aerial vehicle system for a plurality of unmanned aerial vehicles (UAVs) includes a plurality of communication stations, where each of the communication stations including a first communication component for communicating with a plurality of UAVs, when the communication station are active within the predetermined operational area, wherein the plurality of communication stations are arranged spatially for providing a communication coverage through the first communication component within the predetermined operational area for the plurality of UAVs operating in the predetermined operational area, wherein the operating area includes an area of managed operation for the plurality of UAVs by the unmanned aerial vehicle system through communications between the plurality of communication stations and the plurality of UAVs. In an aspect, one or more of location estimates and trajectory estimates are tracked for the plurality of UAVs based on one or more of (a) signal characteristics of communications of the plurality of the UAVs and the plurality of the communication stations, (b) location estimates from a geolocation component of the plurality of the UAVs, (c) location estimates provided by one or more aerial traffic services, and (d) location estimates based on tracking data of the plurality of the UAVs from the unmanned aerial vehicle system. In an aspect, a database is accessible by the unmanned aerial vehicle system for setting a representation of the operational area, the representation being consistent with the database, the database including one or more conditions for an acceptability of UAV operation in one or more geographical areas, and wherein the unmanned aerial vehicle system, using a processor, compares the one or more location estimates and trajectory estimates with the representation for determining an acceptability of operation for one or more of the plurality of the UAVs. In an aspect, communication is sent to the one or more UAVs through the plurality of the communication stations based on the acceptability. In an aspect, a database is accessible by the UAV system for setting a representation of the operational area, where the representation being consistent with the database, the database including conditions based on one or more rules for acceptability of UAV operation in one or more geographical areas. In an aspect, the UAV system, using a processor, determines a travel path for one of the plurality of the UAVs based on the representation and a predetermined path of the one UAV, and wherein communication based on the travel path is transmitted to the one UAV through the plurality of the communication stations. In an aspect, the UAV system, using a processor, determines a flow of travel within the operational area for the plurality of the UAVs based on one or more conditions of the representation, and wherein communication based on the flow is sent to the one UAV through the plurality of the communication stations. In an aspect, the conditions include rules for airspaces related to the operational area. In an aspect, the conditions include temporary notices for airspaces related to the operational area. In an aspect, the conditions includes information from an aerial traffic service. In an aspect, the communication includes communication for limiting at least one of the UAVs from entering the operational area. In an aspect, communication based on the one or more of the location estimates and the trajectory estimates are transmitted to an aerial traffic service. In an aspect, the communication includes an aggregation of the one or more of the one or more of the location estimates and the trajectory estimates for at least one of the UAVs. In an aspect, the unmanned aerial vehicle system receives information related to an acceptability of operation of the UAVs through communications from the UAVs through the communication stations. In an aspect, the information includes information of an entity related to at least one of the UAVs, and wherein UAV system tracks the operation of the UAVs in the operational area.

In an embodiment, an unmanned aerial vehicle (UAV) includes an optical system for detecting an aerial target within a vicinity of the UAV, when the UAV is in operation; a processor for determining, based on a detected flight characteristic of the aerial target by the optical system that the aerial target maintains a constant azimuth and elevation relative to the UAV; and a flight control system for maneuvering the UAV to avoid a collision with the aerial target.

In an embodiment, an unmanned aerial vehicle system for providing a surveillance service of an airspace to a plurality of unmanned aerial vehicles (UAVs) operating within a predetermined operational area of the unmanned aerial vehicle system includes a communication UAV, where the communication UAV including a first communication component for communicating with the plurality of UAVs, a second communication component for transceiving first communication related to the surveillance service through a first channel, and a second communication component for transceiving second communication related to the surveillance service through a second channel, when the communication UAV is active within the predetermined operational area, and wherein information related to the first communication and the second communication are provided by the communication UAV to the plurality of UAVs through the communication component in sufficiently real time.

The phrases "at least one," "one or more," and "and/or" refer to open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module," refers to any known or later developed hardware, software, firmware, artificial intelligence, fuzzy logic, or combination of hardware and software that is capable of performing the functionality associated with that element.

The terms "determine," "calculate," and "compute," and variations thereof are used interchangeably and include any type of methodology, process, mathematical operation or technique.

It shall be understood that the term "means" shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Embodiments herein presented are not exhaustive, and further embodiments may be now known or later derived by one skilled in the art.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-large-scale integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions that may, for instance, be organized as an object, procedure, or function. Components of a module need not necessarily be physically located together but may include disparate instructions stored in different locations which, when joined logically together, include the module and achieve the stated function for the module. The different locations may be performed on a network, device, server, and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Flex, Flash, Java, .Net and the like. Moreover, the various functionality in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may also be used in embodiments of the invention. Additionally, many of the functional units and/or modules, e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines, Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS, OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos, Internet access, online books, etc.), SMS, MMS, email, mobile, land phone, tablet, smartphone, television, vibrotactile glove, voice carry over, video phone, pager, relay service, teletypewriter, and/or GPS and combinations of the same.

DETAILED DESCRIPTION

Figure 1:
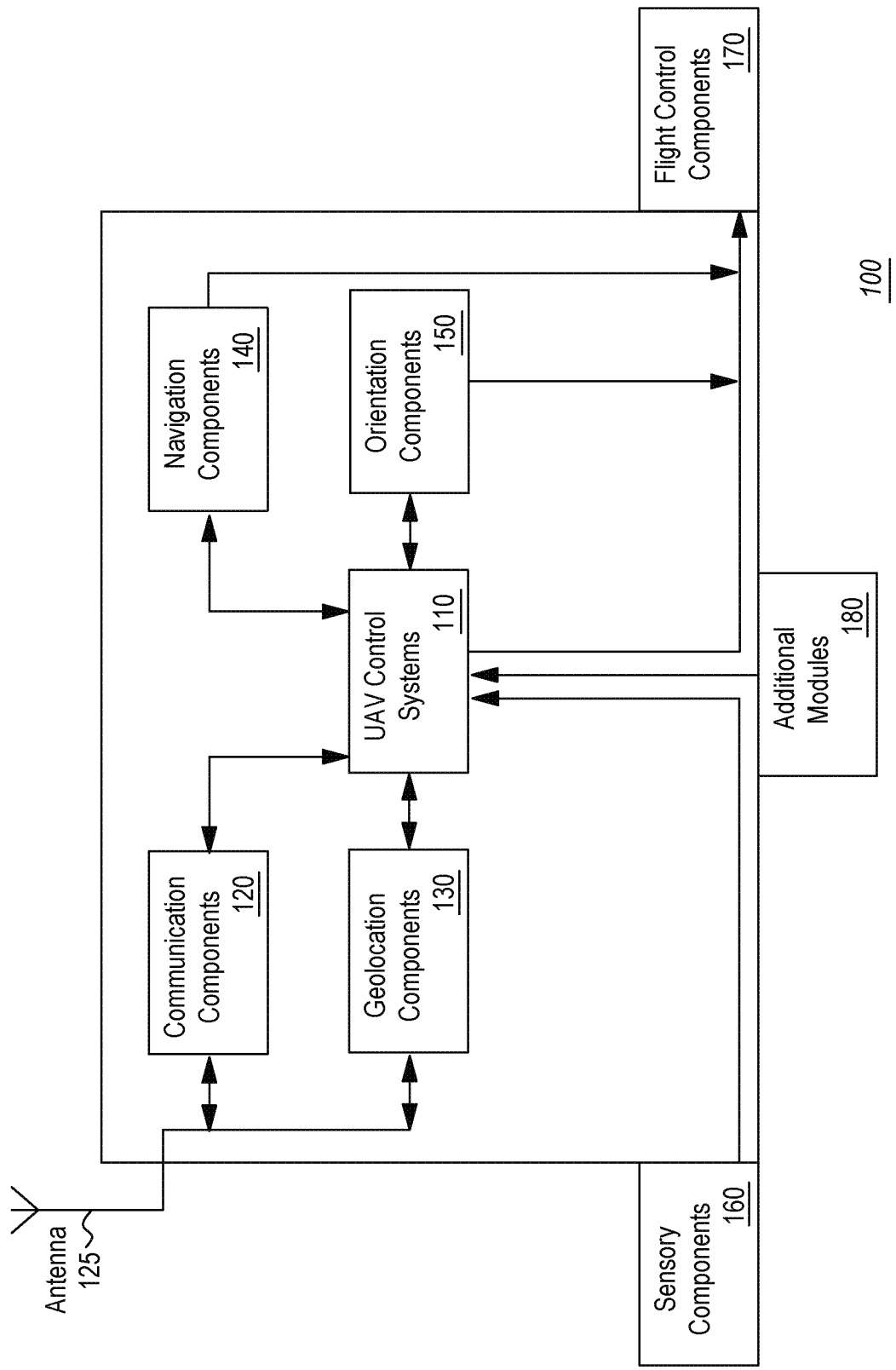
FIG. 1 illustrates a component view of a UAV according to an embodiment.

In order to provide a more full disclosure of UAV systems and methods, the following U.S. Patents are fully incorporated herein by reference:
(a) U.S. Pat. No. 7,469,183, entitled "Navigating UAVs in Formation," which is directed to navigating UAVs in formation, including assigning pattern positions to each of a multiplicity of UAVs flying together in a pattern; identifying a waypoint for each UAV in dependence upon the UAV's pattern position; piloting the UAVs in the pattern toward their waypoints in dependence upon a navigation algorithm, where the navigation algorithm includes repeatedly comparing the UAV's intended position and the UAV's actual position and calculating a corrective flight vector when the distance between the UAV's actual and intended positions exceeds an error threshold. The actual position of the UAV may be taken from a GPS receiver on board the UAV;
(b) U.S. Pat. No. 7,970,532, entitled "Flight Path Planning to Reduce Detection of an Unmanned Aerial Vehicle," which is directed to methods and systems for planning, managing, and executing the flight path of an unmanned aerial vehicle are disclosed. In particular, the methods and systems are designed to reduce the likelihood that the UAV will be detected by determining a flight path based on the proximity of the UAV to a point of interest and the visual, acoustic, and infrared signatures of the UAV relative to a point of interest. Additionally, the methods and systems enable a UAV operator to compare a recommend flight path and an altered flight path based on how the altered flight path changes the proximity of the UAV to a point of interest, and changes the visual, acoustic, and infrared signatures of the UAV relative to a point of interest;

(c) U.S. Pat. No. 8,315,794, entitled "Method and System for GPS-denied Navigation of Unmanned Aerial Vehicles," which is direct to a method and system for navigation of one or more unmanned aerial vehicles in an urban environment is provided. The method comprises flying at least one GPS-aided unmanned aerial vehicle at a first altitude over an urban environment, and flying at least one GPS-denied unmanned aerial vehicle at a second altitude over the urban environment that is lower than the first altitude. The unmanned aerial vehicles are in operative communication with each other so that images can be transmitted therebetween. A first set of images from the GPS-aided unmanned aerial vehicle is captured, and a second set of images from the GPS-denied unmanned aerial vehicle is also captured. Image features from the second set of images are then matched with corresponding image features from the first set of images. A current position of the GPS-denied unmanned aerial vehicle is calculated based on the matched image features from the first and second sets of images;

(d) U.S. Pat. No. 8,543,265, entitled "Systems and Methods for Unmanned Aerial Vehicle Navigation," which is directed to systems and methods for unmanned aerial vehicle (UAV) navigation are presented. A UAV is configured with at least one flight corridor and flight path, and a first UAV flight plan is calculated. During operation of the first UAV flight plan, the UAV visually detects an obstacle, and calculates a second UAV flight plan to avoid the obstacle. Furthermore, during operation of either the first or the second UAV flight plan, the UAV acoustically detects an unknown aircraft, and calculates a third UAV flight plan to avoid the unknown aircraft. Additionally, the UAV may calculate a new flight plan based on other input, such as information received from a ground control station;

(e) U.S. Pat. No. 8,798,922, entitled "Determination of Flight Path for Unmanned Aircraft in Event of In-flight Contingency," which is directed to an enhanced control system for an unmanned aerial vehicle adds constraints to the process of choosing a flight path in the event of an in-flight contingency, such as engine out or an encounter with jamming, which forces a diversion or unplanned landing. The constraints are: (1) ensure communications are available when needed during contingency operations; and (2) ensure signals from a global positioning system (or other navigation system) are available when needed during contingency operations;

(f) U.S. Pat. No. 8,965,679, entitled "Systems and Methods for Unmanned Aircraft System Collision Avoidance," which is directed to systems and methods are operable to maintain a proscribed Self Separation distance between a UAV and an object. In an example system, consecutive intruder aircraft locations relative to corresponding locations of a self aircraft are determined, wherein the determining is based on current velocities of the intruder aircraft and the self aircraft, and wherein the determining is based on current flight paths of the intruder aircraft and the self aircraft. At least one evasive maneuver for the self aircraft is computed using a processing system based on the determined consecutive intruder aircraft locations relative to the corresponding locations of the self aircraft;

(g) U.S. Pat. Pub. No. 2010/0224732, entitled "Wirelessly Controlling Unmanned Aircraft and Accessing Associated Surveillance Data," which is directed to controlling a UAV may be accomplished by using a wireless device (e.g., cell phone) to send a control message to a receiver at the UAV via a wireless telecommunication network (e.g., an existing cellular network configured primarily for mobile telephone communication). In addition, the wireless device may be used to receive communications from a transmitter at the UAV, wherein the wireless device receives the communications from the transmitter via the wireless network. Examples of such communications include surveillance information and UAV monitoring information.

(h) U.S. Pat. Pub. No. 2014/0129059, entitled "Method and Apparatus for Extending the Operation of An Unmanned Aerial Vehicle," which is directed to a method of extending the operation of a UAV. The method comprises detecting that an energy storage device on board the UAV is depleted below a threshold level, landing the UAV at a base station, and initiating operation of the base station to cause a replacement mechanism thereof to remove the energy storage device on board the UAV from the UAV and to replace this with another energy storage device.

(i) U.S. Pat. Pub. No. 2014/0249693, entitled "Controlling Unmanned Aerial Vehicles as a Flock to Synchronize Flight in Aerial Displays," which is directed to a system for flock-based control of a plurality of UAVs. The system includes UAVs each including a processor executing a local control module and memory accessible by the processor for use by the local control module. The system includes a ground station system with a processor executing a fleet manager module and with memory storing a different flight plan for each of the UAVs. The flight plans are stored on the UAVs, and, during flight operations, each of the local control modules independently controls the corresponding UAV to execute its flight plan without ongoing control from the fleet manager module. The fleet manager module is operable to initiate flight operations by concurrently triggering initiation of the flight plans by the multiple UAVs. Further, the local control modules monitor front and back and communication channels and, when a channel is lost, operate the UAV in a safe mode.

(j) U.S. Pat. Pub. No. 2012/0038501, entitled "Self-Configuring Universal Access Transceiver," which is directed to techniques that allow information to be acquired by an ADS-B system of an aircraft without the installation of ADS-B dedicated flight crew controls or wired data interfaces in the aircraft.

(k) U.S. Pat. No. 7,469,183, entitled "Navigating UAVs in Formation," which is directed to navigating UAVs in formation by waypoints and pattern positions.

The terms described below are provided for convenience in understanding at least one embodiment of the present disclosure. Thus, the term descriptions following do not serve to necessarily define or limit the scope of these terms in all embodiments disclosed herein. In general, the term descriptions immediately below are also referenced in various portions of this disclosure of which such portions may expand upon these terms.

An "unmanned aircraft system" (UAS), "unmanned aerial vehicle" (UAV), "unpiloted aerial vehicle," "remotely piloted aircraft" (RPA), "aerial drone," "drone," or the like refers to a system or vehicle capable of directed flight without a human pilot aboard. The International Civil Aviation Organization (ICAO) classifies UASs into two types under Circular 328 AN/190, herein incorporated by reference: autonomous aircraft, which are currently considered unsuitable for regulation due to legal and liability issues, and remotely piloted aircraft (RPA) which are subject to civil regulation under ICAO and under the relevant national aviation authority.

An "airspace" refers to all or a portion of a three-dimensional volume of the atmosphere above a patch of the terrestrial surface (including water). The airspace may be a subdivided by one or more classifications (e.g., classes in accordance to governmental or civil regulations or protocol), which may be designated in accordance with one or more terrestrial features or installations (e.g., airports, cities, military installations, geographical features such as mountains) or height level above ground (e.g., flight level, mean sea level (MSL), or above ground level (AGL)).

A "controlled airspace" refers to an airspace having some sort of air traffic control (ATC) therefor, wherein such ATC may exercise some form of control of vehicles flying in the controlled airspace, but it is not necessary that the air vehicles flying in the controlled airspace interact with the ATC.

An "uncontrolled airspace" refers to an airspace where there is no authorized ATC for providing air traffic control, but an ATC may provide advisory information related to air traffic in such uncontrolled airspace.

An "object" in or occupying an airspace generally refers to a solid physical object is in the airspace. As used herein, the object usually refers to an object of at least a sufficient size, mass and/or velocity to operationally affect one or more of the following aspects of a UAV coming in proximity or contact with the object: (a) the flight path of the UAV, (b) the structural integrity of the UAV, or (c) the safety of the UAV. An "object" is usually not air itself, small aerial particulate such as air particles, moisture, snow, or dust or small flying insects unless such things operationally affect one or more of the above-identified aspects. The object may be freely moving through the airspace, under its own power (e.g., flying animals such as birds, self-powered aircrafts, missiles), or with no internal power (e.g., gliders, launched projectiles, falling objects under the force of gravity such as *meteors*), or occupying the airspace but attached to a point on the terrestrial surface (e.g., buildings and extensions, antenna and cell towers).

A "device" (also referred to herein as a "component," or "subcomponent") used in operating a UAV refers to one or a combination of mechanical, electronic (including software), structural, or other components that contribute to the operation of the UAV. The device may be (i) physically located at or connected to the UAV, (ii) accessible by the UAV (e.g., physically, electronically, or wirelessly) while the UAV is operational, and/or (ii) a component integral to the UAV.

A "communication component" of a UAV refers to one or more components of the UAV for communicating with a device or system that is not included in the UAV (e.g., a remote controller, flight traffic controller, landing port, and flight guidance systems along the flight path). Because the UAV may be typically configured to be operational as a vehicle autonomously moving from one location to another, communication to and from the UAV with an external device or system is most likely performed wirelessly. For example, wireless communication may include (a) direct wireless signal communication between the UAV and the external device or system such communication including communications via, e.g., free-space optical communication using visible, or invisible light such as infrared light, direct radio or spread spectrum signals such as direct radio, 802.11, or Bluetooth signals, and/or (b) indirect wireless communication at least routing the communication (or a portion thereof) between the UAV and the external device or system through an intermediate server provider or exchange (e.g., through the Internet or other wide area network (WAN), cellular or personal communication service (PCS) network, communication satellite, and/or terrestrial microwave communication network).

An "orientation component" of a UAV refers to one or more components that measures the relative position, direction, and/or alignment of the UAV without needing an external reference point (e.g., communicating with an external device or system to obtain or determine the relative position, direction, and/or alignment of the UAV). Typical orientation components of a UAV may include one or more of an inertial measurements unit (IMU) (e.g., accelerometer, magnetometer, and gyroscope), and ultrasound and/or pressure sensor (for altitude measurement).

A "geolocation component" of a UAV refers to a component that provides the UAV with data indicative of (i) an absolute position (or geographical extent) of the UAV, wherein such position or extent is provided in a predetermined geographical coordinate system (e.g., a real-world latitude and longitude geographic location on Earth and/or together with an altitude measurement), and/or (ii) a location relative to a certain position or object, of which the position or object itself may be either fixed (e.g., a building) or moving (e.g., a moving vehicle) (e.g., the UAV being at a certain direction and distance, e.g., 200 feet due west and 500 feet above, from the position or object).

A geolocation component may determine its location without any real time geolocation communication with or access to a geographical information device external to the UAV (e.g., the UAV may be able to calculate or estimate its current position, during flight, simply by accessing UAV onboard data without requiring UAV geolocation data, indicative of this current position, being communicated with any device separate from the UAV). In particular, UAV onboard data may include: the starting position of the UAV, its flight path data, (e.g., the time of flight, a record of its speed and speed changes, orientation and orientation changes through the various orientation components, and other factors affecting the flight path such as wind speeds, all of which can be detected or derived by the various components in the UAV). However, such a geolocation component may also communicate with or access an external resource in (near) real time for determining the UAV's current position. For example, a "geolocation component" may include a global navigation satellite system (GNSS) unit that tracks GNSS signals provided by GNSS satellites (such as the Global Positioning System (GPS), Global Navigation Satellite System (GLONSS), Galileo, Indian Regional Navigation Satellite System (IRNSS), or BeiDou-2) to calculate the latitude and longitude position of the UAV. In another example, such a geolocation component may determine geolocation information by communications with one or more wireless telecommunication infrastructures as disclosed in U.S. Pat. No. 8,994,591 issued Mar. 31, 2015 (entitled "Locating a Mobile Station and Applications Therefor"), and/or U.S. Pat. No. 7,764,231 issued Jul. 27, 2010 (entitled "Wireless Location Using Multiple Mobile Station Location Techniques"), each of which is herein fully incorporated by reference.

A "navigation component" of a UAV refers to one or more components included in the UAV, wherein for moving the UAV from a first location to a second location, each such component: (i) determines or uses information indicative of a route or flight path for navigating the UAV from the first location to the second location, (ii) calculates a direction of the UAV to travel for navigating the UAV from the first location to the second location, and/or (iii) directs or controls the flight of the UAV using the information of (i), and/or the direction of (ii). One example of a navigation component may includes a computational component or system that determines the UAV's flight path consistent with UAV flight and/or operation related information, such as stored or received information related to (a) navigational charts and maps, (b) flight area limitations (e.g., one or more "no fly zones"), (c) elevation information including minimum or maximum UAV operating elevations, (d) governmental regulations or restrictions (e.g., federal or local government regulations or ordinances for: noise abatement, flight speed, or other restrictions based on location, time of day, or other criteria such as private property access restrictions), (e) weather conditions along various points of the UAV flight path, (f) broadcasts from another one or more UAVs and/or fixed terrestrial installations containing information such as identification of the broadcast source, environmental information, UAV distance or direction from such a broadcast source, or other information) which may assist the UAV in developing or altering a flight plan for the UAV. Another example of a navigation component may include a computational component or system that uses a received flight plan developed at a source external to the UAV (e.g., by a remote operator or an external computing system) as a basis for a flight path and making real-time adjustments to the flight path taking into account the various flight-related information as discussed above and herein in this disclosure.

A "flight control component" of a UAV refers to one or more components that affect the flight dynamics (e.g., controlling the UAV's speed and direction of flight) of the UAV. For example, in a rotorcraft type of UAV (e.g., quadcopter), the flight control components includes one or more of each of the rotors and the respective motor/engine (e.g., where the flight dynamics of the rotorcraft is provided by spinning and the changing of the direction and speed of the spin of the individual rotors). In another example, the flight control components of a fixed-wing type of UAV may include one or more of the throttle (controlling the thrust of the engine), aileron (controlling the roll and pitch), and the rudder (controlling the yaw).

A "sensory component" of a UAV refers to one or more components that receives or captures information within the physical vicinity of the UAV but that are not directed to the UAV (like communications to and from external sources with the UAV). Examples of a sensory component may include one or more of a camera or a microphone installed on the UAV that captures respectively video and images and sounds within the vicinity of the UAV. In another example, a sensory component may include extra-human sensory components like radar (e.g., for detecting other objects or obstructions within the vicinity of the UAV for collision avoidance or other uses) and weather Doppler (e.g., for detecting present weather conditions within the vicinity of the UAV). Sensory components may provide the information to other components of the UAV for further operations of the UAV (e.g., providing video and audio feeds to the communication components for communicating with a remote operator and for the remote operator to control and pilot the UAV, providing such feeds or other information to the navigation components for automatic navigation and flight operation).

A "limit" or "limitation" of a UAV refers to a constraint or restriction placed on the UAV, either as a result of the intrinsic limitation of the UAV, such as an operational limit limiting the performance of the UAV, or by prescribed restriction, such as a regulatory limit as provided by the government.

An "operational limit" of the UAV may include one or more of a safe or emergency operational thresholds of the UAV or one or more components of the UAV (e.g., the speed, operational ceiling, maneuverability, or weigh limit of payload of the UAV due to engine power or other factors, or the range of the UAV due to limitation on battery power or communication distance).

A "regulatory limit" of the UAV may include one or more of public (e.g., federal, state, local) or private (e.g., private property rights such as overhead flight over a property) law, regulation, ordinance, rules, or other limitations on one or more operations of the UAV (e.g., speed, flight level, flight path, operation in adverse weather, locations of restricted or "do not fly" areas, etc.).

An "operating mode" of a UAV refers to any one of a predetermined set of one or more UAV operating states, wherein for each state there is associated data for configuring the UAV components for activating, deactivating, and/or operating UAV components in accordance with the data. For example, the UAV may have an operating mode for each of: taking off, landing, hovering, decoupling from or to a cargo load, avoiding a midair collision, etc. Note, such operating modes need not be distinct from one another. For example, an operating mode for use when the UAV is following a predetermined flight path may activate a hover operating mode upon detecting upcoming high wind shear.

In one type of an operating mode referred to as an "automatic operating mode", the UAV may be operational (e.g., navigating and flying) according to pre-defined instructions for operating states, where the pre-defined instructions is stored within the UAV without consulting any external source of instructions for operating the UAV during flight (e.g., for directions on navigating or flying the UAV). However, a UAV in this type of automatic operating mode may still be interrupted for other instructions (e.g., emergency landing/shut-off) or a changing of the operating mode (e.g., changing to a manual operating mode).

In one type of a operating mode referred to as an "directed operating mode", the UAV may be dependent on instructions from an external source (e.g., a human operator or an external computer/electronic operator) for operating the UAV (e.g., direct, navigate, and fly). A UAV in this type of directed operating mode may still retain the ability to intervene with certain safe operating instructions/procedures, such as to safety fly, hover, or land if communication with the external source providing the instructions is severed or if an emergency situation develops at or near the UAV and it is determined that the external source operator may not have the resources or ability to provide adequate instructions (e.g., limited reaction time or flying skill for certain automatic maneuvers or limited instruction/command bandwidth of the communication link which may be due to weak communication signal).

In one type of a operating mode referred to as an "hybrid operating mode", the UAV may be in automatic operating mode for certain portions (operations) of navigation and/or flight, and directed operating mode for certain portions (operations) of navigation and/or flight. For example, a UAV may be in directed operating mode with a remote human operator responsible for the direct duty of flying the UAV. However, the flight must be within certain rules or parameters (e.g., area, speed, or height restrictions as provided by certain regulatory limits). The UAV may be pre-programmed to take over the flight in an automatic operating mode to satisfy such flight rules and overriding the remote human operator. Further, a UAV in the hybrid operating mode may still retain the ability to direct certain safe operating instructions/procedures (e.g., emergency landing or avoidance procedures) as discussed above and herein with respect to this disclosure with respect to the manual operating mode.

FIG. 1 illustrates a component view of an embodiment of a UAV 100 for the present disclosure. The UAV 100 includes one or more of a UAV control system 110, communication components 120 and geolocation components 130, each coupled to one or more (an array) of antennas 125, navigation components 140, orientation components 150, sensory components 160, and flight control components 170 (e.g., the flight control components including rotors, motors, stabilizers, kinetic movement transfer mechanisms, etc.).

The UAV 100 may be extendable in that additional modules and/or components (e.g., attachable modules) may be provided. Examples of such additional modules may include a cargo hold for transporting a payload (with or without automatic loading and unloading of the payload), attachable/detachable containers for water, fertilizer, or other liquids with individual embodiments of such containers having a controlled release mechanism for dispensing the container contents. Such a UAV 100 with container may useful for transferring the container contents to farming, fire-fighting, or other sites or persons in need of such contents. In particular, for farming and emergency applications (e.g., firefighting) the container contents may be controllably dispensed at discrete sites (e.g., liquid fertilizer at individual plants, or fire retardant at discrete fire locations). Of course, various types of containers may be provided or attached to the UAV 100 for carrying various types of cargo. Further, the UAV 100 may include lights, communication beacons, or other components for utilization by the UAV, e.g., during flight or landing. In one embodiment, the UAV 100 may also include solar panels or other power sources that can help power the UAV to extend the range or operation of the UAV, e.g., before having to return to a service facility for recharging/refueling. The UAV 100 may also include appendages for activities (such as grasping, walking, running, climbing, and/or swimming) in a manner similar to various robots that have been recently developed for such activities. Moreover, the UAV 100 may be artificially intelligent in performing particular tasks in that, e.g., the UAV may generate and perform new or unique sequences of behaviors when the UAV encounters a situation or environment for which the UAV has no predetermined technique for addressing.

One of the issues with UAVs is being able to protect its components from physical damage or water damage if it falls into a body of water, being that the components may be high value to the overall costs of the UAV, and being able to salvage some components may be a cost-effective value to the users of the UAV. In an embodiment, except for the flight control components 170, the remainder of the UAV 100 may be enclosed in a durable material, waterproof casing(s). If the UAV falls into water, most components (at least without the waterproof enclosure) may be salvageable. Further, a waterproof enclosure may help protecting the UAV when operating in elements such as rain (e.g., avoid exposing the electronic components to conditions that may lead to malfunctioning or short-circuiting).

In another embodiment, the enclosure of the UAV may be constructed from materials and/or construction methods (e.g., Faraday cage) that shields the internal electronics from electromagnetic (EM) radiation (e.g., from solar activities, cosmic rays, or other natural or manmade activities). This may help protect the electronics components of the UAV from malfunctioning or short-circuiting, or other issues.

Flight and Navigation:

One important aspect for operating a UAV is the ability to safely operate the UAV at all times while the UAV is operating in an area. Safe operation is very important to a UAV because of the unmanned nature (thus having at least perceived and perhaps real image that the UAV may at times lack the ability of a human operator to react to at least some unforeseen circumstances) combined with the large consequences in the case of malfunction, error, or other unforeseen circumstances (e.g., potentially UAVs falling from the sky at high velocity or colliding with other objects in the sky). One way to minimize such consequences is for the UAV to have the ability to get to a safest condition (e.g., quickly landing and terminating operation or, if quick landing is not possible, staying in place (hovering) or maneuvering to safe airspace (to avoid needing to keep make complicated calculations and decisions in dangerous airspace that may have or expected to have difficult conditions such as adverse weather, other objects or obstructions) in the shortest amount of time possible (as the chance of accident increases with the amount of time left in dangerous conditions).

It has been noted, in Unmanned Aircraft Systems: Federal Actions Needed to Ensure Safety and Expand Their Potential Uses within the National Airspace System, United States Government Accountability Office, May 2008, herein incorporated by reference, that FAA requires UAVs to meet the national airspace system's safety requirements before they routinely access the system, which includes and UAV presently do not have the ability to detect, sense, and avoid other aircraft and airborne objects in a manner similar to manned aircraft. With an aircraft, the requirements call for a person operating the aircraft to maintain vigilance so as to see and avoid other aircraft. Without a pilot on board to scan the sky, UAVs do not have an on-board capability to directly "see" other aircraft. Consequently, the UAV must possess the capability to sense and avoid the object using on-board equipment, or do so with assistance of a human on the ground or in a chase aircraft, or by using other means, such as radar. Many UAVs, particularly smaller models, will likely operate at altitudes below 18,000 ft, sharing airspace with other objects, such as gliders. Sensing and avoiding these other objects represents a particular challenge for UAVs, since the other objects normally do not transmit an electronic signal to identify themselves and FAA cannot mandate that all aircraft or objects possess this capability so that UAVs can operate safely.

In an embodiment, the UAV would be aware of its immediate and not-so immediate vicinity. The awareness may be active regardless of the operating mode that the UAV is presently in (e.g., automatic operating mode, manual operating mode, or hybrid operating mode).

The vicinity of the UAV may be dividing into one or more zones, which may include the immediate zone A, the operating zone B, and the observing zone C, explanatory purpose. The vicinity of the UAV may also include a partial area of the flight path zone D. Here, it is noted that the zones may change in real-time (or near real-time) based on the present position (e.g., location, height, etc.) and operating condition (e.g., speed, atmosphere and weather condition, etc.) of the UAV.

It is noted that the other objects (that may occupy a simultaneous zone as the UAV) may include objects that have the ability and are relatively dependable to sense and avoid the UAV (e.g., maneuverable human or computer controlled aerial vehicles, certain intelligent flying animals) and objects that have no such ability or dependability (e.g., inanimate objects such as projectiles, meteor, or the like, certain relatively unintelligent flying animals). It is further noted that the other objects may include objects that have an obtainable and expectable flight path (e.g., human or computer controlled aerial vehicles following a flight plan and/or ATC instructions, inanimate objects that have no self-power and follows a predictable path) and objects that have no such obtainable and expectable flight path (e.g., flying animals, rogue or malfunctioning aerial vehicles).

The immediate zone A is the zone presently occupied by the UAV and the vicinity of which there would be a high probability of accident (e.g., collision) which another object that is also within this immediate zone A. For example, the immediate zone A may include the vicinity of all portions of the UAV (including extensions of UAV such as tows or antennas) at which the UAV is currently occupying and/or may be expected to occupy in an immediate future, even if the UAV would perform maneuvers up to the limit (either operational or regulatory limits) to move the UAV in another direction away from the expected occupation vicinity.

Specifically, if the UAV is flying forward along a flight path at a certain speed, even if the UAV directs its flight control to reverse (or redirect in another direction) the flight path, there will be some time lag between the direction to the flight control and when the UAV is actually reversed (or redirected) (e.g., for a quadcopter UAV for example, because the rotors of the UAV may need to change speed and/or reverse spin and affect the surrounding air to change direction to negate the forward momentum of the UAV). In that time lag, the UAV is still moving forward (or at least one component of the UAV's motion is forward), requiring additional space. As such, other objects that may occupy this additional space are in danger of collision with the UAV. Therefore, it is necessary that the UAV is the only object that is occupying this immediate zone A.

It is further noted that some maneuvers and change of direction may require more space (in some directions) than others. For example, for a UAV moving forward and a reverse maneuver is needed, more forward space is needed as compared to a maneuver to turn in a 90 degrees direction (e.g., turn left or right) because the reverse maneuver needs to negate the entirety of the forward momentum of the UAV (thus requiring more time) while the 90 degree turn transfers at least a portion of the forward momentum into angular momentum for the turn (thus requiring less time). In a further example, a UAV that is turning in one direction (e.g., to the right) may need more space in that same direction to affect a change of flight path from that direction (e.g., a UAV that is turning right may have an immediate zone A with a larger right area/volume than the left area/volume due to the needed additional space). This is effectively based on a similar reason as the UAV moving forward needing an immediate zone A with a larger forward area. In an embodiment, immediate zone A may be defined/calculated to take into account the maneuvering required (e.g., if it is known that UAV will only need to perform certain subset of maneuvers at certain times such as if the UAV is operating at a known site or environment (e.g., indoor) where it is known that there are no other objects expected) at a substantially present or immediate future time.

In a preferred embodiment, all available maneuvers should be available to the UAV, and the immediate zone A accordingly. It is also noted that the maneuvering space needed may depend on conditions such as the speed of the UAV, weather conditions, altitude, and other conditions. The immediate zone A may be defined/calculated accordingly or may be defined as the maximum maneuvering space needed based on the limits of the UAV for the most safety (or as required by rules and/or regulations).

The operating zone B is the next zone of the vicinity of the UAV extending from (and encompassing) the immediate zone A and includes a reasonable operating distance for the UAV (in terms of the distance that would allow the UAV a certain reasonable time to perform flight maneuver and/or operations). For example, the time allowance may be on the order of seconds or minutes or more. In this time allowance, the operating zone B would allow the UAV enough distance to perform certain flight maneuvers that are necessary in the short term such as to calculate and execute a maneuver that could confidently avoid one or more other objects (and in view of their expected flight paths) or keeping a safe distance (time) from other objects. Such maneuvers may include one or more of changing directions of the flight path, speeding up and slowing down, stopping (hovering), and landing.

Similar to the immediate zone A, the operating zone B also may be defined/calculated based on the distance (time) needed to perform the certain maneuvers based on the present operating state of the UAV. For example, if the UAV is moving relatively slowly, it may need less distance to turn or stop (but it may also take more time to perform a large radius turn since the UAV have less momentum, which should also be taken into account). Alternatively, if the UAV is moving relatively fast, it may need more distance to turn (with a larger radius) or stop (but may perform the turn in less time due to the higher angular momentum). As such, the size (distance) operating zone B may be adjusted accordingly to allow enough distance to perform the maneuver.

Also similar to the immediate zone A, the operating zone B may depend on the maneuver or direction of travel presently being performed by the UAV, because when the UAV is performing a maneuver in one direction, the UAV may need more distance to compensate for the added momentum in that direction.

In an embodiment, the operating zone B may be defined by rules and/or regulations governing the spacing of UAVs, similar to present rules and/or regulations on minimum time or spacing between manned aircrafts.

The observing zone C is a zone of the vicinity of the UAV extending from (and encompassing) the UAV to the sensory range limit of the one or more sensory components of the UAV. In a preferred embodiment, the observing zone C should be larger and at least encompassing the immediate zone A and the operating zone B to ensure that the UAV has at least adequate information regarding the vicinity for maneuvering.

In an embodiment, the UAV is configured to observe (constantly) the observing zone C for other objects using information provided by the sensory components (e.g., pictures and videos from an on-board camera, information from an on-board radar) and other information provided by external sources (e.g., information from ATC, terrestrial radar, other information provided through the communication components, etc.). Other ways of detecting other objects such as using an antenna and the communication components to read communications from the other objects (if they are aerial vehicles) and measuring the position using geo-location techniques from the communications of the other objects, using the microphone in picking up the surrounding sound within the vicinity of the UAV and performing analysis on the sound signature, sound location, and other analysis. Still other ways of detecting other objects includes methods as known now or may be later derived. This information may include one or more of the other object's location (e.g., a coordinate with respect to the UAV, or at least some information regarding one or more of an approximate distance and direction from the UAV) and/or trajectory/flight path, or the UAV may calculate/project the other objects' location and/or trajectory/flight path using the information.

With the location and/or trajectory/flight path, plans can be made to steer clear of or avoid the other objects, which may including changing the flight plan (e.g., if the other objects are not within an operating vicinity (e.g., the operating zone B) of the UAV) or emergency maneuvering (e.g., if the other objects are within an operating vicinity of the UAV). In an embodiment, the choice of the plans and the maneuvering (including merely informing a human operator the need to avoid other objects) may depend on the operating mode of the UAV (e.g., automatic operating mode, manual operating mode, hybrid operating mode).

The flight path zone D is a zone encompassing a certain area of space surrounding an expected route (flight path) of the UAV from the present position, if the flight path is available. The flight path zone D may partially overlap with the observing zone C (where information from sensory components and other external sources are available) and partially outside the observing zone C (where information from at least the sensory components would not be available). However, information of other objects and conditions (e.g., weather conditions, flight restrictions) may be available for the portion of the flight path zone D that is outside of the observing zone C from external sources. In an embodiment, information regarding the flight path zone D would be used to help in arranging alternate flight path (e.g., when the flight path zone D contains heavy traffic of other objects or if the weather is adverse), if the UAV is in an operating mode that allows the UAV to make changes to the flight plan.

In an embodiment, because the information regarding at least a farther portion of the flight path zone D would come from an external source, and in some cases more extensive and intensive calculations may be needed, the calculating and changing of the flight plan may be performed by an external source (e.g., a UAV flight operation center/hub), where the UAV may be in consistent communication with and is able to receive updated flight plans from. In another embodiment, the UAV may not be in communication (or may have lost connection) with the external source, and the calculation of the flight plan may need to be performed on-board, using public information (e.g., weather radio, ATC, etc.) from other external sources that do not have the capability (or do not have the needed control access to the UAV) to provide a changed flight plan.

It should be understood from the above and herein in this disclosure, but specifically noted here, that the zones as described above need not be spherical (e.g., spheres with the UAV in the center such that the distance from the UAV to the edge of each zone is the same at all directions) or other specific shapes but may depend on the various operational limitations of the UAV.

It is also noted that regulatory limitations may affect the zones. For example, government regulations may forbid a UAV from certain airspace (e.g., Class A airspace of 18,000 ft and above). As such, the UAV would be forbidden from occupying that airspace. Therefore, even if the UAV is in maneuverable closeness to that airspace, the UAV would not be able to occupy that airspace and thus the zones would not need to include the areas of that airspace (e.g., the immediate zone A or the operating zone B because the UAV would not be occupying that airspace). However, it is noted the UAVs may still have the ability to enter those airspaces because the operational limits of the UAV is not related to the regulatory restrictions. Alternatively stated, the zones are based on the operational needs and limits (e.g., for maneuvering) of the UAV, but the regulatory limits also need to be followed. As such, in effect, the UAV can only operate to a limit (closeness to a regulatory limitation) such that the operational limits (e.g., the operating zone B) and the regulatory limit can both be met.

In some cases, the UAV may be acting near airspaces that it is not necessarily restricted to (e.g., regulatory "hard" limits) but that it is merely not preferred (e.g., regulatory "soft" limit). For example, if the airspace is private property and belongs to a private owner, flight into this airspace may be possible but not preferable (e.g., may have to pay a toll). In this case, certain preferred zones (similar to the zones as discussed above) may be defined/calculated when the UAV is operating in the vicinity of this airspace that "prefers" to not include this airspace in the preferred zones. For example, a UAV may choose (prefer) to move at a slower speed such that the resulting preferred operating zone B would be smaller and would not include the not preferred airspace when the UAV that is moving at the normal speed would need to include this airspace in the normal operating zone B. However, in emergency situations, the UAV would still have the option to include this airspace under the normal operating zone B (e.g., and be able to increase the speed to avoid other objects). In another embodiment, the UAV would have and operate under the normal operating zone B, which may include this non-preferred airspace. However, the calculations that controls the maneuvering may strongly (or weakly) not prefer maneuvering into this non-referred airspace.

In the case of landing (or another operating process) of the UAV, it is necessary that the UAV make contact (a form of collision) with another object (e.g., the ground, landing pad, etc.). As such, it is likely the other object would be in the immediate zone A and/or the operating zone B near the end of the landing (or another operating process) even though the speed of the UAV may have slowed enough that the zones would probably be small. In this case, the UAV may need to know that it expects a contact (or collision) and adjust or ignore rules regarding other objects being in the immediate zone A and/or the operating zone B accordingly. In an embodiment, the UAV may account for an expect contact to only some portion of the UAV (e.g., the bottom of the UAV for a landing) but does not adjust or ignore rules regarding other portions of the UAV (e.g., if another object may collide with the UAV while during the landing process.

Figure 2:
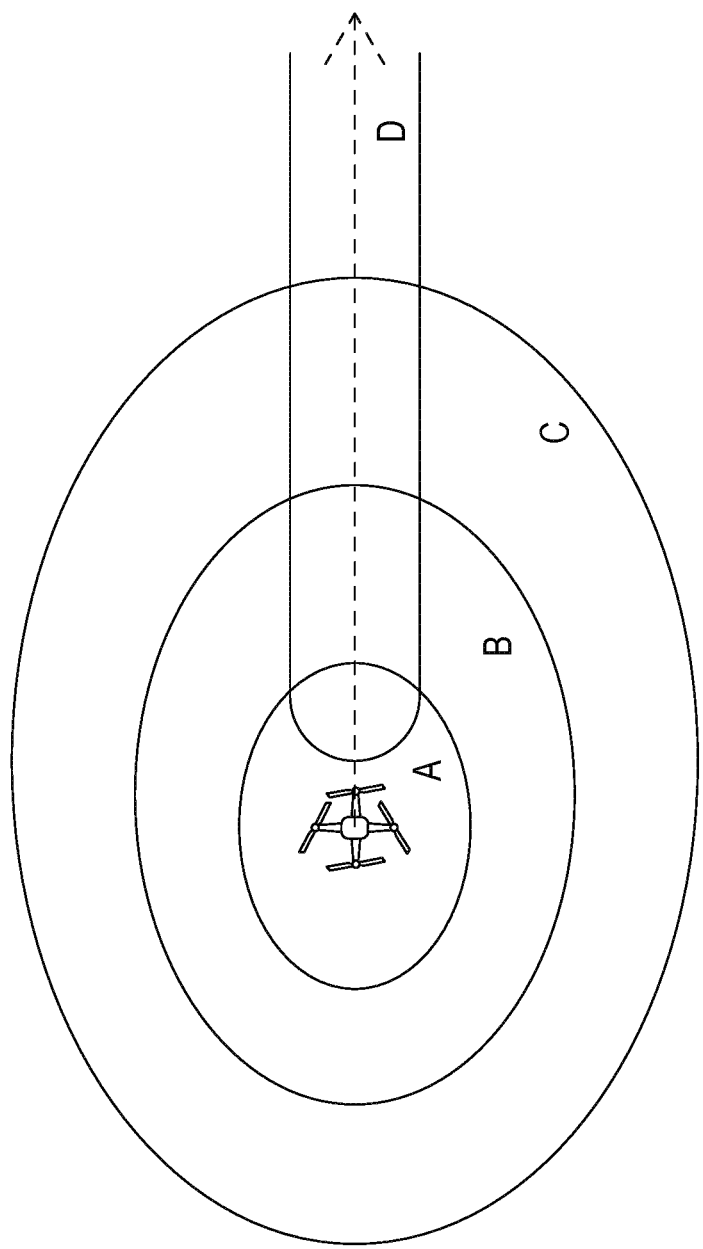
FIG. 2 shows a flow diagram of an emergency object avoidance procedure of a UAV according to an embodiment.

FIG. 2 shows a flow diagram of an emergency object avoidance procedure of a UAV according to an embodiment.

In an automatic operating mode, in a preferred embodiment, the UAV would have a flight path (in accordance to a flight plan) mapped out ahead of time (e.g., when the destination is outside of the observing zone C), and the UAV is configured to follow the flight path unless a new flight path is mapped out, in which case the UAV would follow the new flight path or the automatic operating mode is overridden or changed. In a manual or hybrid operating mode, a flight path may or may not be in place (e.g., the UAV may be navigated freely by a remote human or computer operator). In any case, in a preferred embodiment, the UAV would have certain awareness of its vicinity of other objects and be able to avoid other object once the UAV gains awareness of the other objects that appear in its vicinity.

In a preferred embodiment, the UAV would be able to gain awareness of other objects that appear within the UAV's vicinity even though the other objects may not be immediately affecting the operations of the UAV (e.g., when the other objects are outside of the operating zone B but are observable because, e.g., they are in the observing zone C or information is available about these other objects from other sources, e.g., external sources). In a preferred embodiment, the UAV is able to plan and/or execute maneuvers that seek to avoid such objects and/or their anticipated trajectory while preferably not deviate significantly from the UAV's flight plan/path, if needed.

However, there may be situations where the UAV needs to perform an emergency avoidance of another object because the UAV was not to detect and/or observe the other object until the object is in a vicinity of the UAV that may interfere with the UAV's operation (e.g., the other object appears and occupies a portion of the operating zone B), the actual location or flight path of the other object was not as anticipated or predicted (e.g., the location of the other object has been incorrectly observed or the calculated anticipated trajectory of the other object is incorrect, and the other object is now in a vicinity of the UAV, e.g., the operating zone B, before a new anticipated trajectory can be calculated and a new flight path adopted, e.g., the other object flies at a speed beyond the anticipated needed reaction time of the UAV), or other reasons endangering the operation of the UAV. In such cases, the emergency object avoidance procedure may be performed with at least a purpose of safe operation (e.g., to avoid a collision with the other object).

In an emergency object avoidance procedure, the UAV may take into account a number of factors in determining the most acceptable maneuver or other actions to take. In an embodiment, the UAV may take into account factors including the location and/or the present and anticipated trajectory of the other object, the present operating conditions of the UAV (e.g., speed, heading direction, present maneuver, e.g., turning, climbing, descending), other objects in the vicinity of the UAV (e.g., within the operating zone B or the observing zone C) including their locations and/or the present and anticipated trajectory, the limits on the UAV including operational limits (e.g., the performance ability of the UAV in speeding up, slowing down, turning, climbing, descending, etc.) and regulatory limits (e.g., limits on moving into restricted airspace, maximum or minimum speed limits, available choices and preferences to move or not move to the preferred airspace, etc.), and other factors.

A main computational device of the UAV (e.g., the UAV control system) may be tasked with the computational portions of the procedure. In one embodiment, at least some portions of the computational portions of the procedure may be performed by a computational device closer and/or with a more direct access to the flight control components for the ability to direct the flight control components more quickly and directly (e.g., computational device in the navigation components), but such computational device may have less computing power than a main computational device of the UAV and may have less ability to perform more complicated computations. In another embodiment, the computational devices in the various components (e.g., the UAV control system, the navigation components, the communication components, and the geolocation components) may each perform a portion of the computation.

When the emergency object avoidance procedure needs to be activated/used, the vicinity of the UAV may be scanned for a list of locations that may have a high (or at least higher than the present location) probability of safety (e.g., an ability to avoid the other objects). For example, in a relatively simple case of one other object occupying at least a portion of the operating space (e.g., the operating zone B) of the UAV, with no other objects within the vicinity of the UAV. As such, the UAV would only need to maneuver to avoid the one other object. Here, the safest location may be the opposite location from the one other object's location (or opposite of its anticipated trajectory if the trajectory is known). However, other locations that are not within a vicinity of the one other object's location (e.g., the vicinity where if a location in the vicinity occupied by the UAV, the operating area of the UAV at that location may still be occupied by the one other object) may also be safe locations, albeit with a lower probability of safety than the most opposite location from the one other object. In practice, a gradation of probable safe locations would be compiled (e.g., the list of safe locations), with the highest probability of safety opposite of the one other object and the lowest probability of safety being closest to the vicinity of the other object (and locations in the vicinity of the other object deemed unacceptable). The actual probability (or distribution of probabilities) for the various locations may be calculated or assigned based on physical or regression models, lookup tables based on prior simulations or physical experimentation, other modeling or estimates, or by other methods of calculations.

In an embodiment, this list of safe locations (and their probability of safety) may be modified by the various factors as listed above. For example, with respect to the present operating condition of the UAV, the UAV may be travelling forward while the other object appears at the bottom of the UAV. In this case, while the safest location is for the UAV to move directly upward (and be directly opposite of the other object), the climb rate (speed) of the UAV may be much slower than the forward speed (e.g., being needing to work against gravity to climb and while the UAV already has forward momentum that the forward speed may be boosted to a higher speed more quickly). Here, the UAV may have a preference of a ratio greater than 1 for moving forward instead of climbing (based on parameters such as a proportional (ratio) absolute speed between moving in various directions or other proportions, e.g., the relative speed, the absolute speed squared, as may be defined), which can be expressed as a normalized weight for adjusting the respective probabilities of the list of the safe locations. It is noted that other factors (e.g., the rate of turn) may further adjust the respective probabilities, allowing the calculation to take into account a multitude of factors. The location with the best weighted probability may be selected for the maneuver.

It is noted that the calculations above may be computationally intensive, as the UAV may be required to consider a multitude (unlimited numbers of) probable locations, which may deviate from the next location only by a small amount and may have little change to the weight probability from the next location (e.g., two locations very close by each other). As such, computations of the various locations may be more efficiently arranged. For example, the UAV may first consider a spread of locations (e.g., top, bottom, front, back, left, and right) of the UAV, either from the plane of motion of the UAV or from the plane of the location (or trajectory) of the other object, or some other plane. The calculation (for one or more of the probability or the weighted probability of the location being a safe location) may be first performed for this spread of locations. Subsequently, similar calculations can be performed for other points of locations (near the best location among the spread for precision assuming that the probability does not vary much or also including other points of locations picked elsewhere to ensure the low variance) as needed.

It is also noted that the calculations based on locations may be incompatible with the flight control components which is direction (vector) based. Specifically, the flight control components controls changing a direction of heading of the UAV, not to a specific location. As such, further computation may be needed to translate from a picked location into a direction to that location, and from the direction to the change in the flight control components that moves the UAV in that direction, taking into account that operating conditions (e.g., present motion of the UAV) and/or the other conditions affecting the motion of the UAV (e.g., weather, air movement such as wind). For example, a UAV moving forward at a certain speed and being affected by a cross-wind of a certain speed may require a different change to the flight control than a UAV that is hovering (e.g., no forward motion) and not being affected by any wind.

In human controlled aircrafts, the human may be experienced to take into account such factors for a maneuver (or an advanced flight computer in modern aircrafts may make such calculations). In a UAV, these calculations may not be available due to inadequate computing power. In an embodiment, the flight control components of the UAV may be directed to move the UAV to a general direction (vector) of the location. For example, if the list of possible locations are only the locations in the 6 directions (e.g., top, bottom, front, back, left, and right), each direction may represent around a quadrant of the space in the vicinity of the UAV. The UAV may still be able to avoid the other object by moving in the general direction of the location even though its maneuver flight path does not take the UAV to the location precisely. In another embodiment, the UAV's flight control components may employ a feedback loop while making adjustments if the actual direction of flight deviates from the target location similar to adjustment that would be made by a human pilot.

In an embodiment, if there are multiple other objects that need to be avoided, calculation of the probabilities may be performed for each other object, and the calculations may be correlated to determine the safest location. This may also be performed more efficiently by techniques such as removing the known unsafe locations (e.g., locations (or trajectory) within the vicinity of at least one of the other objects) or by other techniques as discussed above and herein in this disclosure or otherwise known now or may be later derived.

In an embodiment, the emergency object avoidance procedure may further take into account other objects that are not in the operating area of the UAV (e.g., in the observing zone C or known otherwise by the UAV) but may nevertheless be accounted for in maximizing safety (e.g., if an avoidance maneuver would bring the UAV to an area with limited options for the next maneuver, if needed).

Figure 3:
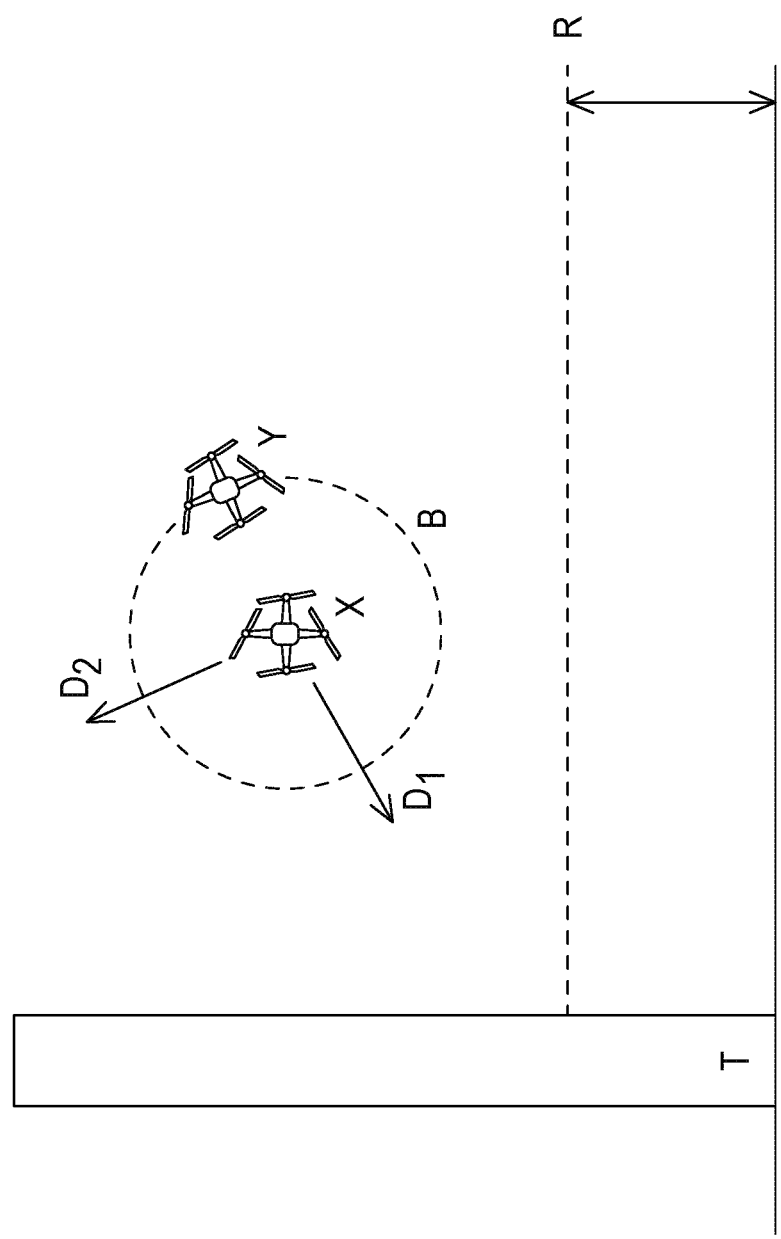
FIG. 3 illustrates an exemplary scenario of a performance of an emergency object avoidance procedure according to an embodiment.

For example, FIG. 3 illustrates an exemplary scenario of a performance of an emergency object avoidance procedure according to an embodiment. In this scenario, UAV X has an operating zone B, and object Y is presently also occupying at least a portion of operating zone B, positioned as illustrated. Building T occupying some of the airspace is positioned as illustrated. Limit R, positioned as illustrated, is a regulatory limit of the airspace (e.g., a class of airspace) for which a UAV (e.g., UAV X) may be fly below.

Here, a location in the direction $D_1$ may have a best probability of maximizing safety for UAV X to avoid object Y, if only taking into account the operating area of the UAV X as discussed above. However, direction $D_1$ may not be the best when taking into account that moving to a location in direction $D_1$ would limit the next maneuvering options of the UAV X. For example, if object Y also moves in direction $D_1$ (where the trajectory of the object Y is not previously known to the UAV X, otherwise, a location in the direction $D_1$ may not had been the best option), UAV X may choose to do further maneuver in the direction $D_1$ until the building T and/or the limit R may occupy an operational area of the UAV X.

As such, the other known objects (e.g., building T and limit R) may be considered even if these objects are not in the operational area of the UAV X. In an embodiment, the distance of these objects may be considered as a factor for calculating the weighted probability. For example, the weight considered may be inversely proportional to the distance of the object from the UAV, as farther objects may have a lower probability of affecting the limitation of options for maneuvering the UAV. However, a swarm of objects in an area would affect the weighted probability relatively significantly (e.g., by summing the individual weights) even if the distance is far; this may be a wanted effect as the UAV may prefer to maneuver to an area of fewer objects (thus may lead to a higher probability of safety).

In another embodiment, the UAV may also take into account factors such as a clear line of sight (or clear areas of observation for sensory components that do not need a line of sight but may nevertheless have areas where it has greater sensibility for observation) such that the UAV can retain the maximal awareness possible. For example, in the exemplary scenario, a sensory component of a camera may not be able to see through the building T. As such, in the exemplary scenario, the UAV X may calculate that a location in the direction $D_2$ may have the best weighted probability of safety as it avoids getting closer to the building T and the limit R while having a clear line of sight (and movement) above the building T. The UAV may also take into account other factors and/or preference for maneuvering, such maneuvering to move the UAV closer to a suitable landing site to prepare for possible landing if the airspace becomes dangerous and uncertain for safe operation (e.g., if the airspace becomes too crowded).

In an embodiment, the UAV may further take into account a combination of maneuvers for avoiding an object or maximizing the potential maneuvering options. For example, the UAV may decide to take an indirect path to a location for the maneuver. Alternatively stated, the UAV may maneuver to the location through one or more intermediate waypoints. Calculation-wise, this can be viewed as maneuvering to one or more locations before maneuvering to a final location. In an embodiment, the UAV may perform the safe probability calculation for the locations by making the calculations for a first set of locations, and then a combination or permutation of the first set of locations moving to a second set of locations, etc. This set of calculations may be computationally intensive, and the UAV may use one or more of the techniques as discussed above and herein in this disclosure or otherwise known now or may be later derived to improve the efficiency.

It is recognized that the UAV may not be able to avoid every other objects in certain situations (e.g., the object intentionally targeting the UAV such as a missile, the object, e.g., a fast flying animal, which has an unknown trajectory unintentionally hitting the UAV that has weak performances and is incapable of avoiding the animal or if there is just no maneuvers that can avoid at least one of the other object such as if there are multiple objects in the vicinity of the UAV that are arranged in a configuration that is impossible to avoid every one). In such cases (where there are no safe locations for the UAV to move to), there may be contingencies that the UAV may employ to minimize danger to others (e.g., other objects in the air or ground) when it is inevitable that the UAV will be collided with and possibly destroyed. In an embodiment, the UAV may perform certain procedures including moving (to the best of its ability) to a possible location that is least likely to collide with other objects (in air and in its path down to the ground) before its impending collision. In another embodiment, the UAV may contain a self destruct procedure that performs one or more of breaking up the UAV into less impactful pieces, scattering the pieces over a wide area, or other procedures to minimize the impact of a collision with a non-operational UAV falling to the ground.

In a preferred embodiment, the UAV may also perform a flight path planning procedure in typical operating conditions under certain operating modes (e.g., automatic or hybrid operating mode). Under the emergency object avoidance procedure, the UAV is configured to maneuver to avoid other objects that are within the UAV's operating area. Under the flight path planning procedure, the UAV is configured to proactively calculate a flight path of the UAV prior to the other objects appearing within the UAV's operating area.

As discussed above, the UAV may maintain observation and/or knowledge of the various other objects beyond the operating area of the UAV (e.g., the observing zone C and the flight path zone D). As discussed above, the other objects that are observed or known by the UAV may be within one of the categories having a known trajectory (e.g., through communication with the other objects, through ATC or other control source communications and/or instructions, through knowledge of the trajectory gained from other sources such as from a hub or operation center, a known trajectory stored in the UAV's database, etc.), an expected and/or anticipated trajectory (e.g., a fired projectile or objects in free-fall without self-power and does not have other source affect it would likely only be affected by gravity and the atmosphere), or an unknown or difficult to determine trajectory (e.g., aerial vehicles that are not in communication or not following flight rules, flying animals).

In an embodiment, the UAV may continuously (or at least in certain acceptable frequency) monitor the other objects and consider the probability that the trajectory or anticipated trajectory of the other objects would affect the UAV. For objects with unknown or difficult to determine trajectory, the UAV may take into account these objects' present operating conditions and/or known operating ability (e.g., speed, heading, performance ability such as acceleration and climb rate) and derive a predicted flight path (trajectory) for the object. For example, if the object can be observed, determined, or known as a type of aerial vehicle, the known operating ability of the object can be derived from tendencies of other similar objects (e.g., information on the tendencies of a similar model of an aerial vehicle or a type of flying animal, tendencies of objects of similar size and shape and within the area where the object is located), as stored in the UAV's database or from an external source.

It is noted that the trajectory or anticipated trajectory may change over time or at a moment's time. As such, in an embodiment, the UAV may also calculate or keep track of a confidence value to the probability that each object would affect the UAV. For example, if the other object is a human controlled aircraft flying under instrument flight rule (IFR) and has a flight plan filed, it would be fairly confident (and the aircraft would have a high confidence value) that the aircraft would stay to its communicated or known trajectory because the aircraft would be expected (trusted) to follow the flight plan. In another example, if the other object is a projectile without self-power, it would also be fairly confident (and the projectile would have a high confidence value) that the projectile would stay to its expected or anticipated trajectory, because it is unlikely that the projectile can change course unexpectedly, even though its flight path is only calculated by the UAV. In yet another example, if the other object is a flying animal (e.g. a bird), the confidence value would be low that the trajectory can be expected, if the trajectory can be calculated. For objects with a predicted flight path because an expected trajectory cannot be determined, the UAV may assign an inherently low confidence value (as discussed below) to the respective probability because of the untrustworthiness of the probability derived from this predicted flight path.

Under the flight path planning procedure, the UAV may plan a flight path that has a relatively low probability of being disturbed by other objects. In an example where the present flight path would have a high probability of being disturbed by an object (e.g., if the object's trajectory would cross the flight path at a time when the UAV is expected to be at that location), the flight path planning procedure would discourage (or forbid) the flight path from taking the UAV through the object's expected location. An alternative flight path may be determined, taking the UAV through low probability areas while avoiding high probability areas (e.g., using pathfinding algorithms such as Dijkstra's algorithm giving low path weights to low probability areas and high (or unpassable) path weights to high probability areas or other algorithms as known now or may be later derived). Also, the flight path planned may include other flight control directions, such as slowing down or speeding up, hovering, etc., depending on the need of meeting the goal of avoiding the other objects.

In an embodiment, the probability of an object (or an anticipated trajectory and that location or area) being probable to disturbed a flight path may be assigned or calculated based on an expected closeness of the other object to disturbing (intersecting) a vicinity of the UAV (e.g., the operating zone B of the UAV) at a time when the UAV is expected to be at the location. In the case where the flight path and the trajectory cross, the other object would certainly be disturbing the would be operating area of the UAV, and thus the probability would be very high or even certain. In the case where the flight path and the trajectory would not cross (or effectively move into the operating area of the UAV), the probability would be very low or even zero. This results in a bimodal distribution of the probability where the other object either has a very high or very low probability depending on whether the trajectory would intersect the flight path (and effectively the would be operating area of the UAV at the time of the intersection), but this is only for the cases where the UAV and the other object can perfectly follow flight path and the trajectory, respectively).

In most cases, the UAV (or the other object) may follow a flight path (or a trajectory) but may have a deviation (e.g., due to mechanical deviations of the flight control components of the UAV or the other object, weather or other external conditions such as wind, and other factors) affecting one or more of the heading/direction of flight, timing of movement along the flight path (or trajectory). Such deviation may affect the probabilities because, for example, some deviation of the trajectory of the other object may cause it to come within the vicinity of the UAV when in a perfect trajectory it may not. In an embodiment, the probability change due to such deviations may be assigned (e.g., a general outset, which could be based on some factors somewhat positively correlated with the deviation, such as the characteristics of the UAV or the other object (size, speed, etc.) and the general weather condition) or calculated taking into account known deviation models of the UAV (and the other object) and/or external condition models (e.g., weather) or by other methods as known now or may be later derived.

It is further noted that the deviation is generally larger when the other object is farther away from the UAV, due to the effect of the distance having an expanding effect on the deviation. Effectively, the probability for an object that is closer to the UAV may have more certainty (e.g., a higher probability for certain trajectories and lower probability for other trajectories), thus being closer to the bimodal distribution as discussed above. In practical terms, there is a better accuracy to knowing which other object may disturb the UAV when the other object is closer to the UAV (for better flight path planning).

In an embodiment, a UAV may require certain probability of a trajectory of an object before the UAV will consider avoiding the object. For example, a UAV may require at least 90% probability since there may be too many unknown variables that planning for an object too early (e.g., before it is somewhat certain of the intersection) may be unnecessary (e.g., the other object may have changed trajectory in the mean time in any case) at the cost of a large detour (because the flight path with the lowest probability is almost always going to be an area where there are no other object activities, but it is probably a large detour from where the UAV wants to go to). In some way, this is balanced by the pathfinding algorithm (e.g., Dijkstra's algorithm) for finding the shortest path (modified by safety probability). In an embodiment, the balance between safety and efficient flight planning may be adjusted according to one or more factors including the use of the UAV, the area of use, known frequency of activities of the other object or the probability of danger, and other factors.

Regarding the confidence value of the trajectories of the other objects, in an embodiment, the confidence value may be interpreted as needing a larger variance of the trajectory (e.g., the sum of a set of the possible trajectories) in order to have the same confidence (with the set of the spread of the possible trajectories) as with a trajectory with higher confidence (or a group of trajectories with a smaller variance). For example, for a trajectory with a low confidence value (e.g., a flying animal), this trajectory may be represented by a set of possible trajectories (where the set may be distributed by a normal distribution (or other distributions) with a high variance, e.g., a large area or space of trajectories). This is in contrast to a trajectory with a high confidence value (e.g., an aerial vehicle following flight rules), which may be represented by a set of possible trajectories that have a variance only because of, e.g., the deviation as discussed above (e.g., a small area or space of trajectories). Effectively and in practical terms, the UAV may plan a flight path that avoids a larger area of the vicinity of the trajectory with a low confidence value in order to comfortably (confidently) avoid the respective object.

In an embodiment, the flight path planning procedure may also take into account other factors for determining a suitable flight path. For example, the flight path planning and calculations may need to consider certain regulatory limits such as the right of way of some other objects (e.g., larger aerial vehicles such as human controlled planes or helicopters being less maneuverable among other reasons, other aerial vehicles in an emergency or "mayday" call), where the UAV may need to slow down its flight in approaching the anticipated cross-path with the other object (or even stop/hover) to ensure that the other object has passed the intersection first before continuing.

In another example, the UAV may prefer certain paths (e.g., pre-planned UAV paths ("UAV-ways") or ("UAV corridors") designated for UAV use or other flight paths such as known airways between VHF omnidirectional radio range (VOR) that are used by commercial aircrafts). In one implementation, these and other factors may be included in the flight path planning procedure by adjusting the probabilities using a weight similar to as implemented for the emergency object avoidance procedure discussed above. For example, to include the right of way factor, the probabilities for these objects requiring the right of way may be weighted higher than other objects.

In another example, to include the path preference factor, the probability for objects also using the paths may be weighted lower than other objects not using the paths (but the preference (weight) may only apply if the other object is a UAV for UAV corridor because other non-UAV objects may not be following UAV corridor protocols and may be a danger to safe operation). In effect, UAVs may follow the preferred paths (e.g., UAV corridor) at a closer distance with each other than otherwise.

In an embodiment, a flight path of the UAV may also be affected by a negotiated flight path between the UAV and another object that has a flight plan/path and is capable of communicating on and changing the flight path (e.g., other aerial vehicles) or negotiated/assigned flight path by some overarching control service (e.g., an ATC controlling flight paths of aerial vehicles in an area of the airspace). In one example, the ATC that controls all flight paths of aerial vehicles in an area may request that the UAV follows a certain flight path. If the airspace is fully controlled (by the ATC), the UAV would be obligated to follow the flight path provided by the ATC and would not need a flight path calculated by the flight path planning procedure. The UAV may still need to perform the emergency object avoidance maneuvers when applicable, as there may still be other objects not controlled by the ATC (or other control services) in the airspace (analogous to collision avoidance systems (CAS) in some aircrafts). In an embodiment, the UAV may still use the flight path planning procedure to calculate a flight path for approval by the ATC, if allowed.

If the airspace is not controlled, the UAV and the other object may communicate to negotiate a flight path, thus giving a fairly certain knowledge of the flight path/trajectory to each other. In an embodiment, the right of way of the UAV and the other object may be first determined (e.g., with the larger aerial vehicle usually having the right of way). For the entity having the right of way, it may first plan a flight path (while ignoring the existence or the trajectory of the other entity, e.g., when planning the flight path) and request the other entity to plan a flight path that avoids the entity. Each of the resulting flight paths may be transmitted to the other entity to ensure that they do not intersect. In an embodiment where there is no right of way or if the right of way cannot be determined, each entity may transmit a proposed flight plan to the other entity and each entity determines a flight path that avoids the other entity's trajectory, either simultaneously (e.g., the UAV and the other object both considers the flight path sent by the other entity simultaneously, and each entity plans a flight path that avoids the other entity based on received flight path) or in sequence (e.g., the UAV sends its flight plan first to the other object, then the other object plans a flight path that avoids the UAV and transmits that to the UAV for confirmation). The UAV and the other object may need to negotiate the flight paths a number of times before the final flight paths may be settled, especially if the flight paths are transmitted to the other entity simultaneously.

In an embodiment, the UAV may use one or more of transmitted data, synthesized speech (voice), or other formats of encoding information to communicate and negotiate with the ATC or the other objects. For example, in the case where the ATC or the other objects only supports speech (e.g., being human operated), the UAV may include a translator of the flight path or other information to speech format (or ATC speech format or other types of formats) and a speech synthesizer to convert the speech format into audible voice for transmitting the information to the ATC or the other objects. The UAV may further include a speech-to-text recognition system and a text to data translator translating the text received from the ATC or the other objects to a data format that the UAV may understand as being flight path or other information.

Further regarding UAV corridors, in an embodiment, the UAV may be configured to use paths designated UAV operations. In an embodiment, these UAV corridor may follow pre-existing airways or other known or frequently used paths in the air or roadways or other paths on the ground. Private property owners may also set up the UAV corridors in private property as an acceptable way for UAV to move across the property authorized by the owner. In an embodiment, the UAV corridors may include broadcasts or other communication devices along the UAV corridors that provide service or other information to the UAVs, such as the travel and weather conditions, information regarding other UAVs and objects in the vicinity, information regarding local navigations (e.g., maps) or regulatory limits (e.g., speed limits, restricted areas, etc.) and other information. UAV corridors may also include various service facilities for the UAVs such as landing sites or service locations (e.g., for recharging the UAV).

Other features of the UAV corridors may include the ability to grant or deny access, including collecting toll for access for the UAV attempting to access the UAV corridors (e.g., for private property or government tollways). In an embodiment, UAV includes an identifier and may include other information such as the owner's registration or government license, and the UAV is also to transmit such information to another system (e.g., a toll collection system or an access grant system set up by the owner of the property or the government). At the receipt of such information, the other system may verify the received information (and/or recording the information for collecting toll) and further communicate with the UAV (e.g., communicating the grant or denial of access). At this point, the UAV may update its database to access the UAV corridor (e.g., a preferred area because access toll has already been paid, a non-preferred area because toll is calculated by the distance of the access, or a restricted area if access has not been granted).

Regarding landing, it is noted that, with respect to safety, the UAV is probably at its safest position landed. As such, the UAV should consider being landed when it encounters situations that it has no pre-conceived solution for or other unanticipated situations. Further, the present FAA proposed rules for UAVs does not allow operation of the UAV in many situations, including adverse weather conditions. As such, the landing potential of an area of operation of the UAV is important as the UAV should be capable and able to land when expected.

Therefore, the UAV (and both emergency object avoidance procedure and the flight path planning procedure) should actively consider the landing potential of the UAV when planning and executing emergency maneuvers and flight paths. In an embodiment, the UAV may consider and keep track of a number of suitable landing locations (e.g., at least an area of flat land for a quadcoptor UAV) and be ready to execute a controlled landing (e.g., in various emergency scenarios including a low power/fuel scenario). In an embodiment, the landing procedure may be separately implemented in one or more of the navigation components, the orientation component, the flight control components themselves, or other components such that the UAV may be able to land even if key components of the UAV malfunctions (e.g., UAV control system). For example, if one of the components of the UAV malfunctions, the UAV should not be operating for maximum safety and should land, and the UAV is able to land because at least the flight control components can automatically land the UAV by itself.

Further regarding landing, in an embodiment, there may be specific landing sites designated for UAVs. For example, UAVs may land at hubs that may include service facilities such as for recharging or fueling or other services. In a commercial or residential building, landing sites may be located on the roof (for the collective occupants of the building) or at balconies, extension areas of the building, or other designated sites (for the collective or individual occupants of the building). These landing sites may include payload receiving or loading facilities for automatically (or manual facilitated) reception or loading of a payload (package) from and onto the UAV.

In an embodiment, landing sites may include specific landing aids (e.g., radio beacon, line of sight signals, or other aids) for facilitating the landing of UAVs. The UAV may pick up of these landing aids (e.g., from a distance) as a guide for leading the UAV to the landing sites. In another embodiment, the landing sites may also include one or more of an automatic or manual (human controlled) control center for landing of UAVs. For example, the landing site may request that direct control of the UAV be passed to the landing site's control center. In another example, the UAVs are expected to follow instructions provided by the landing site's control center (which may be similar to ATC instructions at an airport for aircrafts). These control or instructions to the UAVs may include one or more of hovering or flying in circle (to delay landing for reasons such as if the landing site is not ready to accommodate the UAV or if the landing site is expected to accommodate another UAV under emergency or "mayday" call) or other controls or instructions. In an embodiment, similar procedures and control may exist for accommodating the release and take-off of the UAVs from the landing sites.

In an embodiment, multiple UAVs may be coordinated and/or controlled in conjunction (e.g., needing one navigation command by a human or computer operator). For example, two or more UAVs may be "chained" together electronically. In an embodiment, one of the plurality of "chained" UAV may be designated as the lead UAV, where control from the operator (e.g., the human or computer operator) would directly be controlling the lead UAV. The other "chained" UAVs may move and be positioned according to a designated formation (or some designated arrangement or pattern) from the lead UAV. For example, in an arrangement for "towing" of a number of UAVs (where the "chained" UAV may be set to follow the lead UAV), the UAVs may align in an arrangement of a line of UAVs where a second UAV follows the lead UAV, and a third UAV follows the second UAV and so on. Other arrangements for the "towing" example may also exist (e.g., UAVs lined up two abreast, with the second UAV following next to the lead UAV, and the third and fourth UAV following behind the lead and second UAV, respectively).

When the UAVs are in an arrangement, the UAVs may each be in communication with one or more of the other UAVs. Further with respect to the "towing" example as discussed above, in an embodiment, the second UAV may be in communication with only the UAVs that it is following (e.g., the lead UAV) or is followed by (e.g., the third UAV), which may save communication bandwidth and processing. In another embodiment, each UAV may be in communication with some or all of the other UAVs in the arrangement, leading to a communication web between the UAVs. In yet another embodiment the operator or other designated secondary operators may still retain direct control of the other "chained" UAVs as needed.

With respect to the communication, each UAV may use the general communications components (e.g., free-space optical communication using visible or invisible light such as infrared light, direct radio or spread spectrum signals such as direct radio, 802.11, or Bluetooth signals) for communicating with the other UAVs and/or the operator for the lead UAV. In an embodiment, the UAVs may include a specific component for "towing" or other arrangements, such as a component that emits a wireless chain (e.g., infrared light, laser) or another line of sight signal. The other UAVs may pick up and follow this wireless chain from the respective UAV that it is designated to follow or be in a movement or position in respect to. For example, in an embodiment, the incident (ray) of the wireless chain may be at an angle with the emitting UAV, and the UAV picking up and following this wireless chain would follow the incident of the emitted wireless chain and be at the same angle with respect to the emitting UAV.

In operation of a UAV arrangement, the lead UAV is controlled (e.g., internally by the UAV in automatic operating mode or by an external human or computer operator in manual operating mode) for leading the UAV arrangement to a location. The other UAVs in the arrangement may be configured to move or be positioned with respect to the lead UAV either directly or indirectly (e.g., following another UAV that is directly following the lead UAV. As such, when the lead UAV moves to a location, the other UAVs would follow while keeping in the arrangement.

It is further noted that an arrangement here does not necessarily mean a static formation (e.g., the UAVs being at specific distance or heading (or a range of distance or heading). The arrangement of the UAVs may be dynamically assigned and moved. In one example, the arrangement of the UAVs may be dynamically assigned to form a pattern. For example, if the UAVs is configured to form in a ring arrangement of a certain radius (e.g., for providing a temporary communication array over a certain area), the number of UAVs forming the ring may increase or decrease as a function of the available UAV that can be allocated for the use at that time. As more or less UAVs join the ring, the distance between neighboring UAVs may close or widen, respectively. In another example, the arrangement of each UAV with respect to each other may also be dynamic. For example, in one arrangement, a UAV may be configured to move in a circular pattern or other patterns around or with respect to another UAV.

In a further embodiment, the other "chained" UAVs may still be able to operate in operating modes (e.g., the automatic operating mode) where they may still perform certain maneuvers (e.g., the emergency object avoidance procedure) as needed, even if it means the "chained" UAV would have to break the arrangement if safety requires it. In an embodiment, the "chained" UAV would attempt to return to the arrangement after performing the needed maneuvers. The arrangement of the other UAVs may also "wait" for the broken off UAV to catch back up with the arrangement by slowing down or stopping (hovering). In another embodiment, it may be determined that an emergency or an abnormal operation has occurred affecting the entire arrangement if one or more (or a significant proportion) of the UAVs of the arrangement has broken off, and may lead to landing (or other procedure) of the entire arrangement. In yet another embodiment, the "chained" UAV operation may be part of an operating mode of the UAV (e.g., where the UAV is in automatic operating mode and movement and/or position of the "chained" UAVs with respect the lead UAV would be part of the flight plan).

In an embodiment, controls of a UAV may be passed to another operator, whether the UAV is in automatic operating mode, manual operating mode, or hybrid operating mode. For example, the FAA presently proposed rule requires a human remote operator to keep a visual line-of-sight with the UAV the human is operating. As such, for a UAV in long range operation (or generally out of line-of-sight operation such as in a city scenario with building blocking the line-of-sight of the operator), various operators may be positioned at various vantage points of the flight path of the UAV such that there is at least one operator having a line-of-sight view of all portions of the flight path. When the present operator of the UAV will lose line-of-sight view of the UAV as the UAV is travelling along the flight path, the next operator having a line-of-sight view of the continuing flight path may take over the duty of operating the UAV.

In another example, even if there is no regulatory limit requiring the line-of-sight of the human operator (e.g., a human may control the UAV through transmitted views of the environment/vicinity of the UAV from the UAV's sensory components such as an on-board camera), there may still be situations where it is advantageous to transfer control to another operator. For example, some operators may have the skills and/or familiarities with certain specific areas of operation (e.g., a geographical area or experience in the air traffic of a certain area) or certain types of weather and/or other external conditions (e.g., high wind, rain, snow, or other conditions). Also, rules and regulations may require an operator having a certain specialized qualification (e.g., flight hours, specialized training such as mountain flight training, security clearance for flight over a certain area such as certain national security sensitive areas) in order to operate the UAV for a certain airspace or area. As such, even if rules and regulations allow for remote operation of the UAV, operation of the UAV may need to be handed off to certain specialized operators at certain times and flight areas for compliance, safety, and other reasons. Operation of the UAV may return to the original operator when the specialized operator is no longer needed. In yet another example, the UAV may be part of a fleet of many UAVs belonging to the same entity (e.g., part of an international UAV fleet), it may be of further efficiency if an operator controlling the flight of the UAV is limited in duration or other factors (e.g., geographic areas or other specialty as discussed above and herein in this disclosure). For example, operators may work at various centralized UAV control centers (e.g., certain UAV hubs) at various geographical areas and may work in various shifts and time zones. A UAV in flight may require continuous operator control. As such, control of the UAV may pass to a more localized operator to the UAV's present position to allow the original operator time off if the flight is long. This may also facilitate more reliable communication between the operator and the UAV, being that the actual operator would be closer to the UAV.

In an embodiment, control/operation of the UAV may also be passed to an external (third party) human or computer operator. For example, in the landing sites scenario as discussed above, landing sites request remote control of the UAVs to facilitate landing arrangements (alternate to the UAV having to follow landing instructions such as ATC instructions). In an embodiment, UAVs may implement a common protocol (e.g., over the communication channel between the UAV and landing sites) that allows the landing sites (or other third party operators) indirect access to the flight control components (by using the protocol as implemented by the UAV). In this way, the UAV may still bypass the control given to the third party operator (e.g., similar to bypassing one of the manual or hybrid operating modes back to an automatic operating mode to perform an emergency object avoidance or other procedures).

Security:

Security is recognized as a substantial issue to UAV operation. Much of the security issues around UAVs deal with communications between various external sources, especially with respect to command and control of the UAVs. In terms of communication, two aspects on the communication are notable on the security concerns: the uninterrupted communication availability (e.g., attacks by jamming the communication or by other methods of severing or interrupting the communication) between the UAV and one or more of the remote operator, other communicable objects such as other aerial vehicles, fixed flight guidance or other flight information installations, and other external sources related to an operation of the UAV, and the integrity of such communication (e.g., one or more of intercepting the communication at each of the origin or the destination of the communication (e.g., by a trojan or spy software at the UAV or the external source) or in between the origin or the destination (e.g., when the communication is through the communication channel and/or at an intermediate relay such as a router)) and impersonating the communication as being from the other of the UAV and the external source (e.g., a spoofing attack). Other security concerns may also include access to the physical UAV, including the various devices and components of the UAV (e.g., storage of the UAV that may include private or sensitive information such as photographs of secured or restricted areas).

An uninterrupted communication channel between a UAV and one or more of a remote operator (either human or an external computer), other aerial vehicles, fixed flight guidance or other flight information installations, and other external sources may be important for a UAV as the UAV may be relying on the vital communication for command and control, decision making (e.g., emergency object avoidance and flight path planning), and other functions of the UAV. This issue goes directly to an ultimate safety issue because a UAV that is in flight cannot simply stop mid-flight and be relatively safe; the UAV must land safely or else might collide with another object or cause injury to human or property if it crashes to the ground.

Further, present UAV operations lack a dedicated and/or protected radio frequency spectrum for such UAV operations (e.g., dedicated and protect radio frequency channels like in the case of manned aerial vehicles). As such, UAVs may be vulnerable to even unintentional interferences from other electronics using wireless technology (e.g., devices that have legitimate and legal use to a wireless channel), let alone intentional interferences of the UAV's communication (e.g., an attacker jamming the channel such as when an attacker is broadcasting with high power on a wireless channel that the UAV is using for communication, which may still be a legal use). This is a key security vulnerability for UAVs, because any interruption to the wireless communication channel, such as by jamming, can sever the exclusive means of control of the UAV (e.g., the remote human of computer operator in a manual operating mode), as opposed to an aerial vehicle with an onboard (manned) pilot that has direct and physical control of the aerial vehicle.

In an embodiment, the UAV may employ redundancy in the wireless communication channels in order to improve the robustness of the communication between the UAV and the external sources. For example, a communication may be duplicated on the various wireless channels such that, if one channel is jammed or otherwise interfered with, the communication may still be transmitted on the other wireless channels. This technique would at least help with the unintentional interferences from other devices as the chance would be smaller than multiple channels would be simultaneously used and be interfered with. In a preferred embodiment, the UAV may use two such wireless channels for redundancy purposes while also avoiding using too many wireless channels, thereby leading to inefficient use of the wireless channel resources.

In another embodiment, channel hopping techniques may be used to minimize the interferences by continuously hopping to one or more channels that have minimal noise or other interference. This may also help with the general security of the communication as an attacker would need to also know what channel(s) the communication would be on.

In another embodiment, the communication may be through one or more external devices or systems in direct communication with the UAV. For example, the UAV may be in direct communication with a human controller through radio wireless channel. The UAV may also be in direct communication with a base station connected to a network (e.g., the Internet) that can route such communication to the human controller also connected to the network. The UAV may still also communicate with an airspace control service (e.g., an ATC) through a protected channel, which may act to relay certain navigation information to the human controller (e.g., through receiving and listening to the ATC channel for that airspace).

In additional embodiments, other techniques as known now or may be later derived may be used in avoiding intentional or unintentional wireless channel interference or in establishing and keeping at least one stable communication link between the UAV and the external sources.

Also, the UAV may employ certain pre-programmed maneuvers and procedures in the event that a communication link is severed between the UAV and the remote operator (e.g., putting the UAV in some automatic operating mode). For example, the UAV may still be able to avoid other objects through the emergency object avoidance procedure, if available. In a preferred embodiment, the UAV may constantly keep track of suitable landing sites for landing (using an automatic landing procedure), if the communication link is not reestablished within some time (e.g., a threshold time) or if it is determined to be unsafe. In another embodiment, the UAV may broadcast its status (e.g., a "mayday" signal) and allow other remote operators, which may be verified remote operators (e.g., those authorized as secondary operators or those licensed by a government or private agency), to control the UAV (for the purpose of landing or bringing the UAV to a safe environment); such remote operators may include (and be prioritized to) landing sites nearby that have capabilities to control the UAV (e.g., for landing).

With respect to the general interception or impersonation of the communication link between the UAV and the external sources, in an embodiment, the UAV and the external sources may establish secure communication channels through encryption, authentication, verification (including third party verification from an authority or other organization), and other secure communication channel techniques or procedures as known now or may be later derived.

The UAV may also employ additional security procedures to minimize the effect of a secure communication breach in case that the breach does occur. In an embodiment, the UAV may be limited to setting its flight plan only while it's grounded and/or being in an authorized ground facility (e.g., a verified hub for the UAV). Additionally, the flight plan may be transmitted to the UAV through a secured direct link (e.g., a wired link) between the UAV and the facility. As such, in an embodiment, when the flight plan of the UAV is not able to be changed once the UAV is airborne, an impersonator would not be able to control the UAV for alternate use even if it was able to gain access to the UAV (e.g., by spoofing the communication with the UAV as a legitimate controller). In such UAVs, an acceptable control from a controller may be to land at a nearby authorized ground facility in order to change the flight plan, if needed. This arrangement may be preferred for a UAV that is part of a fleet and would not need deviate from an established flight plan. In other embodiments, access or change to other parts of the control by a remote operator may be restricted as needed.

In an embodiment, the UAV may also restrict various components of the UAV from being used or the information obtained from these components during a flight be accessed by a remote operator. For example, a UAV may restrict sending images or videos recorded by the on-board camera to the remote operator (e.g., when the UAV is expected to fly over certain sensitive areas or private properties where the UAV has a right to passage but not to film due to privacy), as such images or videos may be intercepted by a third party. In such cases, the remote operator may still rely on other components such as the orientation and the navigation components of the UAV to operate the UAV through IFR flight. In a further example, even when the UAV has been transmitting the images or videos from the on-board camera to the remote operator, the UAV may be instructed to stop transmitting such information and/or to even turn off the camera if it will be passing through a sensitive area with such regulatory limit.

In an embodiment, the UAV may be required to receive and carry out instructions by entities (e.g., government agents such as law enforcement or owners of private properties that the UAV is flying over and has instruction rights to the UAV when the UAV is over such properties) that may override the remote operator (e.g., as programmed in the UAV). For example, such entities may issue an order to disable or ground the UAV, either in a broadcast or through direct communication with the UAV (e.g., in order to check the UAV for carrying contrabands or drugs). In the case of cross-border operation of the UAV (e.g., through domestic or international border), a payload carrying UAV may also communicate with the appropriate government entity a manifest of the payload and may be commanded to land for inspection.

In an embodiment, such entities may want to commandeer the UAV for further access to the UAV's components or to direct the UAV for the entities' use or for other purpose. These entities may or may not have more rights than the remote operator to the components of UAV depending on the regulatory limits and/or other factors (e.g., where the remote operator is limited from changing the flight plan while the UAV is airborne as discussed above).

In an embodiment, all or selected activities of the UAV may be logged. Access to such logs may be restricted according to the accesser (e.g., which may not include the remote operator) and the conditions of access (e.g., not available through a wireless communication link while the UAV is airborne). For a human remote operator, present or future regulations may require flight logs to be kept and for the human operator to log certain flight hours (experience) to qualify for certain levels of UAV operations by certification (e.g., without a flight supervisor, for non-visual line-of sight (VOL) flights, camera flights, long distance flights, simultaneous multiple UAV operations, etc.). Such logs may be kept for other purposes including quality control, investigation, or other purposes and may be stored in a separate secured and survivable component of the UAV (e.g., analogous to a black box in an aircraft).

Payload Delivery and Fleet Management:

In embodiments, a UAV may be used to carry and delivery a payload (e.g., a physical package to be delivered from person A to person B). This is preferable as UAVs could provide low-cost and convenient of "door-to-door" service without a person leaving a location or requiring another person to facilitate the delivery process (e.g., picking-up and delivering the payload).

Figure 4A:
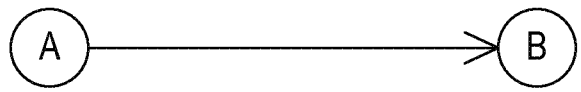
FIGS. 4A-4D illustrate exemplary scenario of a payload delivery system using UAVs according to an embodiment.

For example, referring to FIG. 4A, in a "point-to-point" delivery scheme, person A wishes to send a payload to person B. If person A is within the flight range of a UAV (to person B), person A may load the payload onto the UAV and fly the loaded UAV to person B (e.g., through human remote control of the UAV in manual operating mode or through the UAV carrying out a flight plan from person A to person B in manual operating mode). In manual operating mode, the UAV may be controlled by a person (e.g., person A or another person) with visual line of sight of the UAV during the entire time when the UAV is in flight or through indirect sight (aided vision) (e.g., one or more or a combination of first person view of the UAV's flight as provided by the UAV's onboard cameras and third-person view of cameras along the flight path of the UAV when the UAV is visible in the visual range of the cameras).

Figure 4B:
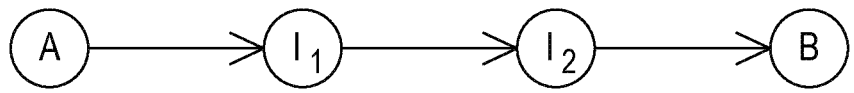

Extending from the previous example, referring to FIG. 4B, if person A is outside the range of one UAV (to person B), the payload may be delivered by a number of consecutive UAVs. Here, the payload is loaded onto a first UAV from person A and is carried by the first UAV to an intermediate point (e.g., intermediate point 1). At the intermediate point, which may be a UAV hub, the first UAV could be serviced (e.g., battery recharged or replaced, quick inspection, repair, and/or other servicing), or the payload could be transferred to another UAV for carriage to person B (possibly through another one or more intermediate points).

Figure 4C:

In another example, referring to FIG. 4C, person A wishes to send a payload to person B, but person A does not have a UAV available to carry the payload within the vicinity (or does not own a UAV). Here, person A can request a UAV to be sent to his location. For example, person A may own the UAV (located at a different location) and may instruct the UAV to move to person A's present location (e.g., through a command interface of the UAV). Person A may also not own a UAV but may borrow or rent one from a third party (e.g., from a delivery service through a rental request). In another case, person A may have part ownership of the UAV (e.g., in a timeshare manner, a number of owners, e.g., neighbors, within the immediate vicinity) with a number of other owners, since a person might not need to use the UAV at all times (e.g., person A may gain use of the UAV by a schedule or log tracking the uses the scheduled uses for each owner or authorized persons or by other managing methods). After the UAV arrives at person A's location, the payload may be loaded onto the UAV and sent to person B as discussed above. If person A has used the UAV from a third party, the UAV may be returned to the third party automatically (if person B's location is within a controllable service area of the third party). The third party may further stipulate that person A may only use the UAV in a controllable service area as a condition of use.

In other specific applications of the "point-to-point" UAV delivery scheme, shops may assume the role of person A in the examples as discussed above to deliver ordered products to a person B that is a consumer or other businesses. For example, person B may have ordered grocery, medicine, or other products (e.g., with a short shelf life requiring quick delivery) from the shop (e.g., online, through a phone, remotely by other methods, or onsite but could not carry the ordered products back). The shop could use a UAV to deliver the product to person B in a timely manner.

Figure 4D:
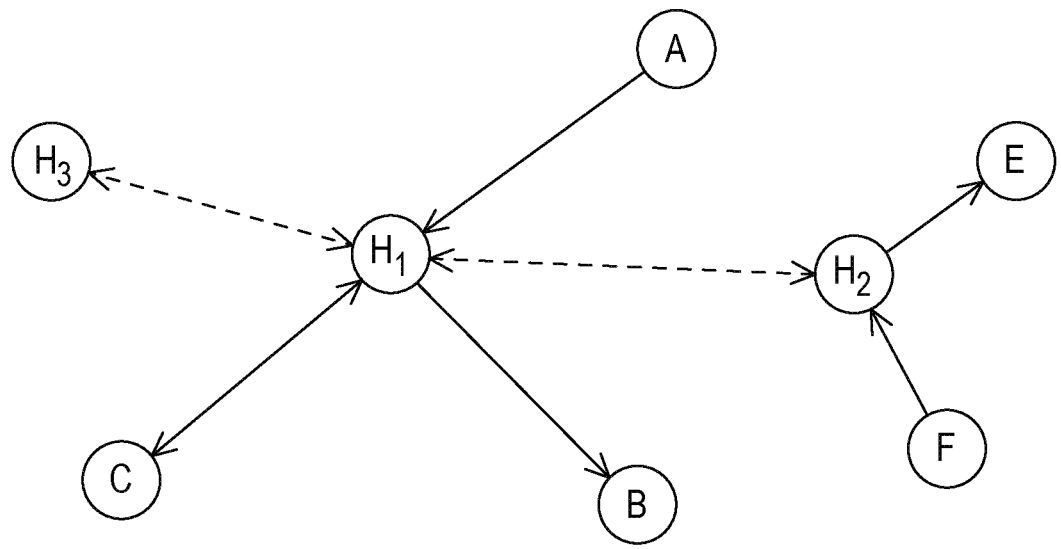

In another embodiment, a fleet of UAV may be used as part of a delivery network. Referring to FIG. 4D, the delivery network may include the hubs $H_1$, $H_2$, and $H_3$ for servicing persons A, B, C, E, and F by a fleet of UAVs. It is noted that each hub (e.g., $H_1$, $H_2$, and $H_3$) may be either a fixed or mobile installation. For example, hub $H_1$ may be a fixed facility at a terrestrial location (e.g., a warehouse location in town). Other hubs $H_2$ and $H_3$ may be mobile (e.g., the hub itself is movable from one terrestrial location to another in the form of one or more of a surface vehicle (e.g., a truck), a floating vehicle (e.g., a cargo ship/carrier), an aerial vehicle (e.g., a cargo plane).

In an embodiment, a hub may be configured to store and/or move (in the case a mobile hub) payloads and may act as a facility for launching and hosting one or more UAVs. For example, each hub may contain (host) one or more UAV, facilitating the take-off and landing of the UAVs (e.g., acting as a landing site for a UAV as discussed above). In a further embodiment, the hub may contain facility for automatically loading a UAV with a payload (stored in the UAV) and launching the UAV for carrying the payload to a destination (e.g., to person B). At the other end, the hub may be configured to receive (land) a UAV containing a payload and automatically unload the payload from the UAV for storage in the hub (e.g., from person A). The launching and landing site may be at a place of the hub convenient for such purpose (e.g., the roof of a fixed facility, truck, or ship or the undercarriage of a plane).

In an embodiment, the hub may contain UAVs of varying payload capacity and weight limit. For example, smaller UAVs may serve a larger range (e.g., because it has a lower power requirement) or saves more power (by being lighter), and larger UAVs may to able to carry larger or heavier payloads. As such, each payload may be matched to a suitable UAV (one or more UAV combined) for delivery (e.g., to person B). In a situation where a UAV needs to go to a site to pick-up a payload and return to the hub (e.g., person C), the UAV chosen may be one that is suitable to an anticipated payload to be recovered. In an embodiment, the allocation of UAVs for delivery may account for other factors such as the number of available UAVs of each type, the expected arrival of other UAVs available for reuse of each type (and their time of arrival), the availabilities or expected availability and needs of UAVs of hubs nearby or at longer distances, and other factors.

In an embodiment, the allocation of the UAVs and payloads may be distributed across multiple hubs. For example, if hub $H_1$ has a present need for a specific type of UAV and hub $H_2$ is nearby with an availability for the specific type of UAV, the UAV may move from $H_2$ to $H_1$ to be used by hub $H_1$. For payloads, payloads may also be moved around to the various hubs (carried by the UAVs or physically moved by moving the hub). For example, even if the hub $H_2$ is in range to deliver a payload by one of its smaller UAV (e.g., person C), the hub $H_2$ may lack such a type of the smaller and may instead move the payload to hub $H_1$ for delivery of the payload. Further, multiple payloads may be carried by a single UAV (e.g., a UAV with a larger capacity) from one hub to another hub for distribution by multiple UAVs of the another hub. In an embodiment, a logistic system may be developed for tracking and arranging the UAV fleet and the delivery network.

In an embodiment, the UAVs may be controlled by an operator (e.g., in manual operating mode) that is stationed within the hub or through another control facility (that may be at another hub).

In a further embodiment, movable hubs may be moving (e.g., when the UAVs are launched on an airborne plane) or have moved after a UAV is launched, and the UAV may not be able to return back to the same hub (e.g., because the mobile hub may have left the area and the UAV is unable to catch up with or is out of range of the hub). In such situations, the UAVs that were launched may stay at its location (e.g., the payload's location if the UAV is attempting to pick up a payload until the hub or another hub returns within range of the UAV). For example, a surface hub (e.g., a truck) may be in a vicinity for a daily pickup and delivery pass once a day. A UAV may be launched by the hub to a location for pickup of a payload during the pass but the location is out of range for a same day return of the UAV (same day pickup). As such, the UAV may wait for the hub's daily pass the next day to return to the hub with the payload. In another situation, the UAV may move to another hub (e.g., another mobile or fixed hub) that may be in range. Alternatively, the another hub may have further launched a UAV to the location for the pickup of the payload and the UAV carries the payload to the surface hub for transport. Such logistics may also be accounted for by the logistics system as discussed above and herein in this disclosure.

Tracking and on and Off Premise Use:

In embodiments, one or more of the UAVs may track individuals (and/or objects) and be put for various uses. In an embodiment, the UAV may be provided with or have knowledge of locations of individuals (and/or objects) with methods and systems as disclosed in U.S. Pat. No. 6,952, 181, entitled "Locating A Mobile Station Using A Plurality of Wireless Networks And Applications Therefor," herein incorporated by reference, or by other methods and systems as known now or may be later derived. In another embodiment, the UAV may track an individual (and/or objects) directly through its sensory components through methods such as facial recognition, object tracking, RFID, or other methods as known now or may be later derived.

In an embodiment, the UAV may be used for locating a person for picking up or delivering a payload, either on or off a premise. For example, in an on premise environment (e.g., a totally indoor environment such as a building, a mall, a movie theater, etc. or an outdoor environment that has a set boundary (which may have some indoor environments) such as an amusement park, ski resort, etc.), the UAV may be asked to deliver a payload to a tracked individual or to approach a tracked individual to pick up a payload. For a tracked individual, the UAV would be able to plan a flight path to the individual if the individual is still on premise. If the location of the individual is not presently accessible to the UAV (e.g., behind closed doors), the UAV may move to a location as close as possible to the individual and wait until the individual goes to an accessible location.

For an off premise environment (or if the individual went off premise from an on premise environment) and an in premise environment with weak locationing technology, the UAV may rely on locating methods and information tracking the individual off premise (if the configuration of the UAV allows it to move off premise) or off the on premise locationing grid. The UAV may also need to decide if it can reasonably reach the individual (e.g., within the range of the UAV and perhaps able to return to a hub) or if the tracking of the individual is reliable or can continue to be reliable (e.g., in an area where there is an adequate method for locating the individual). The UAV may decide the task to be unreasonable or impossible and abort.

In an embodiment, the individuals may be tracked on premise even if the identity of the individual is relatively unknown. For example, in some locationing methods, an individual may be tracked based on the electronic signatures of the devices the individual is carrying (e.g., an electronic identifier of a handset). In an example, an individual may have been tracked at a store at a mall after making a purchase, but the individual has either forgotten or otherwise did not pick up the purchase. The UAV may be able to deliver the purchase to the individual as the individual has been tracked when it made the payment at the register, even without knowing other identifying information regarding the individual.

In an embodiment, the UAV may be used to deliver on-the-spot information or other materials to a tracked individual, such as broadcasts or announcements (e.g., from the UAV carrying a mobile display, speakers, etc.) or other materials or content.

In an embodiment, one or more UAVs may be configured to follow and/or operate within a vicinity of a tracked individual.

For example, the UAV may be configured to carry certain payloads while following an individual. Effectively, the UAV acts as a "mule" carrying payloads for the individual (e.g., carrying tools and/or equipments for workers, sportsman, tourists/visitors). In one specific example, a worker working in a high attitude environment (e.g., an antenna service man) can rely on the UAV to carry the needed equipments obviating the need to carry the equipments himself.

In another example, one or more UAV may be configured to follow and/or operate within a vicinity (e.g., an arrangement of the UAV as discussed above and herein in this disclosure), carrying various components and modules for various purposes. For example, a number of UAVs may be arranged to take photographs of an individual at various positions and angles (e.g., at a ski slope where the individual skiing down at a high speed). For another example, the UAVs may be in position to provide lights and cameras at a movie set (e.g., a high speed car chase scene) at various positions and angles. For yet another example, the UAVs may carry displays and speakers at various positions and angle for theatric or other performance effects.

Service Deployment Platform:

In an embodiment, one or more UAVs may be used (and may be in an arrangement as discussed above and herein in this disclosure) for deploying a needed service to an area.

For example, in various military or civilian applications, services such as a communication network may need to be deployed to an area. In an arrangement, UAVs (having a communication module) may set up a communication network (e.g., an ad-hoc wireless network) over a certain area. For example, the UAVs may be arranged in a line pattern extending the communication range to the end of the line. In a further example, the UAVs may eventually form a net pattern providing redundancy to network covered by the UAVs once enough UAV is available to form the communication net.

Also, once the communication network is available or in conjunction with the setup of the communication network (or some other communication method is available such as through a satellite), other UAVs may be able to operate within the area providing other resources, such as light, communication (e.g., wireless communication through the network or visual and audible communications such as cameras and display and microphone and speakers) to individuals within the area (e.g., a disaster area having its preexisting infrastructure destroyed). The other UAVs may also provide payloads of needed supplies (e.g., food, medicine, etc.) even if the area is not immediately accessible to humans outside of the area.

In another embodiment, the one or more UAVs may be used to deploy services from a platform (e.g., a vehicle, boat, plane, human carrier, etc.) within the vicinity of the platform (e.g., extending the range of a platform). For example, in detection and tracking uses, the UAVs may be used for finding games (e.g., using cameras or other equipments in a hunting use) or finding schools of fishes (e.g., using sonars or other equipments in a fishing use) in an extended area. In another example, the UAV may be launched from a vehicle (e.g., a car) for finding parking spots ahead of the vehicle reaching the location (e.g., a parking lot).

UAV Long-Felt Needs and Challenges

The emerging UAV industry can have an enormous, positive impact on several military strategies and traditional civilian industries and governments world-wide. For example, in transportation shipping and delivery, the so-called home delivery to the "last-mile" has the highest percentage costs. One research firm estimated that 23 to 78% of the supply-chain delivery cost of a typical consumer purchased item, results from the delivery expense to the home or last-mile[1]. Particularly in the Internet-based instant gratification eCommerce industry, home delivery "is the battlefront in retail".[2] Transportation costs will likely rise in the future. Municipalities struggle to improve roads, traffic and congestion while attempting to lower taxes, to an increasingly dense population 1 ChainLInk Research, Ann Grackin, "The Year of the Last Mile", pub. Dec. 11, 2014, Website URL: http://www.clresearch.com/research/detail.cfm?guid=3283C1FB-3048-79ED-999E-536DD384B656, herein incorporated by reference 2 ibid, ChainLink Research, Bill McBeath article, "Home Delivery", 2013, website: http://www.chainlinkresearch.com/homedelivery/index.cfm, herein incorporated by reference Ideally at the point of ordering and sales, the retailer's ordering systems should have the means to dynamically offer a variety of delivery options, based on, for example, knowledge of available transport route capacity, customer package delivery acceptance times and dates, delivery route driver drop density, road and traffic congestion. In addition it should be possible to identify alternative, suitable drop-off locations such as non-related business offices, parks, open fields, and brick-and-mortar businesses (to name a few). Alternative package drop-off locations could be proposed based on knowledge of the customer's typically frequented traveling places, such as trusted neighbors, office(s) of friends and family members, shopping areas and the like.

Coupling the location of the customer's potential pickup locations for package receipt, with a continuously optimized retail delivery supply chain model, would provide more variety and efficiency in managing the home delivery costs and optimizing customer experience and repeat-business loyalty. Smartphone and Internet-based web applications with data access to the purchase transaction and delivery data and alternatives, could be designed that provide the customer and retailer with better choices, delivery times, and dynamic location tracking and routing of the package, with respect to the customer's current location and/or alternate delivery location.

The notion of same-day delivery of medicines is a critical adjunct to telemedicine applications such as video-based doctor visits using, for example, Skype video and sound communications. Moreover, patient connected health-sensor devices, could relay their data to the patient's smartphone via, for example Bluetooth. A smartphone application could then relay the medical data, along with a live video stream of the patient, to the doctor, for diagnosis and treatment. Since the timely dispensing of pharmacological drugs from the doctor to the patient can be critical in certain life-or death situations, having a reliable and robust home delivery means for timely patient drug delivery can result in saving lives. Amazon is requesting that the FAA allow Amazon drones/UAV to deliver patient medicine to the patient having a smartphone. The patient would acknowledge the acceptance of the medical package with a visual siting of the drone/UAV, then the drone props the package to the patient with the smartphone.

A. UAV Landing Stations (for Re-Charging Package Re-Distribution, UAV Repair,

As UAV cannot remain airborne for significant periods of time, and may carry relatively heavy packages, a means to improve range and reliability includes a plurality of UAV stations for in-route landing and take-off. These UAV landing station(s) may include means for automatic, semi automatic, or manual UAV battery replacement, UAV repair, and package re-routing and temporary storage. Relatedly, US Patent Publication No. US20120078451 A1, "Automatic Taking-Off and Landing System", pub. Mar. 29, 2012, herein incorporated by reference, describes a means to manage the physical take-off and landing of a flying object. These claims are directed to UAV landing-takeoff of the UAV repair, battery and other subsystem replacement means, and package receipt, relay and forwarding. Several means can be used to implement a physical wiring connection and disconnection between electrical devices on a UAV and a landing—Takeoff Station (LTS). A physical inverted cone consisting of small rods, are used to physically guide the UAV along a near-vertical path onto the center of LTS. At the center of the UAV landing point, an electrical connector mates into a similar, but opposite gender electrical connector located on the UAV. A slight vibration, either on the UAV or the LTS connector, along with the weight of the UAV, is used to seat or mate the two electrical connectors onto each other. The connector design may be of an existing design, such as a universal serial bus (USB), or a USB-like connector, or a customized connector design for this application. The LTS connector provides power and data connectivity to the UAV subsystems. An electrical or optical sensor can optionally be used to verify that a suitable physical connection has been achieved. If such connection has not be achieved, the UAV can be instructed to lift off, and re-attempt to land again onto the LTS electrical connector. This process may have to been repeated until an adequate electrical connection has been achieved. A customized USB may consist of, for example, the arrangement of four USB connectors in a slotted cone design, such that the UAV connector easily mates with the LTS connector, via remote control and airborne flight maneuvering. Optionally, one or more magnets may be used to further improve the mating connection of the two connectors. Optionally a holder having a plurality of surfaces that are shaped to contact a plurality of outer surfaces of an electronic device, and to secure the UAV onto the UAV landing position, the UAV electronic device including a wireless power receive element(s) configured in a cone shape, coupled to the UAV power and/or data circuits, and a resonant, cone shaped circuit contained within the LTS landing point area, said resonant circuit including a coil antenna that is tuned to a frequency and configured to, when in operation, receives power or transfers bi-directional data from a nearby wireless field generated by a LTS transceiver system. This scheme would not require a physical electrical connection, to recharge the UAV battery(s). A UAV having modular components, and a LTS having a mechanized gripping device, it is possible to arrange a computing machinery-controlled, or manual means, to repair UAV components. For example robotic arms on the LTS can be used to remove and replace various UAV components, such as the rotor assembly, rotor arms, cameras, gyroscopes, and related assemblies.

Often UAV may include a mechanized grabbing or holding device, to carry a package/container. The device may include, for example, converging opposed cylinder or solenoid-operated finger arrangements which pivot together to close about a package or similar container for gripping and open to release said package or container. The said UAV—LTS connection may include data interchanges, such as digital messages from a computing system connected to the LTS, to cause the UAV grabbing device to release, or pickup, an existing or new package/container.

B. UAV Group Routing, UAV Re-Routing, Package Temp. Storage, Re-Delivery

A conveyor belt other physical package movement system, positioned below the UAV LTS, could be used to collect and move away, a UAV dropped package, or to provide a new package/container to the UAV, for its pickup. The new package may be a re-routed package due to a change in scheduled delivery, a return package, temporary safe storage of the package, rain or other flight restriction delays, or similar situations. UAV LTS may be positioned on top of moving or vehicles, buildings, cleared areas in trees, antenna towers, cliffs, boats, ships, balloons, other aircraft, etc.

Ideally the UAV LTS is near a source of power, although alternatively solar and/or wind power could be used to provide electrical energy to operate the UAV LTS and recharge the UAV.

Numerous situations may require that a UAV change its flight path from an intended or scheduled path, to an emergency or alternative path. In certain cases, for example, a UAV may become excessively hot, low on battery power, subject to RF jamming, or sensors may detect that it is under attack, or a UAV may encounter a control message to change flight path, or to return to a safe base (i.e., LTS), recharge it's battery, change packages, etc. Ideally a fleet of UAV travel in a coordinated manner, along paths such that any given UAV is within landing distance of a LTS. Having a plurality of LTS provides improved safety, and reliability of UAV, delivery services, and other related benefits to successfully carry out a given UAV mission plan.

C. Security Updates

Hijacking, of UAV radio communications, denying digital service, and jamming principles are well-known in the UAV art. Significant adversarial countermeasures include:

1.) Use of a plurality of separate RF and/or optical wireless communications (OWC) bands, including Wi-Fi, cellular and private RF bans, and free space optics (FSO), in particular, ultraviolet communication (UVC). Although OWC requires gumball-mounted, highly focused antenna systems, several companies now offer light weight hardware-software solutions to dynamically position antennas to support FSO and UVC. One example of a vendor product for airborne Long-Range Laser optics communications is Aoptics' Laser Comms system. A particularly light weight quantum cascade laser (QCL) system suitable for UAV OWC applications is Pranalytica's Model 1101-XX-QCW-YYYY-EGC-UC-PF, fixed frequency Laser system using the 3.8 um to 12 um wavelength Mid-infrared range (MIR) band, with up to 1 Watt of continuous power. This MIR, QCL power, weight technology combination is well-suited to provide robust ultra-high speed data communications with UAV(s) and their corresponding control and data collection antenna(s), across a wide variety of distances (several km) and adverse atmospheric conditions[3].

[3] "Corrigan, Paul, Martini, Rainer, et al, "Quantum Cascade Laswersand the Kruse Model on Free Space Optical Communications", Dept of Physics, Stevens Institute of Technology, Hoboken, N.J., 2008, Optical society of America, herein incorporated by reference.

In contrast, $CO_2$-based lasers require more power (and thus added weight to the UAV), and also scatter the beam more so than the QCL MIR technology. The longer wavelength, MIR QCL technology is more suited to free space optical communications because it implements a longer wavelength beam that is much less affected by fog, particulates and rain.

On the UAV(s) and the operator's computing device(s), a light weight, bandwidth aggregation router is configured to relay packets, ideally VPN bonded packets, across separate radio bands, then recombined at the far-end, endpoint. This network method can provide additional bandwidth to end-point packets if multiple network paths are available. Alternatively if several wireless networking paths fail, end-point packets will be routed across any available mid-point paths, to improve endpoint reliability. Use of a plurality of radio and OWC links, provides improved Bandwith aggregation and communication reliability. Router vendors include, for example, PepLink, Mushroom Networks, Fusionappliances, D-Link Fuzion Broadband Aggregation Router, Cisco ASR 1000 Series Aggregation Services Router, and Patton's Man-portable unit, model BODi rS BD004. Current bonding/aggregation and balancing technology typically supports up to seven simultaneous RF channels, including multi-carrier 3G, 4G/LTE, VSAT and multiple WiFi bands.

2.) Full encryption of RF digital communications signals, including headers and addresses. Examples of digital packet protocols include Secure Real time Protocol (SRTP), with AES 128 or 256 bit encryption. One example of a freely available protocol system is Bitmessage. Bitmessage could be used aboard a UAV and its end-operator's computing platform, to allow the UAV operator to securely send and receive messages, and to subscribe to broadcast messages, using a trustless decentralized peer-to-peer protocol means, similar to BitCoin. Users need not exchange any data beyond a relatively short address to ensure security, and would not require public or private keys. In particular, non-content data, such as the sender and receiver address details, are masked from those not involved in the private communication. A public paper by Jonathan Warren describes the Bitmessage system: "Bitmessage: A Peer-to Peer Message Authentication and Delivery System", Nov. 27, 2012, herein incorporated by reference. An example of another secure real-time messaging system is Peter Zimmermann's ZRTP protocol. It is described in IETF's RFC 6189, "ZRTP: Media Path Key Agreement for Unicast Secure RTP", Apr. 11, 2011, herein incorporated by reference.

3.) Full encryption of UAV data-at-rest, stored on, for example, hard disks and solid state storage devices. An example of a freely available product is TrueCrypt. The UAV operator specifies a password to the program which provides real-time encryption for the data residing on the permanent storage media, used on the UAV and the operator's computing device. Should the UAV fall into the wrong hands, the hard disk data would remain encrypted unless the password were known. Additionally, hidden disk partitions could be deployed for particularly sensitive data, using a separate password.

Figure 5:
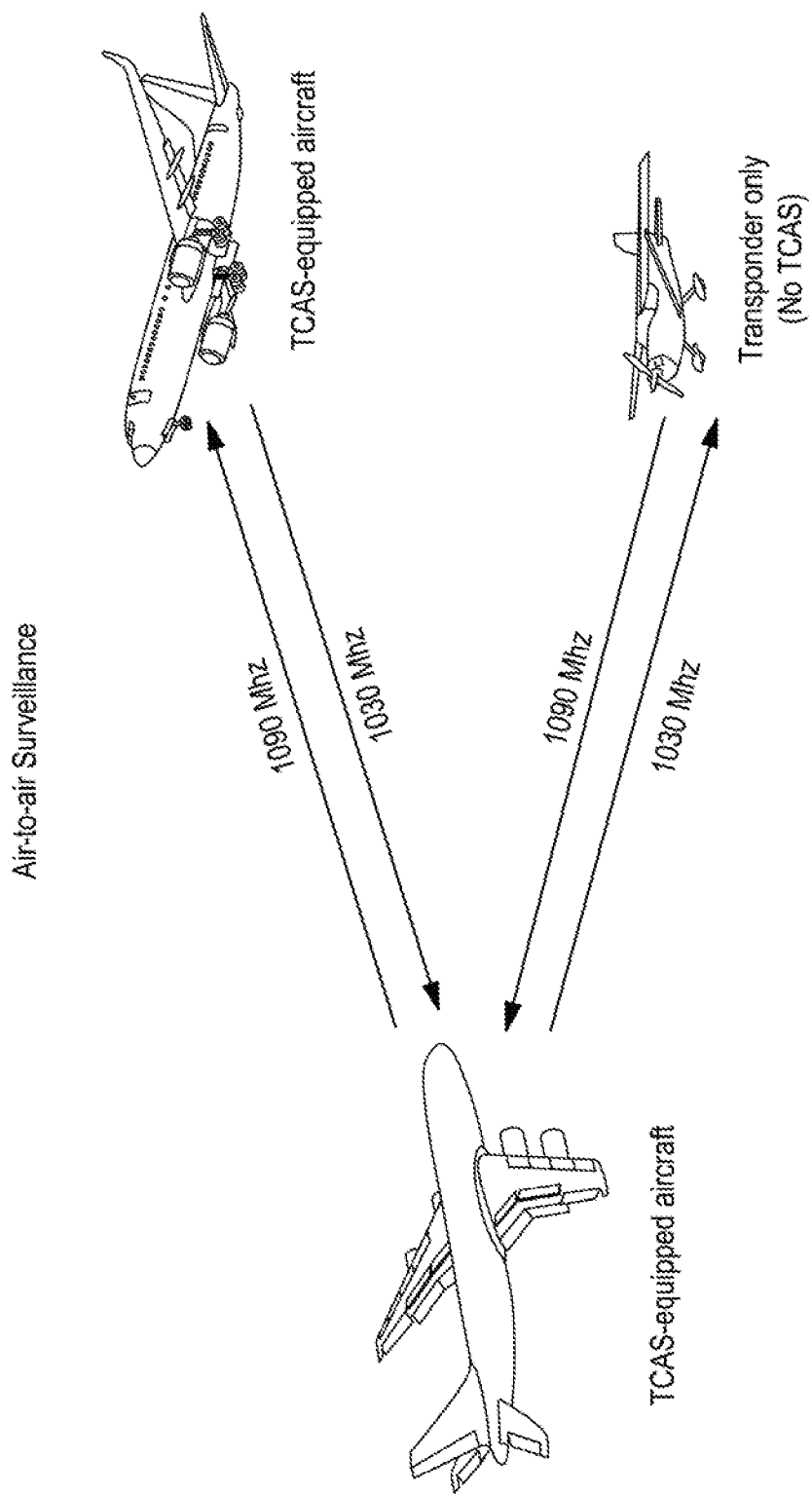
FIG. 5 describes the traditional air-to-air surveillance methods using the 1090/1030 MHz band RF links to provide other aircraft information about each other.

FIG. 5 describes the traditional air-to-air surveillance methods using the 1090/1030 MHz band RF links to provide other aircraft information about each other. Another newer band, 978 MHz, is also used for this purpose, in a Universal Access Transceiver (UAT). Typically the weight of such systems has been significant, thus lightweight UAV may not be very effective in carrying an individual ABD-S surveillance system.

Figure 6:
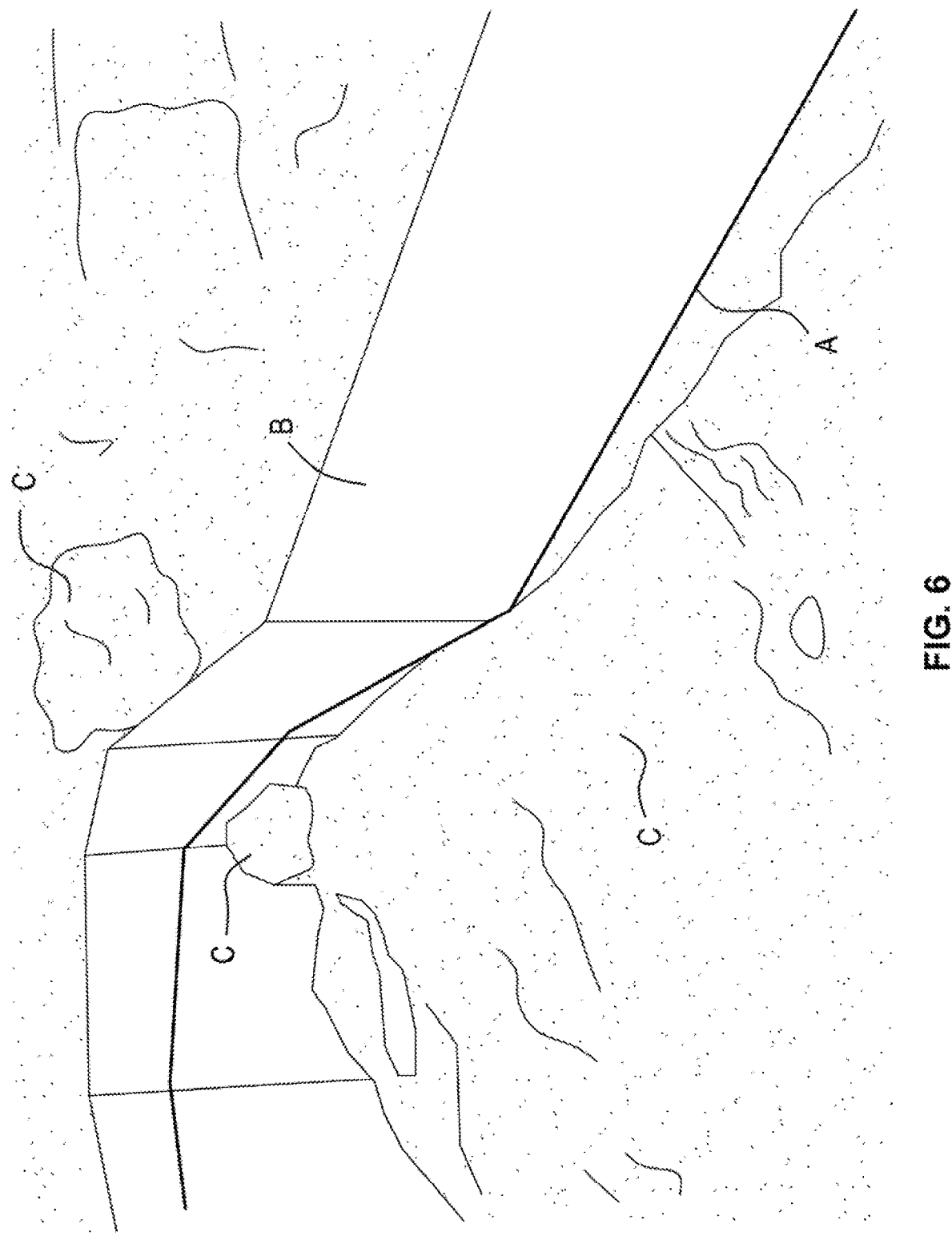
FIG. 6 shows a UAV package delivery flight path corridor and absolute, "NO-FLY" zones according to an embodiment.

FIG. 6 shows a UAV package delivery flight path corridor (labeled A and B) and absolute, "NO-FLY" zones (labeled C). There are in fact many constraints that will likely restrict package delivery UAV, thus giving rise to the need to develop UAV flight-corridor path management solutions.

Figure 7:
FIG. 7 shows an allowed flight area consisting of a horizontal corridor, a "NO-FLY" zone in red, and an accepted vertical drop-off path according to an embodiment.

FIG. 7 shows an allowed flight area (labeled C) consisting of a horizontal corridor, a "NO-FLY" zone, and an accepted vertical drop-off path (labeled B).

Figure 8:
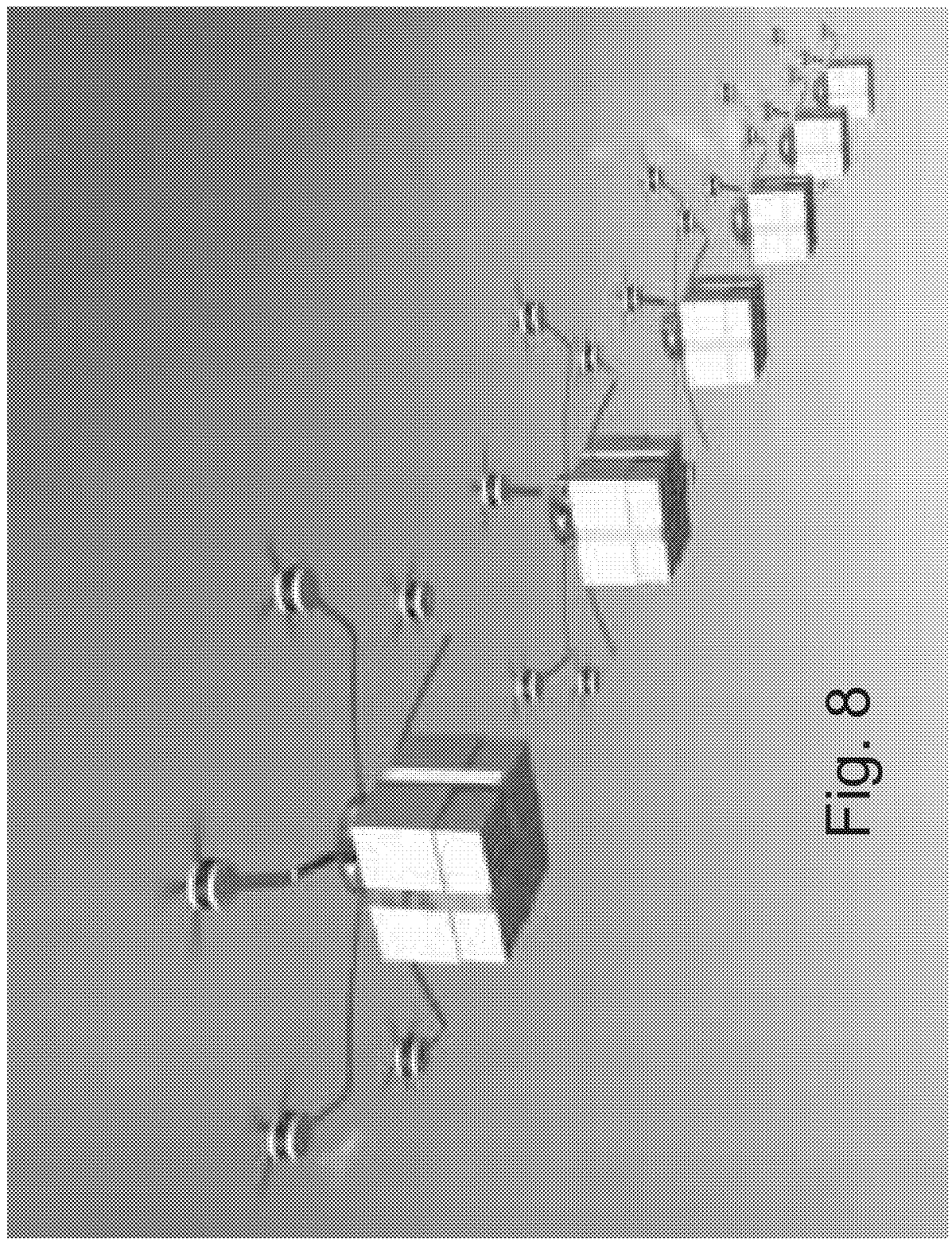
FIG. 8 shows a depiction of package delivery UAVs flying along a flight corridor according to an embodiment.

FIG. 8 shows a depiction of package delivery UAVs flying along a flight corridor.

Figure 9:
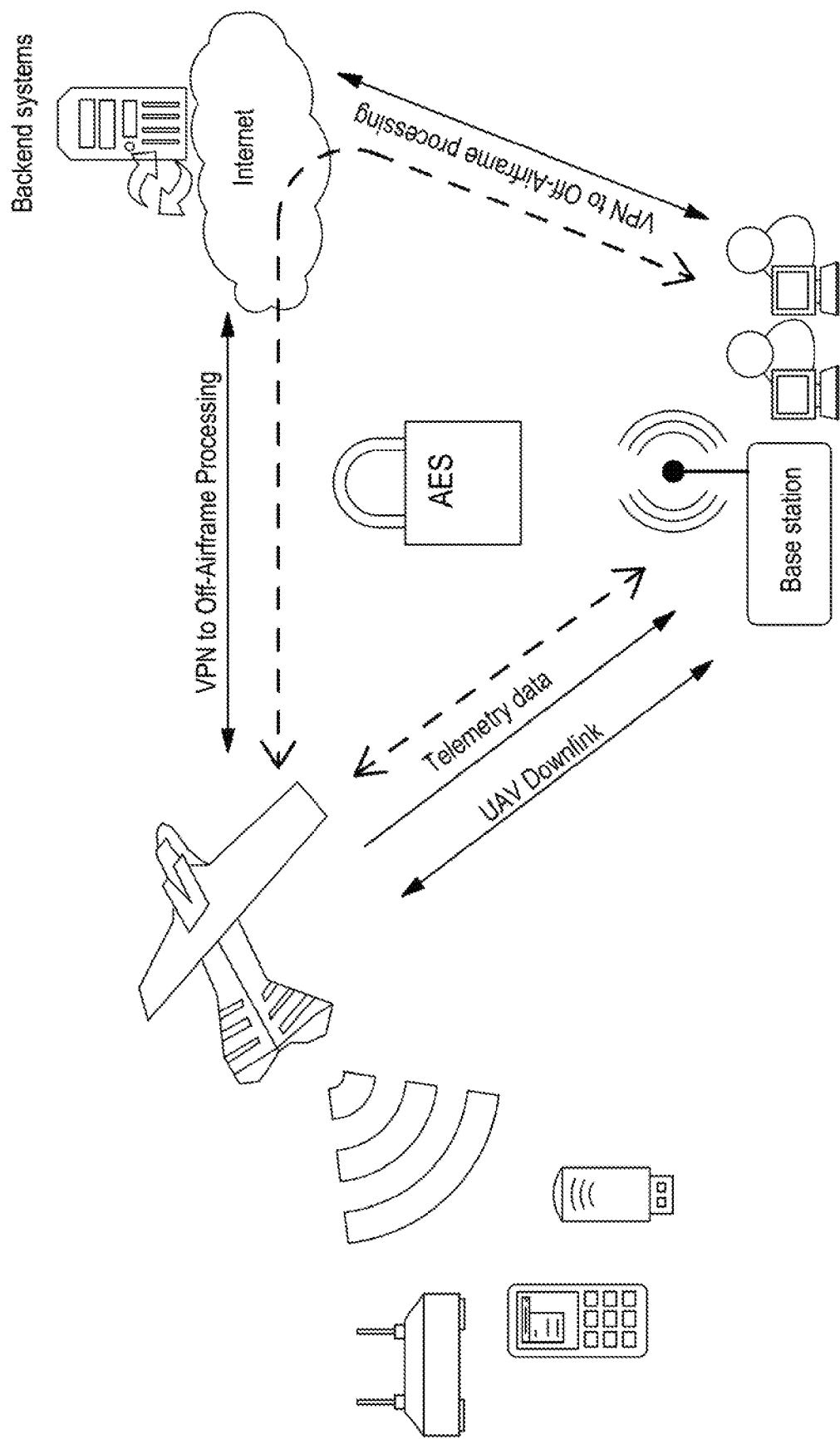
FIG. 9 illustrates how UAV RF communications can be secured using virtual private networks (VPNs) or tunnels, along with packet encryption, such as AES, according to an embodiment.

FIG. 9 illustrates how UAV RF communications can be secured using virtual private networks (VPNs) or tunnels, along with packet encryption, such as AES.

Figure 11:
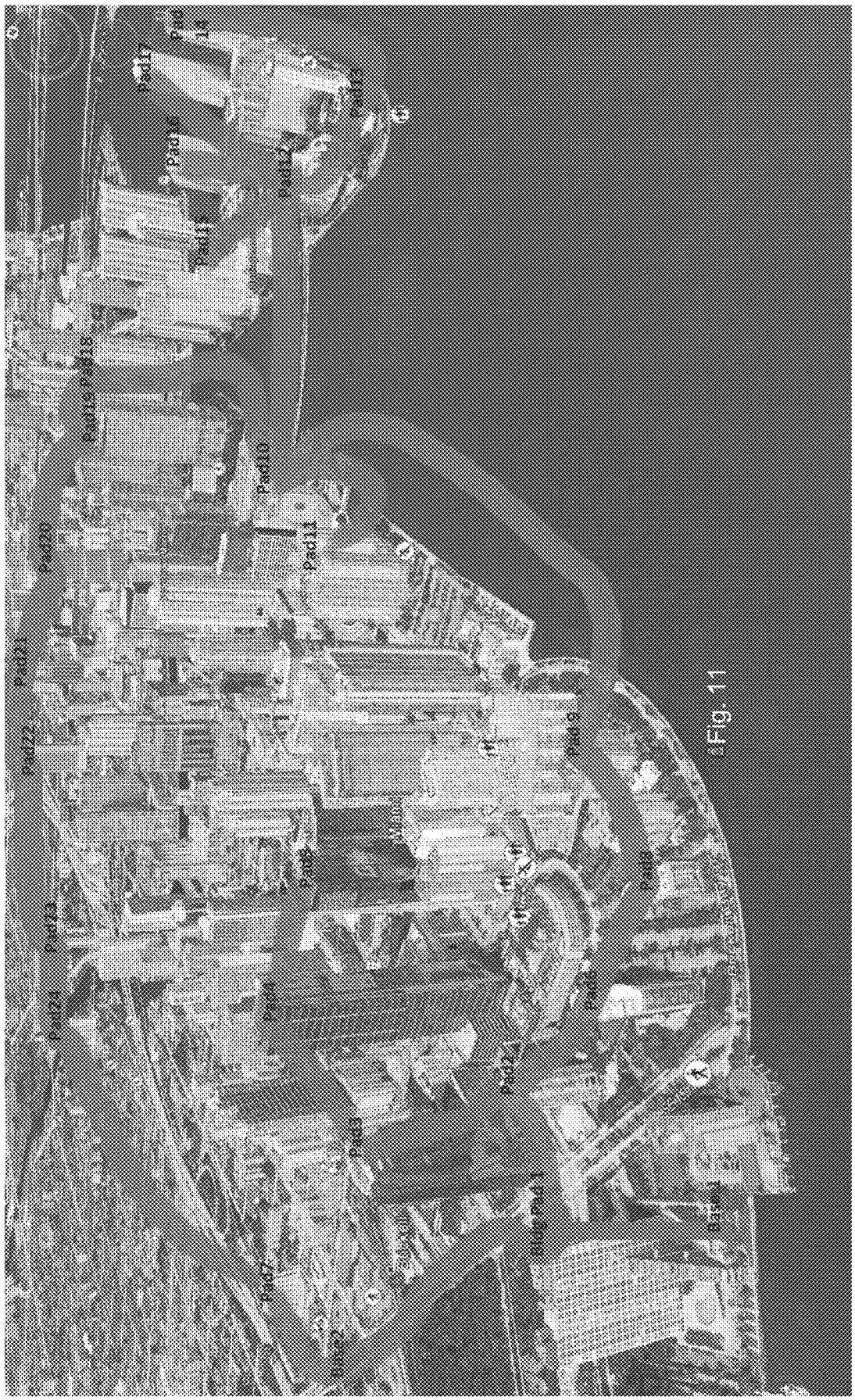
FIG. 11 illustrates a UAV flight path corridor system according to an embodiment.

FIG. 11 illustrates a UAV flight path corridor system according to an embodiment.

1.) A commercial UAV flight corridor system is defined for major metro communities or other geopolitical areas, that capture agreements between various end-users (package receipt customers), military, governments (local, county, federal), safety issues, landowner constraints, etc. These agreed-to UAV flight corridors need to be managed, and UAVs within them, to avoid collisions inside the corridor.

2.) Each corridor link or path leg, between landing/takeoff pads has the notion of UAV density. New UAVs that enter the 3D UAV flight path Corridor system must be managed, and have flight paths that do not conflict with the current traffic flow within a corridor or link/leg. Obviously a corridor could fill to capacity, thus adding new UAVs to a high density corridor/leg would introduce unsafe flying conditions. the density may change unexpectedly over time, due to various uncontrollable abnormalities such as birds, unidentified aircraft, sudden unacceptable wind conditions, etc.

3.) Keeping the density below some threshold is good, because it may be required to stop an entire flight corridor segment/leg/path, to allow for a flock of birds to pass, to allow for other aircraft to pass safely, or to reverse the entire flight corridor to account for dangerous windy conditions or some new/unplanned social/legal/military constraint set (E.G., NFL football/military operation in the area, etc.).

4.) Tiered UAV flight planning and management: Since the agreed-to UAV package flight corridors constrain UAVs to fly within a relatively tight area, each UAV within the flight corridor path needs individual, fined-tuned flight management. Each UAV, as a minimum, needs sensors and radio telemetry electronics and radios for RF mesh/cell tower data communication. However due to weight and power constraints it is unreasonable for each UAV to have a significant amount of on-board control and management electronics, UAT transponders, etc. It is reasonable to have one or more 'dynamic control ship(s), or DCS" UAV, within a flock of UAVs, to include no payload delivery packages, but to have a UAT aircraft surveillance transponder server, as well as local flight management computing server that micro-manages a small flock of UAVs. Each UAV may have per-defined flight path instructions pre-programmed, prior to launch, but dynamic conditions need management control instructions that must take priority. Notions exist for overall path trip planning and management, consisting of collections of flight corridors. At another tier, flight control is needed within a corridor, to maintain individual UAV flight safety, maintain UAV flight within the corridor, and keep density below some defined threshold, to allow for orderly and optimized flight.

5.) The need exists to halt or even reverse UAV in flight corridors, to create an open space for unplanned aircraft or birds/other flying objects. In this case, a DCS UAV, nearby, so that strong RF links would not be required, is an ideal means to provide local control RF messages to nearby package UAV. The DCS would also have higher-powered RF systems to facilitate longer-range communications, perhaps also using FLIR lasers to sense and manage package UAV, and to communicate with ground base stations.

6.) The need exists to manage corridor density to optimize overall delivery time, and to balance with various constraints such as time, battery remaining, UAV refueling, etc.

7.) UAV Landing/Takeoff Pads: these could be maintained by building owners or other third parties. Landing/takeoff pads can be used to repair UAV, replace batteries, charge batteries, Accept and receive packages for alternate and/or supplemental delivery means, such as local bicycle couriers. Pads may be constructed with complex electronics/sensors to guide the last few flight meters of distance and location to an exact landing/takeoff location spot on the landing pad. Alternatively the landing pad may incorporate electromechanical, or purely mechanical means to facilitate the easy landing and takeoff of a UAV, without the requirement for advanced electronics/sensors for the last few flight meters. Pads might use cone-like structures to allow easy flight controls to drop the UAV into the cone structure, for easier battery replacement, recharging, package receipt and submission, and similar functions. The pad could also be a modified U.S. Post box with a top that opens to allow for a UAV to drop a package into the U.S. mail box. A means to weigh its contents, then relay that info via Wi-Fi, Bluetooth, or other means, back to a user's Ethernet network, would allow customers to learn that new mail, or a package has arrived in their mail box.

Figure 12:
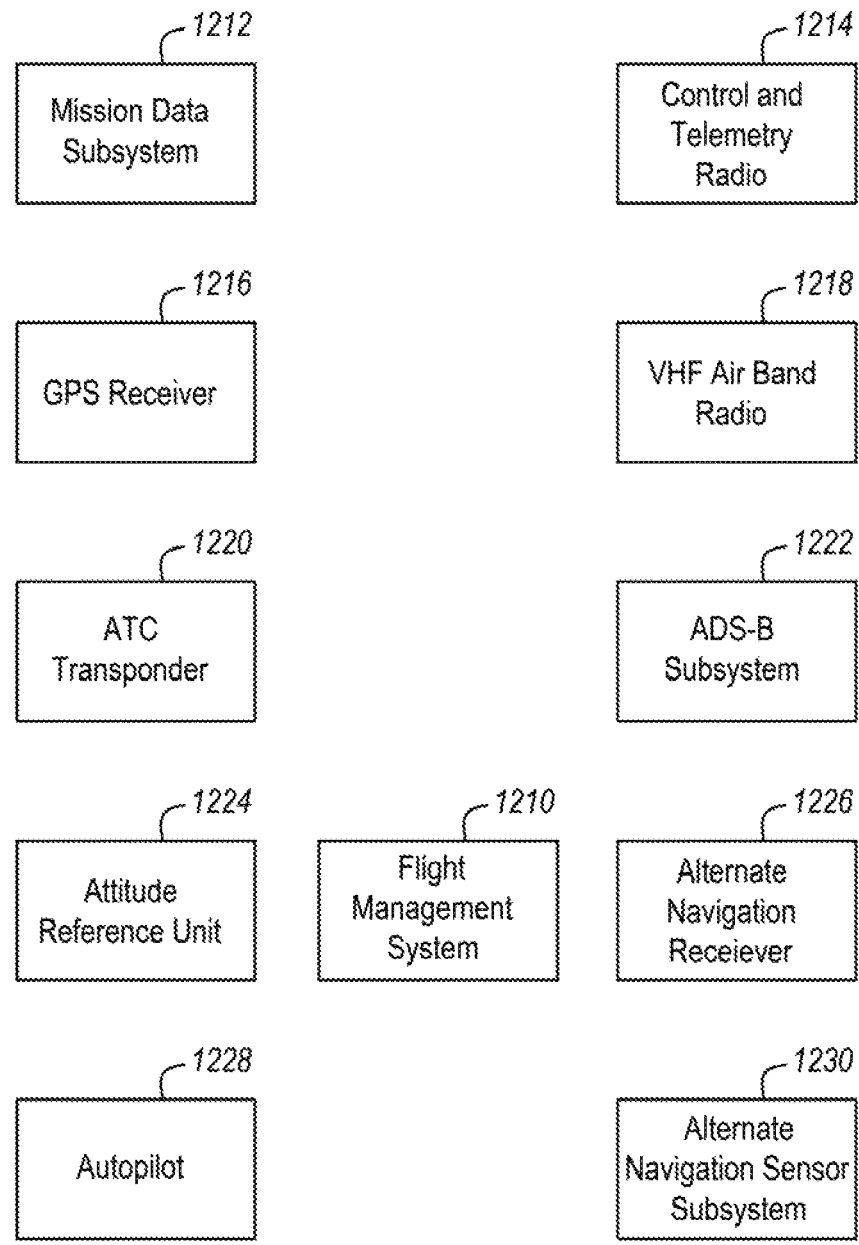
FIG. 12 illustrates an exemplary block diagram of an avionics systems for a UAV according to an embodiment.

Communication UAV System:

FIG. 12 illustrates an exemplary block diagram of an embodiment of the avionics system 1200 for a UAV (which may be an embodiment of the UAV 100).

Referring to FIG. 12, the avionics system 1200 that includes one or more of a flight management system 1210, a mission data subsystem 1212, a control and telemetry radio 1214, a GPS receiver 1216, a VHF air band radio 1218, an ATC transponder 1220, a ADS-B subsystem 1222, an attitude reference unit 1224, an alternate navigation receiver 1226, an autopilot subsystem 1228, and an alternate navigation sensor subsystem 1230. With reference to FIG. 1, the avionics system 1200 may have analogs in the various components of the UAV 100 as one of ordinary skill in the art can appreciate. For example, the flight management system 1210 may be analogous to or included in the control system 110 (the UAV control system 110 may also include the mission data subsystem 1212 and the autopilot subsystem 1228 in the flight control components 170). In one embodiment, the control and telemetry radio 1214, the VHF air band radio 1218, and the ATC transponder 1220 may be analogous to or included in the communications components 120). In one embodiment, the GPS receiver 1216 may be analogous to, or included in, the geolocation components 130. In one embodiment, the ADS-B subsystem 1222 and the alternative navigation receiver 1226 may be analogous to the navigation components 140. In one embodiment, the alternate navigation sensor subsystem 1230 may be analogous to, or included in, the sensory components 160. In one embodiment, the attitude reference unit 1224 may be analogous to, or included in, the orientation components 150.

In an embodiment of an UAV having the avionics system 1200 such a UAV may be used as a specialized communications station for communicating with and/or relaying communication to and/or from other UAVs or stations within an operational area of the UAV having the avionics system 1200. As discussed above, UAVs and other airborne vehicles in general each have a payload (or cargo) weight limitation (e.g., the amount of weight the UAV can carry while in airborne operation). Further, additional payload weight (whether or not the payload weight limitation is reached) can adversely affect the fuel or energy or other resource consumption and usage of the UAV (e.g., a UAV with a heavier payload will use up more energy to stay airborne and/or move than a similar UAV with a lighter payload). Additionally, the duration of operation of the UAV may also be affected by the weight of the payload (e.g., a UAV with a heavier payload may shortened continuous airborne operation time compared with a similar UAV with a lighter payload; thus requiring the heavier UAV to potentially land to recharge or replace its fuel or battery more frequently).

As such, it is desirable to limit the weight of payloads of a UAV. One way to increase the weight payloads is to limit the weight of the equipment onboard the UAV. For example, for a UAV that is used mainly for delivering payloads or packages (e.g., a UAV as discussed with references to FIGS. 4A-4D), it may be desirable for the UAV to carry only the necessary equipment for flight operation such that the acceptable weight for the payloads is maximized. For example, a delivery UAV may only require the necessary radio (e.g., a control and telemetry radio) for the operator controlling the UAV and other flight control components but would not necessarily need other communication components (e.g., VHF radio or other high bandwidth communication radio for carrying other communications). In another example, it may be desirable for a UAV used for photography or videography (e.g., with a camera payload) to include a high bandwidth radio to transmit captured photographs or videos in sufficiently real time in high quality but since such a high bandwidth radio may not be necessary for flight, the radio be dispensed with in order to reduce the weight of the UAV.

For some environments, it is desirable to have a specialized communication UAV for communicating and/or relaying communications with other UAVs, in the operational area of the communication UAV, in order to allow these other UAVs to perform their designated tasks (e.g., transport cargo). In an embodiment, the communication UAV may include a first communication component (e.g., a short range radio). In an embodiment, the communication component may operate in an unallocated spectrum (e.g., Wi-Fi, 900 Mhz, or other unlicensed bands) for receiving and/or transmitting communication with the other UAVs. The other UAVs may correspondingly have a similar communication component for the communication. Such radio communication may be of a relatively short range (less than ¼ miles or 0.4 kilometers); accordingly, the power requirement and correspondingly the weight of the communication component may be reduced. Further, the interference of such radio communication may be acceptable for operation in the unallocated spectrum.

In an embodiment of the communication UAV, it may further include a second communication component for communicating and relaying communication to a radio receiver (likely a transceiver) operably wirelessly coupled in a wireless network with geographically dispersed plurality of network transceivers for providing wireless communications over a geographic area much larger than the coverage area of anyone of the network receivers or transceivers. Such a radio receiver (likely transceiver) is referred to as a "communication point" herein. Note that such a communication point may be supported on the ground, airborne, in space, and further may be mobile, or substantially fixed in its location. Further, such a communication point may be wirelessly (or otherwise) connected to a particular network (e.g., the Internet) for the transmission of communications. For example, such a communication point may be a cellular fixed location base station providing a point of presence (POP) to the Internet. Note that the second communication component may operate in an allocated spectrum since communication from or to the second communication component may be longer range and may need more protection from interference. Also, the second communication component may provide for directional communication signal to a communication point (e.g., a directed signal to a terrestrial base station). As such, the second communication component may include a directional antenna and a mechanical system for moving the directional antenna (towards the communication point). Accordingly, such a second communication component may be relatively heavy in comparison to other UAV communication components.

In operation, the UAVs within the operational area of a communication UAV may effectively relay communication using lighter communication equipment through the communication UAV in order to access an outside network. Such a communication UAV may be considered a pico-cell within a wider operational wireless area, wherein, e.g., the communication UAV is used for extending a range of a cellular network.

In an embodiment, multiple communication UAVs may be deployed in an enlarged operational area (e.g., an operational area beyond the range of a single communication UAV). In this arrangement, the multiple communication UAVs may form a mesh network coverage within the operational area for providing communication for UAVs in the operational area. In another view, the communication UAVs may form an ad hoc pico-cellular wireless base station group for providing wireless communications to other UAVs that otherwise would not have adequate wireless communications. In one embodiment, such communication UAVs are geospatially arranged (in 3D space) in a formation to enhance wireless communications between, e.g., cargo transport UAVs, and between such cargo transport UAVs and a particular network (e.g., the Internet). In one embodiment, several of the communication UAVs may be arranged in a serial formation such that an ad hoc daisy-chain, thereby forming a wireless network in a longitudinal 3D space. The formation may be used to provide various communications services, such as on-the-fly cellular hot-spot coverage in areas of marginal or no current cellular/Wi-Fi coverage exists.

In one embodiment, such a communication UAV may include two or more of the second communication components for communicating with two or more communication points. For example, one of the second communication components may communicate with a first communication point (e.g., a cellular tower) and another of the second communication components may communicate with another communication point (e.g., a communication satellite or another cellular tower at another location). Accordingly, the second communication components may need to have separate antennas (e.g., directional antenna) for their corresponding wireless communications. In one embodiment, such a communication UAV may be oriented to facilitate the separate communication components in transmitting and receiving a signal of sufficient signal strength with the other communication points. For example, depending on where the directional antennas are located on the communication UAV, the communication UAV may configure itself to allow a maximum separation of the communication signals when the directional antennas are oriented to accept the signal from their respective communication points.

In an embodiment, the communication UAV may employ channel bonding techniques through the two or more separate communication components for communicating with the respective two or more communication points. For example, the separate communication components may be communicating with two cellular towers of two different carriers or service providers at different spectrum. As such, channel bonding techniques may be used for aggregating communications through the separate channels for increased bandwidth, redundancy, or other desirable effects. In a more generalized example, a number of alternative wireless channels/networks, such as Ku-Band, military, public safety, aeronautical bands, may be used to provide the wireless communication services through channel bonding. This may also include expanding the data network capacity via the multiple paths of backbone communications, to increase overall bandwidth between various endpoints. Either same-carrier or cross-carrier channel aggregation may be used. For example, cross-carrier data channel aggregation is utilized where such mutual cell or Ku-band coverage is available, to enable increased bandwidth-handling capacity. In another example, same carrier channel aggregation may be used by transmitting a directed signal to two cellular tower of the same carrier in opposite directions.

In an embodiment, a non-UAV communication station may be used in place of a communication UAV for operations by the communication UAV as discussed above and herein in this disclosure. For example, the non-UAV communication station may include the communication components (e.g., the control and telemetry radio 1214, the VHF air band radio 1218, and the ATC transponder 1220), the geolocation components (e.g., the GPS receiver 1216), and/or the navigation components (e.g., the ADS-B subsystem 1222 and the alternative navigation receiver 1226) but lack the control systems and/or the piloting components (e.g., the autopilot system 1228) that would control and/or maneuver the UAV while airborne. As such, the non-UAV communication station may be able to detect, control, manage, communicate/provide communication, and/or provide other functions to UAVs within the operational area of the non-UAV communication station but non-UAV communication station would not be capable in active airborne operational deployment. In an embodiment, the non-UAV communication station may be deployed ground-based, on top or at the side of large buildings, or at other suitable locations.

In an embodiment, a number of communication UAVs and/or non-UAV communication stations operating in an aggregate operational area may form a communication UAV system that provides at least communication service for other UAVs in the aggregate operational area.

In an embodiment, the communication UAVs (individually or collectively) may be deployed at various locations, including unplanned locations (as opposed to predetermined locations such as a UAV corridor) to establish and provide of an ad hoc network servicing other UAVs and/or other network devices (e.g., portable devices such as smart phones used by the user directly). Since UAVs may operate at an elevated height (e.g., airborne), the communication UAVs may be suitable replacement for cellular or other radio towers providing wireless communication to an area. In an embodiment, the communication UAVs may be deployed at locations where existing communication infrastructure is inadequate (e.g., lacking or damaged) to provide a temporary extended communication access. In an embodiment, the communication UAVs may also provide a mesh network for other UAVs operating in the area (e.g., for other UAVs that may be carrying payloads into the area). This is particularly applicable to military (e.g., establishing communication and/or logistics to a battle front), events (e.g., establishing and/or bolstering the communication infrastructure in an area with an unexpected, temporary mass of people), disaster relief, urban planning and/or construction, and other applications.

In an embodiment, a communication UAV may also be include (or be controlled by) algorithms, robotics, and/or artificial intelligence for finding and determining a position where it can be deployed (e.g., in the deployment scenario discussed above). For example, the communication UAV may select an optimal area for deployment based on finding an area of weak communication coverage (thereby maximizing the communication UAV's usefulness). The communication UAV may also select an area that maximizes its communication coverage area (e.g., by selecting to operate at a location with a large amount of expected users). Also, the communication UAV may consider minimizing the use of its resources (e.g., to prolong its operational duration). For example, the communication UAV may select to dock to a high object (e.g., top of buildings, lamp posts, towers, hills) so that it does not need to expend energy to hover. Further, the communication UAV may consider that some areas it may be prohibited or discouraged to operate in (e.g., private property, restricted airspace). As such, in an embodiment, a communication UAV (or another system deploying the UAV) may consider the various factors for an automated deployment.

Aerial Traffic Services:

In an embodiment, a communication station (e.g., either UAV or non-UAV) may also include communications with aerial traffic and/or collision avoidance systems and/or services.

A recent Department of Transportation (DOT), Federal Aviation Administration (FAA) Notice of Proposed Rulemaking (NPRM), docket no. FAA-2015-0150; Notice No, 15-01, herein incorporated by reference, pg. 29, notes that UAVs must comply with the see-and-avoid requirement of 14 CFR part 91, § 91.113(b) in order to integrate civil small UAV operations into the National Air Space (NAS). Pg. 21, notes, " . . . small unmanned aircraft are unable to see and avoid other aircraft in the NAS. Therefore, small UAV operations conflict with the FAA's current operating regulations . . . specifically, at the heart of the part 91 operating regulations is 91.113(b), which requires each person operating an aircraft to maintain vigilance "so as to see and avoid other aircraft". Pg. 30 notices, "At this point in time, we have determined that technology has not matured to the extent that would allow small UAV to be used safely in lieu of visual line of sight without creating a hazard to other user of the NAS or the public, or posing a threat to national safety. On pg. 20, The DOT/FAA further explains, "[a]lthough ground-based radar and the Traffic Collision Avoidance system (TCAS) have done an excellent job in reducing the mid-air collision rate between manned aircraft. Unfortunately, the equipment required to utilize these widely available technologies is currently too large and heavy to be used in small UAV operations. Until this equipment is miniaturized to the extent necessary . . . existing technology does not appear to provide a way to resolve the 'see and avoid' problem with small UAV operations without maintaining human visual contact with the small unmanned aircraft during flight."

As such, a critical solution is the enablement of a system or means to inform other aircraft (manned and unmanned), of the location, identification, and movement direction of aircraft. Aerial traffic and/or collision avoidance systems and/or services are essential in directing traffic and/or avoiding collisions among aerial vehicles in controlled and uncontrolled airspace. Aerial traffic services may include one or more or a combination of an automated service and/or a human operator controlled service. For example, an automated service may be predominately machine controlled and operated for directing traffic and/or avoiding collision. In another example, a machine assisted service may use inputs from one or more automated sensors, radars, or other inputs that describes the airspace to determine and provide alerts and/or instructions to a human operator of an aerial vehicle and/or the service. In another example, a human operator controlled service relies on the human operator of an aerial vehicle and/or the service to provide alert, instructions, and/or control of aerial vehicles in the airspace. Some aerial traffic service technology currently in use or proposed include Air Traffic Control (ATC), Traffic Collision Avoidance System (TCAS), and Automatic Dependent Surveillance—Broadcast (ADS-B).

ATC is a service provided by ground-based operators (air traffic controller) who direct aircraft in a controlled airspace and on the group. As such, ATC functions to organize air traffic and to prevent collisions. ATC may also provide relevant advisory information and services (e.g., weather information) other support for aerial vehicle operators. The primary method of communication of an ATC with aerial vehicle operators are through voice communication over radio. The operator of the ATC have the information of the ground and airspace the operator is responsible for through a combination of the voice communications (from the aerial vehicle operators), visual observation (e.g., from a control tower), radar systems in the area (e.g., secondary surveillance radar), and other systems (e.g., surface movement radar (SMR) or surface movement guidance and control system (SMGCS)).

TCAS is a system for collision avoidance of aerial vehicles to reduce the incidences of collisions between aerial vehicles while airborne. TCAS is typically installed on an aerial vehicle for monitoring the airspace around the aerial vehicle and is equipped with a transponder for communication with other aerial vehicles in the vicinity. TCAS warns the operators of aerial vehicles of the presence of TCAS or other transponder-equipped aircraft when a threat of mid-air collision (MAC) is detected. TCAS may work independent of ATC and is mandated by the various national and international agencies (e.g., ICAO) for certain aerial vehicles. Communications from the transponders of TCAS is primarily as a digital message in a specified format.

Standardized radio and computing machinery systems employing the TCAS technology (and also ATC) to discretely address interrogation and data exchange beacon systems have been available for over 30 years to perform these types of tasks. Typically, a 200 watt digital transponder radio in the 1 GHz radio band (1090 MHz and 1030 MHz) is used to transmit and receive messages using a well-defined modulation and protocol format. These radio signal digital messages can be received and processed effectively by neighboring aerial vehicles and/or ground communications systems. Message types include broadcast, as well as query-response messages. Radio signals are used to provide a significant amount of useful information, including, for example, the aircraft ID, X, Y and Z position, speed, type of aircraft, direction, altitude, size, weight, etc. Various algorithms have been defined and are used to inform aircraft operators of potential collisions and provide means to inform of actions required to avoid a collision. In some cases, the equipment can be used to automatically prevent a collision.

An example of the current TCAS system architecture is described by Henley in 2001, "Introduction to TCAS II 2000," herein incorporated by reference.

More recent advances in technology have been introduced, such as TCAS III, TCAS-IV, and Automatic Dependent Surveillance-Broadcast (ADS-B), which use global position system information, and the time required to transmit and receive a radio signal (sometimes called the tau time). The tau time was useful when precise GPS data was not available, or trusted. A vector of the intruding aircraft could be calculated, along with the current aircraft, to determine the Closest Point of Approach (CPA) (of a collision). "Introduction to ADS-B," available at http://www.trig-avionics.com/knowledge-bank/ads-b/introduction-to-ads-b, is herein incorporated by reference.

As discussed above and herein in this disclosure, UAVs may have weight and other limitation that hinder or prevent the UAV from easily carrying numerous equipments (e.g., full TCAS and/or ADS-B types transponders and the associated antennas). Although UAV cannot easily carry TCAS and ADS-B types of transponders with antennas, this equipment could be placed in a near-by area of a UAV or a plurality of UAV. In an embodiment, a computational machinery server may be used, in communication with a secure, trusted wireless network of communications between and among UAV and a modified TCAS/ADS-B transponder system. Each UAV may provide the UAV transponder system with its individual identifier, flight data details, and/or other information. A planned and actual flight plan data set may also be stored in the TCAS/ADS-B transponder server for subsequent radio transmission, should real-time communications become lost, between a given UAV and the transponder server. Additional message types or unallocated fields in messages can be used to provide UAV-specific data that are not within the realm of manned aerial vehicle. Examples include whether or not a given UAV data is in real-time (actual), or stored/estimated. Other data may include category-specific data, such as commercial vs. government use, package delivery details, remaining time-in-flight, battery information, specific UAV flight restrictions, flight paths landing, and/or maneuvering and plans.

One implementation of a UAV transponder server system may use secured messaging within a public wireless band, such as a Wi-Fi radio frequency band. In a preferred embodiment, each UAV includes two digital transceivers, capable of operating on separate frequencies, or preferably, on separate bands. In separating, for example, the command and control messages from transponder server system messages, the UAV transponder server system may have the desirable effects of lower shared-media packet message congestion, less chance of data packet collision, and more reliability with the UAV transponder server system (UTSS). In an embodiment, as UAVs generally communicate wirelessly with a manned pilot control system, thus this same UAV position and flight data could be extracted and used as sensor data to the UTSS.

Several modifications may be performed to modify a standard TCAS/ADS-B transponder functions to a UAV TCAS/ADS-B capable transponder server system (UTSS). Current TCAS/ADS-B transponders are designed to receive signals from a group of sensors aboard a single aerial vehicle, and to transmit messages (either of broadcast or query-response type), based on a single aerial vehicle's data exchange. In an embodiment, a TCAS/ADS-B transponder for the UTSS may support multiple aerial vehicles in terms of the radio transmission side. In this case, multiple RF transmissions for multiple aerial vehicles could be supported by adding separate aerial vehicle query-response data registers, used to support a plurality of aerial vehicle data for radio transmission to other systems. In another embodiment, multiple separate sensor data registers and ways of populating these registers with a plurality of appropriate UAV sensor data groups can be added to the TCAS/ADS-B systems. Additional logic may be provided to coordinate switching control such that the corresponding aerial vehicle linkages are maintained between a given aerial vehicle's sensor data and the corresponding radio transmission query-response data for a given aerial vehicle.

In an additional embodiment, sensor and other data from multiple UAVs and/or other aerial vehicles in the vicinity may be aggregated by the UTSS as an aggregated dataset used in the communication and/or other purposes, for a more reliable and complete dataset. For example, data from sensors of various UAVs may give indications of the conditions in different areas of the airspace. Also, some of these data may be considered more reliable than others (e.g., a UAV or other aerial vehicle with better sensors, the aerial vehicle being closer to the area where the data is for, a fake or unreliable data due to equipment malfunction or malicious intent). The aggregation of the dataset may then be dependent on such reliability factors, and may be ranked or weighted when aggregated to the aggregate dataset. In an embodiment, the aggregated data may be used in place of actual data for a UAV. Alternatively viewed, the UTSS may act as a unified data source for supported UAVs in the vicinity with respect to the air traffic services such as TCAS/ADS-B.

In an embodiment, the transponder for the air traffic services (e.g., TCAS/ADS-B transponders) may be deployed on a communication UAV as discussed above and herein in this disclosure for providing the air traffic services to other UAVs in the operational area of the communication UAV, to facilitate coordinated communications among manned aerial vehicles, as well as other UAVs for a variety of reasons, including collision avoidance, with the UAVs. For example, the UAVs may communicate, through the mesh network, with the communications UAVs which may have the air traffic services transponders to obtain the associated data and/or to communicate with the various operators and/or parties of the air traffic services. As discussed, since general UAV radio systems may not be able to implement long-range communications, a message store-and-forward capability may also be implemented into the communication UAV and the associated mesh network (e.g., as opposed to a routed message system by the communication UAV). Various challenges exist in UAV radio communications, thus having a plurality of UAVs, with at least some in radio communications with a mesh network, to enable all UAV to communicate, is very desirable. By combining mesh networking (mesh network principles and implementations as known now or may be later derived) within a fleet of UAVs, and command and control, and TCAS or other air traffic service transponder capability, it is possible to satisfy DOT/FAA requirements for positive control, safety and see-and-avoid, and collision avoidance capability among all aerial vehicles for all UAVs in an area of interest.

In an embodiment, the UTSS may also be implemented in a communication UAV or in another stations (e.g., terrestrial station for an operational area).

Figure 10:
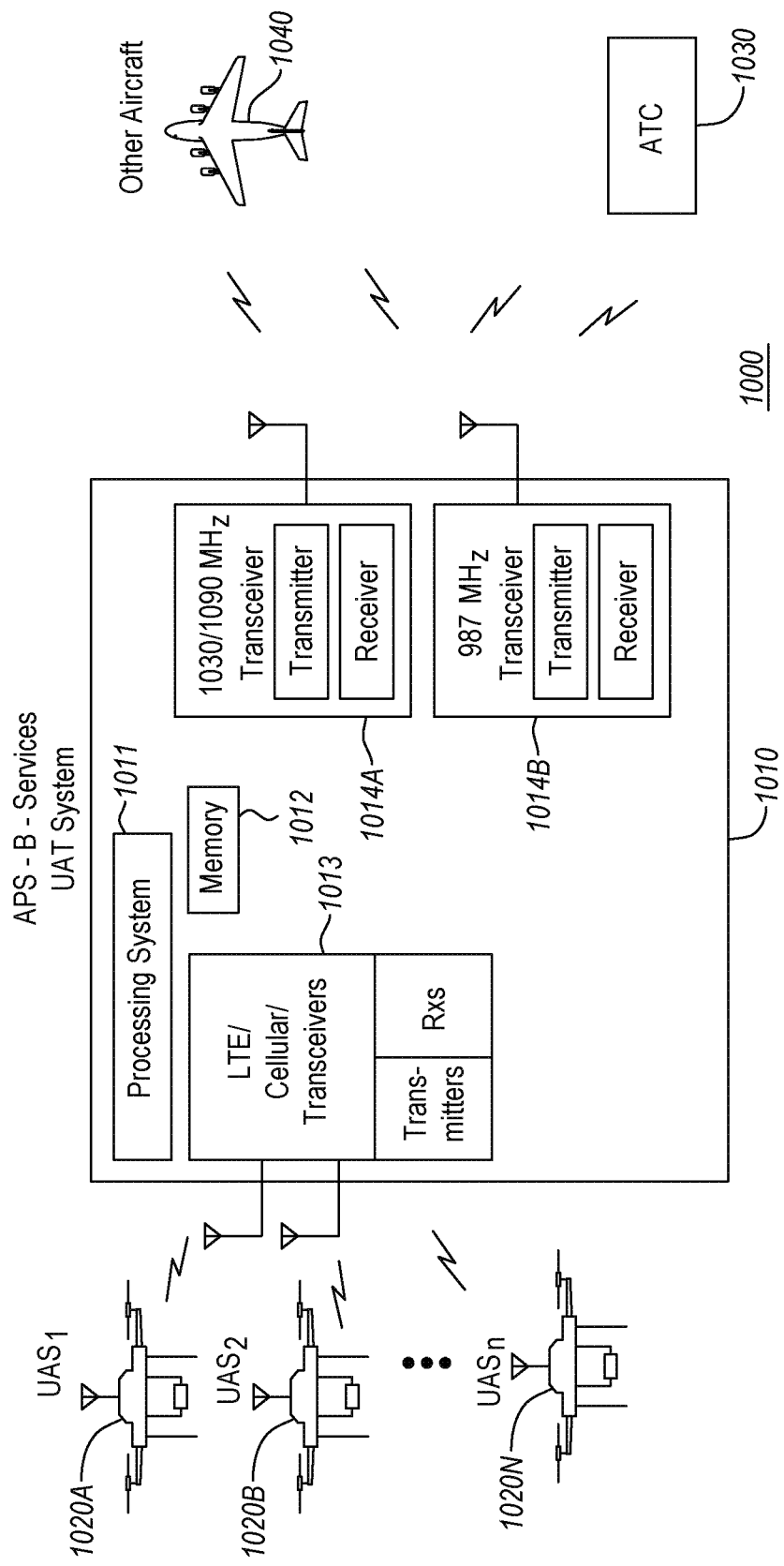
FIG. 10 illustrates a diagram of a UAT, ADS-B server-based system for multiple UAVs according to an embodiment.

FIG. 10 illustrates a diagram of a UAT, ADS-B server-based system for multiple UAVs according to an embodiment. In an embodiment, the UAT server-based system 1010 can be carried aboard one (or more, for redundancy) dedicated UAV (e.g., a communication UAV as discussed above and herein in this disclosure) or station within a UAV system 1000 in an accessible location (e.g., a somewhat central location) of a fleet of other UAVs 1020A-1020N. As discussed above, each UAV 1020A-1020N may send telemetry and other individual UAV-specific data, using a RF band (through transceiver 1013) separate from the ADS-B system (e.g., mesh network), to the UAT server 1010 carried by the dedicated UAV. This individual data includes for example, UAV identifier, latitude and longitude (e.g., from a GPS), altitude, and other related data. The UAT server 1010 stores each UAV's data, and schedules and multiplexes each UAV's data through the ADS-B Dual Band transceivers 1014A and 1014B. This scheme allows each the UAVs 1020A-1020N to inform other aerial vehicles 1040 and/or ATC 1030 of its whereabouts, without having the weight and power drain requirements of a dedicated UAT. The UAV carrying the dedicated UAT server 1010 may also include a processing system 1011 to provide communications back to a given UAV 1020A-1020N, for a variety of reasons. Example include flight-plan modifications where the UAT service 1010 acquires new information that one or more of the fleet UAVs 1020A-1020N is suddenly in flight danger from, e.g., birds, or other unknown objects that could affect the standard UAV flight path/safety. Examples of ADS-B transceivers may be provided by Aspen Avionics, available at http://www.aspenavionics.com/products/nextgen, herein incorporated by reference. Another example of ADS-B transponder includes the XPC-TR, XPS-TR, XPG-TR, and other transponder by Sagetech Corporation. Robert C. Strain, et al., "A Lightweight, Low-cost ADS-B System for UAS Applications," The MITRE Corporation, Case Number 07-0634, 2007, is herein incorporated by reference. U.S. Pat. Pub. No. 2012/0038501, entitled "Self-configuring universal access transceiver," herein incorporated by references, discusses a multiplexing server that submits individual UAV data to a central area-based ADS-B transceiver system.

In an embodiment, it is noted that ATC communications (and other voice communications in general) may be relayed through the communication UAV system. For example, voice communications from the ATC directed to a particular UAV (or a number of UAV) may be received by a communication UAV (or other communication station in the communication UAV system) through VHF radio and packetized and sent through the Internet (via a cellular tower or other point of presence) to an operator of the particular UAV. In another example, the communication UAV system may forward contact information (e.g., a VoIP address) of the operator of the a UAV to the ATC, where the ATC can then directly contact the operator using the contact information.

Figure 15:
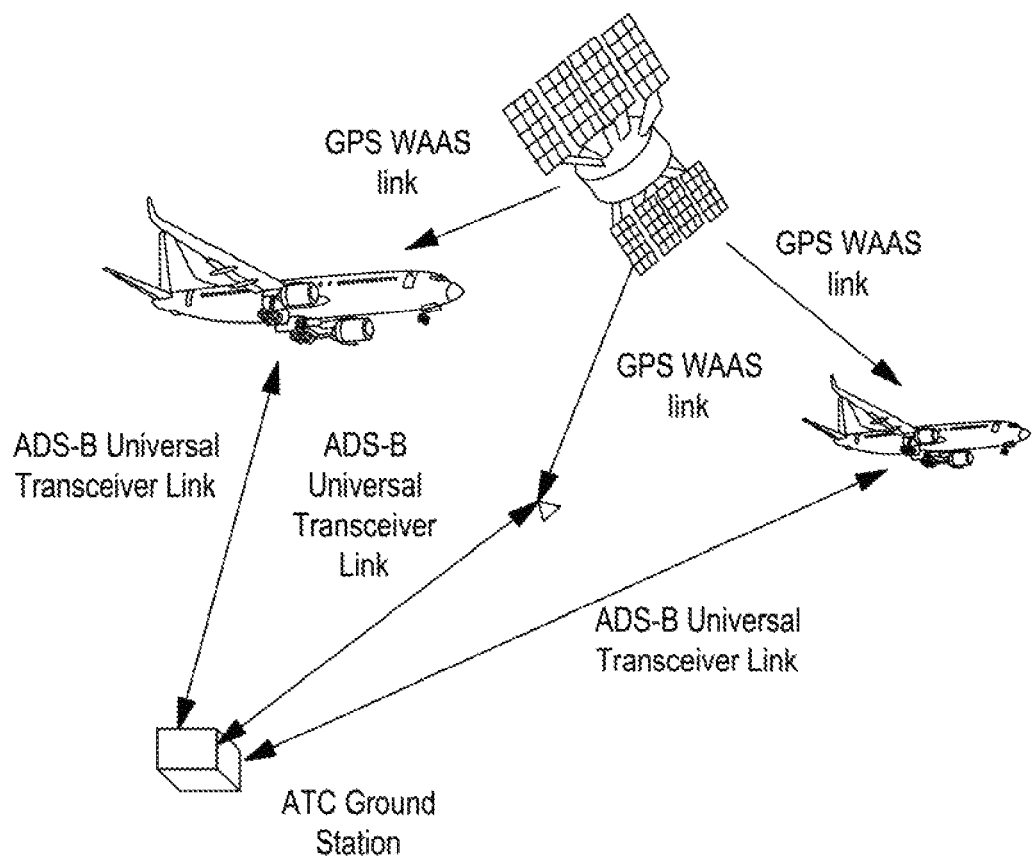
FIG. 15 illustrates an exemplary diagram of a layout of a general ADS-B system for a UAV system according to an embodiment.

FIG. 15 illustrates an exemplary diagram of a layout of a general ADS-B system for a UAV system according to an embodiment.

U.S. Pat. No. 9,274,521, entitled "Employing local, opportunistic automatic dependent surveillance-broadcast (ADS-B) information processed by an unmanned aerial vehicle ground control station to augment other source "knowledge" of local aircraft position information for improving situational awareness," which is herein incorporated by references, discloses a system and method for employing local, opportunistic ADS-B to augment other source knowledge of local aircraft position information for improving situational awareness in areas lacking ADS-B coverage provided by aircraft control agencies. Locally-received, such as in a vicinity of a UAV or sUAS, ADS-B positional information is received by a UAV, sUAS or associated ground control station and integrated on a display component of the ground control station, e.g., a pilot display, for the UAV or sUAS. In an embodiment, the UTSS and the UAT server-based system may be modified to implement the local, opportunistic ADS-B system and method. In a further embodiment, the local, opportunistic ADS-B system may be implement with and as part of the communication UAVs and system, UAV corridor system, flight management system, and other systems as disclosed herein.

Navigation

Figure 13:
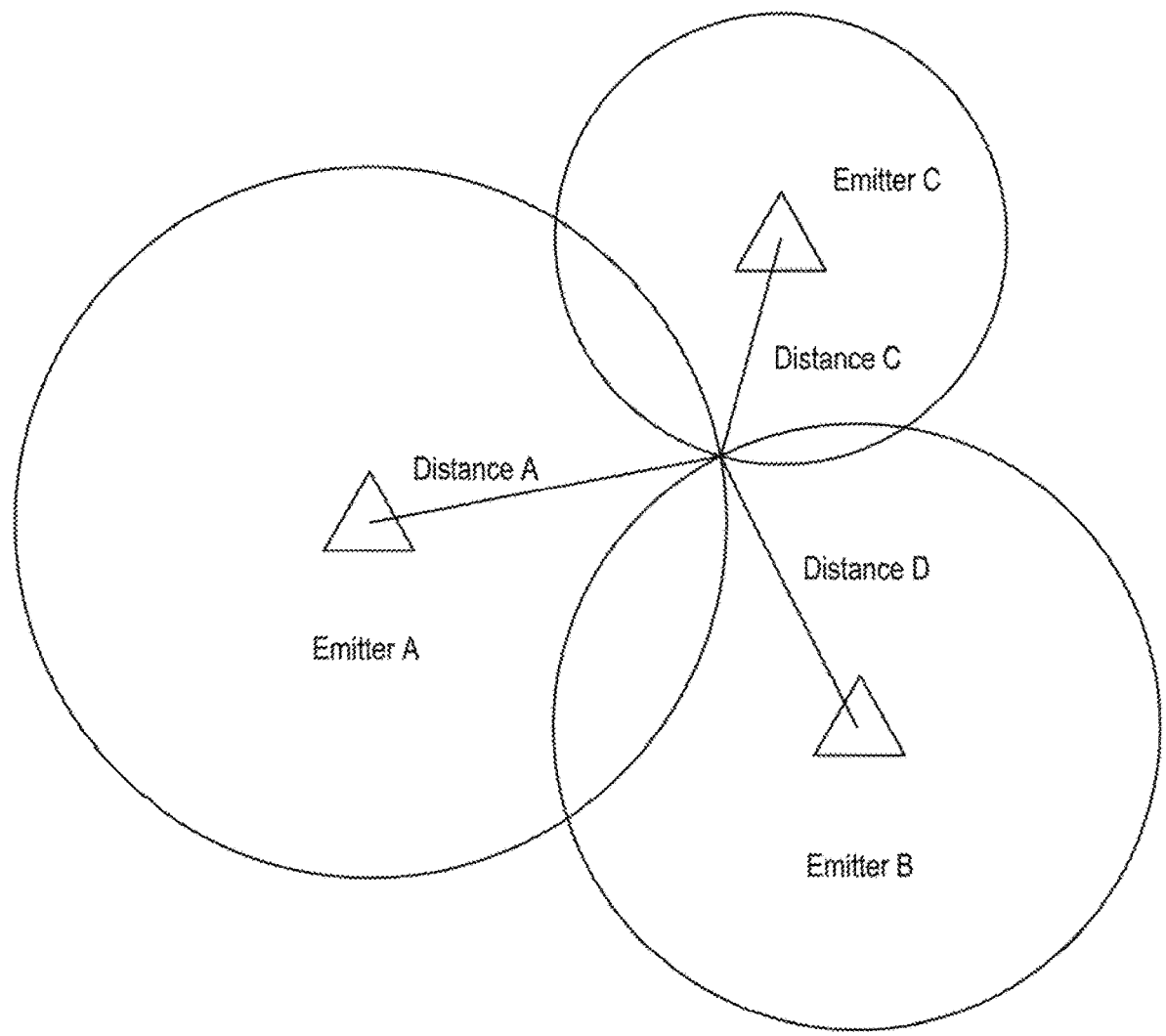
FIG. 13 illustrates an exemplary diagram of a distance-based position determination system for a UAV system according to an embodiment.
Figure 14:
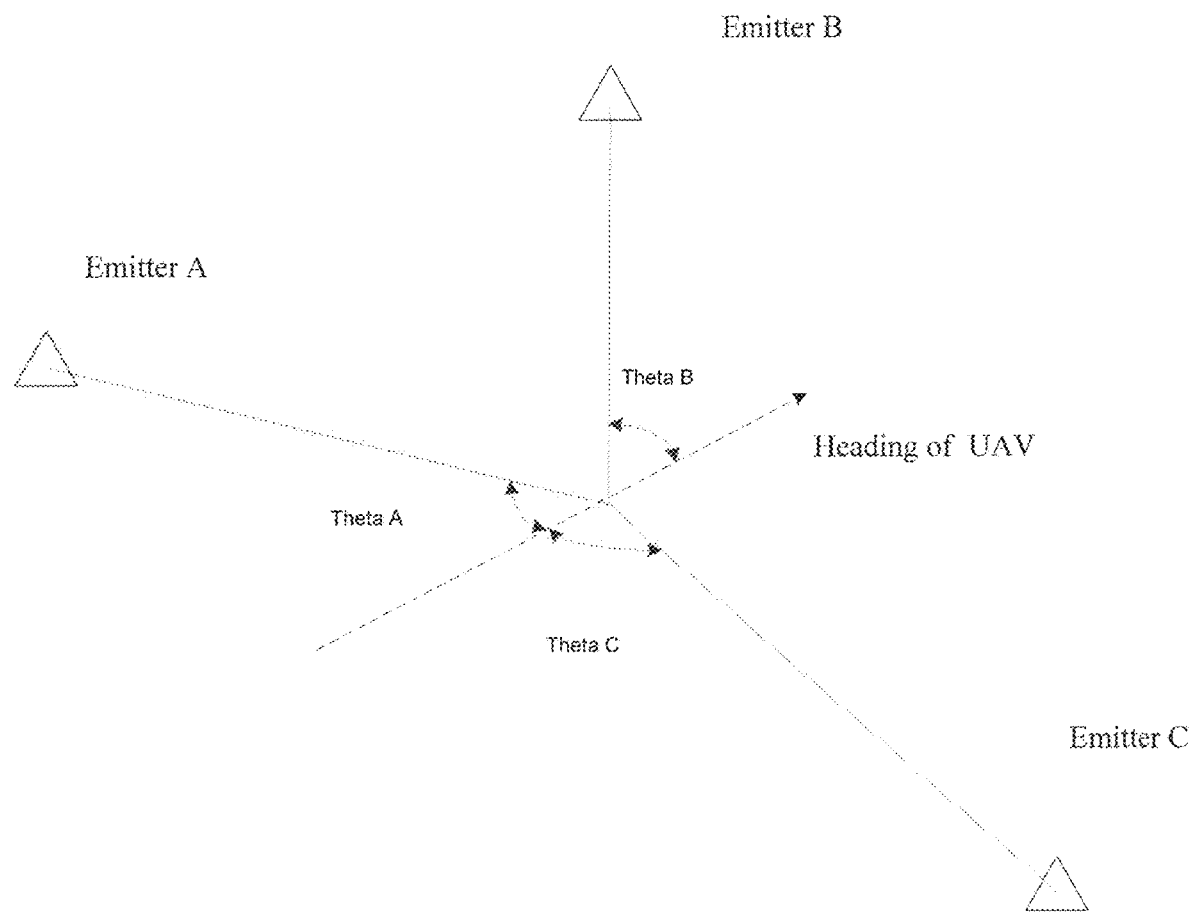
FIG. 14 illustrates an exemplary diagram of a angle-based position determination system for a UAV system according to an embodiment.

FIG. 13 illustrates an exemplary diagram of a distance-based position determination system for a UAV system according to an embodiment. FIG. 14 illustrates an exemplary diagram of a angle-based position determination system for a UAV system according to an embodiment.

Radio navigation has two fundamental forms: RHO which measures or estimates the distance to a known point, and THETA which measures the azimuth to a known point. GPS in a RHO RHO system is capable of measuring a three dimensional point anywhere on or near the surface of the earth. With a priori knowledge of the orbital characteristics, including errors, and a stable time source, an excellent estimate can be made of the distance to each of the satellites, which a navigation receiver on a UAV can see resulting in an accurate estimate of position, albeit in a somewhat esoteric coordinate system.

It is noted that the data from GPS satellites is very close to the natural ambient noise level, As such, it is subject to signal loss from powerful radio transmitters in the vicinity, including military operations, intentional jamming, and/or obstructions to the horizon In the case of GPS signal loss, it is desirable to have alternate positioning and/or navigation strategies for a UAV. These options may include eLoran, inertial guidance, dead reckoning, RF environment augmented dead reckoning, and/or some form of Terrain Referenced Navigation. There are advantages and disadvantages to each of these options, as follows:

eLoran is a proposed technology which would effectively provide an alternative to GPS navigation. However, it is expected that eLoran would be subject to the similar geometry issues which plagued the obsolete Loran-C which eLoran is projected to replace. This would need database support for the coordinate conversion of a Loran chain to Cartesian coordinate conversion as well as database support to switch to another chain, if the current Loran geometry does not permit a reasonable, or any solution, of the Loran coordinates.

Dead reckoning, using airspeed and heading information based on a priori knowledge of position speed, is an effective method of mitigating transient GPS outages. Navigation errors, however, rapidly increase to an unacceptable level.

Inertial guidance is a similar technology to dead reckoning. An issue with inertial guidance is that it is too large and too expensive with current technology.

Terrain Referenced Navigation is a non-radio navigation system which is more analogous to reading a road map and comparing it to the surrounding features. For example, a radar, scanning LIDAR, and/or passive optical scanner operating at a fixed angle may provide a scan which can then be correlated with a geographically encoded database, such as the US Department of Commerce TIGER database or open street map.

In any urban or suburban environment there are a plethora of stationary RF emitters, such as cell towers. Used in a RHO RHO navigation solution, RF environment augments dead reckoning would need the ability to properly identify each emitter, an extensive database of accurate survey data and frequency stability well beyond what is currently required by the regulatory authorities. However, a UAV equipped with a small array of antennas could navigate with a THETA THETA method. This requires a two-step method, where the first step is acquiring and cataloging the most powerful of local emitters, as well as providing angular data and eliminating those emitters which are located at small angles to the current location. Using a priori knowledge of the initial position, e.g., as a GPS position, and a reasonably large number of THETAs, a position can be derived which is limited only by the UAVs ability to measure the angle, THETA, of the emitter. If the UAV is to be operated in close proximity to the control station (e.g., a station of the communication UAV system where the UAV is communicating with), then the control station can compare its position to a THETA THETA solution and an equivalent THETA THETA solution at the UAV to determine a Cartesian position. Additional methods of resolving position using RF environment augments dead reckoning or other wireless positioning method is disclosed in Alan Bensky, *Wireless Positioning Technologies and Applications*, ed. Artech House, 2007, which is herein incorporate by reference.

In an embodiment, the UAV and/or the communication UAV system may also use a combination of the available positioning and/or navigation methods (including GPS if available) to determine a position and/or heading of the UAV. By combining the data from all the navigation and/or geolocation sensors and/or component on the UAV (together with known information from other sources such as the location of cellular towers for some positioning methods), a series of positioning and/or heading measurements can be made over time. These measurements/estimates may contain statistical noise and other inaccuracies, with some methods being less accurate than others. An aggregate of these measurements/estimates may tend to be more precise than those based on a single measurement alone with one positioning method.

In an embodiment, a process may be used to aggregate the positioning measurements/estimates. In the prediction step of the process, current position estimates are determined based on the current state variables (e.g., the current position as measured), along with their uncertainties. Once the outcome of the next measurement (which may necessarily be corrupted with some amount of error, including random noise) is observed, the position estimates may be updated using a weighted average, with more weight being given to estimates with higher certainty. For example, a measurement from a GPS receiver and/or by wireless geolocation may be given more weight than a measurement from a terrain referenced navigation method, perhaps due to the higher precision of the GPS and/or the wireless geolocation method if the UAV is operating in an open area where signals from GPS satellite and/or wireless towers would not be susceptible to multipath and/or other signal effects). However, if the UAV is operating in an area with various obstructing features (e.g., buildings, mountains), a terrain references navigation method may use the obstructing features to give a more precise measurement than GPS and/or wireless geolocation that may be affected by multipath and/or other signal effects (e.g., from the buildings). As such, in an embodiment the weight of a measurement or estimate may be adjusted depending on the location of the UAV. Further, in an embodiment, the weight of a measurement or estimate may also be adjusted over time (e.g., an initial measurement/estimate using a dead reckoning method is much more precise than subsequent measurement after the method have been used for some time). The process may be recursive and can run in real time, using only the present input measurements and the previously calculated state and its uncertainty matrix; no additional past information is required.

In an embodiment, a location of a UAV may be measured and/or estimated with certain precision by using known/measured positions of other UAVs in the area. For example, if the location of a UAV is known (e.g., through a GPS measurement on the UAV), and the UAV is able to communicate its location, the location of another UAV may be determined using the positioning methods as discussed above (e.g., a RHO THETA calculation). In an embodiment, when both UAVs are part of or able to connect with the communication UAV system, the position of one UAV may be used to determine the position of the other UAV based on known distances, angles, or other measurements of the UAVs within the communication UAV system.

In an embodiment, the position and/or the trajectory of an unknown UAV (e.g., a UAV that is not recognized, is not connected, and/or has lost contact to the communication UAV system) may be tracked when the unknown UAV is operating within the operating area of the communication UAV system and/or as it moves outside of the operating area. Using the positioning and navigating methods as discussed above, the position and/or the trajectory of an unknown UAV can be determined when within the operating area.

It may also be desirable to be able to track a UAV that has left the operational area (e.g., in the case of the unknown UAV or a UAV that has some failure such as losing operating link with the operator or a failure to flight control). In an embodiment, if a history of the previous positions and/or the trajectory (e.g. flight pattern) is known, at least within the operational area of the communication UAV system, a projection of the position and/or flight path of the UAV may be estimated based on the known history when as the UAV has left the operational area over time. In an embodiment, various projection techniques (e.g., based on known flight patterns) may be used for a more sophisticated projection (e.g., rather than a simple projection based on last known trajectory and position). For example, if the flight pattern of a UAV is consistent with a UAV with malfunctioning flight control (e.g., a flight pattern consistent with unpowered flight), then a projection can be made as to the UAV's potential crash position even if the crash position is outside of the operational area. In an embodiment, certain action may be taken (e.g., by the communication UAV system) such as notifying the appropriate entities (e.g., governmental entities or other authorities in the scenario of a projected UAV crash).

Flight Management

Flight management of a UAV may be performed by the flight management system (FMS) (e.g., flight management system 1210). In an embodiment, the flight management system receives various navigation data available on the UAV and utilizes the databases available for navigation, in addition to maintaining the flight plan and/or maintaining contingency flight plans, such as loss of control channel or important navigation data. Other functions may include avoiding or mitigating special use airspace, situational awareness of other vehicles and/or stationary collision objects, and maintaining control and telemetry channels. In an embodiment, the FMS system is capable of providing a holistic view of both the UAV and its potential mission profile.

In an embodiment, the functions of the FMS may be described in the following categories: Communications, Navigation, Situational Awareness, Flight Plan Management, and Mission Support, which are further disclosed below. It is noted that some of these functions may be offloaded into another UAV or station similar to the offloading of the communication functions using the communication UAVs.

In an embodiment, the communication function of the FMS system may also use other communication methods available to the exploited in the operational environment of the UAV. For example, methods of communications includes specialized utility air band network (e.g., Aircraft Communications Addressing and Reporting System (ACARS)), point to point and/or point to multipoint very-small-aperture terminal (VSAT) satellite services, satellite based communications utilities (e.g., Iridium and Marisat), direct connect cellular services, cellular network based Internet services, dedicated point-to-point radio (terrestrial, airborne, and/or a combination), and/or ad hoc networks (e.g., Wifi).

As such, the communications medium is essentially independent of the messaging requirements of the UAV. However, in order to permit any one or more of the possible communications systems outlined above and herein in this disclosure or other communication systems and/or have the UAVs participate in an ad hoc network, a common communications protocol may be preferred. The common communications protocol may be standardized to be recognized and used by all UAVs (e.g., in an operational area of a communication UAV system and/or other UAVs which may be outside of the operational area of the communication UAV system but need to access resources (e.g., UTSS or UAT server information) of the communication UAV system). In an embodiment, these messages may consist of a variation, and could consist of a subset and/or a superset, of the following:

Major Events

A major event function automatically detects and reports the start of each major flight phase of a UAV, such as ground roll takeoff, segment crossing etc. These events may be detected using input from the UAV's sensors and the flight management system. At the start of each major flight event phase, a message may be transmitted to a control entity (or other relevant systems) describing the flight phase, the time at which it occurred, and other related information such as UAV housekeeping data. These messages may be used to track the status of the UAV.

Flight Management System Interface

The communication subsystem may interface with flight management systems, acting as the communication system for flight plans, weather data, and Notice to Airmen (NOTAMS) to be sent from the sources (e.g., ATC and a communication UAV system) to the flight management system. This enables the UAV operator to update the flight management system while in flight.

Equipment Health and Maintenance Data

This may include information from the UAV to network stations about the conditions of various UAV systems and sensors in real-time. Maintenance faults and abnormal events may also be transmitted, along with detailed messages.

Ping Messages

Automated ping messages may be used to test a UAV's connection with the communications network (e.g., the mesh network of the communication UAV system). In the event that a communications link for a UAV has been silent for longer than a preset time interval, the communication UAV system can ping the UAV. A ping response indicates healthy UAV communication.

Manually Sent Messages

Manually sent messages are used to manually fly the UAV by providing inputs to the autopilot system, which may alter the heading, altitude, speed, and/or other flight control functions of the UAV. These messages also may tune the air band radio subsystem of the UAV used for coordinating flights in the current ATC and/or communication UAV system environment.

The situational awareness of a FMS may involve categories such as terrain avoidance, special use air space mitigation, and/or collision avoidance.

Terrain avoidance may be a function of navigation accuracy, a priori knowledge of the terrain, a priori knowledge of the airspace usage. Collision avoidance may be a function of a priori knowledge of other vehicles in the area.

Much of the special use airspace is of a static nature, because it is defined and remains the same for long periods of time. However, another type, the Temporary Flight Restriction (TFR), is very dynamic in nature. TFR may occurs at a restricted area around a large sporting event, a disaster area, forest fire, or the immediate area, and sometimes as much as 30 miles, around the location of a presidential visit.

The static special use air space as well as the areas encompassed by class B, C and D airspace is defined in NavData, which is published every 22 days by the FAA. This data may be reformatted in a manner more useful to UAVs, since a large part of the NavData is not useful for UAVs. This database may be stored on the UAV (for use by the FMS) as needed for a geographical area of interest.

The data defining TFRs is available in printed form as NOTAM, via ADS-B, and private satellite weather services broadcast over satellite radio, such as XM radio. This data may be up linked to the UAV for the FMS through systems like ADS-B or via the control channel or via any other currently available means. The data may then be reformatted in a manner compatible with the static special use airspace format. Data/database may also be updateable using communication network (e.g., communication network service provided by the communication UAV system as discussed above and herein in this disclosure).

The systems, devices, and methods herein may provide automated response of a UAV to a detected proximity to a flight-restricted region. Different actions may be taken which could include holding until an operator updates the flight plan or takes manual control or landing. The systems, devices, and methods herein may also use various systems for determining the location of the UAV to provide greater assurance that the UAV will not inadvertently fly into a flight-restricted region. In some instances, if the UAV is within a particular distance from the flight-restricted region, the UAV may be restricted from taking off.

In an embodiment, a methodology disclosed herein would have the UAV equipped with an air band remote controlled audio transceiver, which could be used to provide voice communication between the UAV pilot air traffic control (ATC) which could provide additional situational awareness, as well as coordinating transit into or through many types of special use air space.

ADS-B is a preferred base technology for collision avoidance, since many of the potential collision targets are other UAVs, which tend to be small and stealthy. Collision avoidance with a non-ADS-B equipped aerial vehicle is significantly more challenging. Interestingly, there are some characteristics of other aerial vehicles. The classic example is that two aerial vehicles with an identical velocity at 90 degrees to one another at a given altitude is a physical impossibility. However, as the angle decreases, the probability of a collision steadily increases.

There is an interesting characteristic of high probability collision targets in three dimensional space, they appear in a constant location in the field of view of the aerial vehicles. Obviously, the distance is changing, but the geometric relationship is constant. This applies equally to fixed objects and other aerial vehicles.

A number of technologies are available to capitalize on this characteristic such as radar, scanning LIDAR and passive optical. The technology could be used to "piggy back" on a navigation such as terrain reference navigation, with a field of view, for example, of 30 degrees left and right of centerline and 7 degrees up and down field of view.

In an embodiment, the FMS may determine the location of restricted and/or special use airspace in the vicinity of the UAV and provide alarms to the unmanned vehicle operator if special use or restricted airspace will potentially be violated. For some types of airspace, such as Class C airspace around airports, the mitigation solution might be to increase altitude. For Class B airspace, the solution might be to decrease altitude.

In an embodiment, UAVs may use optical communication between/among two or more UAVs for collision avoidance. An unmanned aerial vehicle with either an active optical system, such as LIDAR, or passive optical system which "looks" for targets that maintain a constant azimuth and elevation relative to the unmanned vehicle. Targets which exhibit this behavior relative to the UAV have an extremely high probability of colliding with the UAV.

In an embodiment, UAVs have the capability of networking with one another to form an ad hoc swarm. These swarms may prevent collisions, providing the UAV with more intelligent coordination between UAV than is possible with the simplistic FAA strategies outlined in FAR 91.113 or current generation TCAS systems. For example, the UAVs may form an ad hoc network via an RF link such as Wi-Fi or on some prearranged arbitrary radio frequency and implements a swarming protocol for the purpose of collision avoidance.

UAV Corridors

In an embodiment, UAV corridors (their various characteristics, functions, and applications as disclosed above and herein in this disclosure) may be defined by infrastructures and/or systems that maintain the corridors for active UAV operation. For example, while some UAV corridors may be primarily defined by property and/or airspace rights and/or governmental approval/restrictions (e.g., defining the UAV corridors as a 3-dimensional space for legal UAV use), infrastructures and/or systems for assisting with active UAV flight of the corridor define the corridor in practice. In another example, for the communication UAV system as discussed above and herein in this disclosure, an active maintenance of communications UAVs and/or stations within the UAV corridor provides the network needed for the operation of UAVs without the proper long range communication equipment within the corridor.

In an embodiment, control of an actively maintained UAV corridor may be automated in one or more centralized locations (e.g., at a hub) or distributed (e.g., at each component of the systems than maintain the corridors such as at each communication UAV/station of the communication UAV system).

Various functions may be performed at the control of the UAV corridor, such as maintaining the infrastructure and systems that maintain the corridor. For example, communication UAVs that provide various communication functions to UAVs operating in the corridor will need to be maintained, including docking to recharge or exchange the power source to keep the communication UAVs powered for airborne. The status of the communication UAVs would also need to be maintained. For example, if a communication UAV malfunctions, it may cause a break in the communication network within the corridor. As such, a replacement communication UAV will need to be moved to take the place of the malfunctioned communication UAV within the mesh network. In another example, the density of the communication UAVs at certain areas in the corridor may need to be managed (e.g., more communications UAVs may be needed in certain area at a time to provide higher bandwidth, such as in a scenario where there would be more UAVs operating in an area or when UAVs in an area is using more bandwidth, e.g., when UAVs may be performing real time videography in an area due to a newsworthy or other unexpected event).

Another function that may be performed at the control of the UAV corridor is to provide flight planning (e.g., changing the flight plan), navigation (e.g., taking direct control of the UAV for emergency or normal flight control situations), or other FMS services to UAVs with limited FMS capabilities or UAVs that have less available data for flight in the area of the particular UAV corridor.

Another function that may be performed at the control of the UAV corridor is to control the flow of UAV traffic within the corridor. In an embodiment, the UAV corridor control may enforce a range separation between UAVs (e.g., through one or more of communication with the UAV operators to control for congestions within the corridor. For example, some UAVs may have limited flight control capabilities (e.g., ability to quickly change speed and/or flight path). As such, the control may enforce a range separation to allow the UAVs to operate within a reasonable parameter (e.g., constant speed and/or pre-determined flight path) without the need for drastic changes in flight (e.g., sudden stops). In another embodiment, the UAV corridor control may enforce and entry/exit control of UAVs coming from another operational area (e.g., another UAV corridor) to manage flow, congestion, or other issues in the UAV corridor. In a further embodiment, the control may work with controls of other UAV corridors (e.g., neighboring UAV corridors and/or other UAV corridors that is anticipated to affect the UAV corridor). For example, the control may enforce a flow and/or range separation of the UAVs within the corridor in conjunction with or in anticipation of a similar flow control in a neighboring corridor where UAVs within the corridor may enter, in order to promote a constant traffic flow between corridors. In a situation where a neighboring corridor may restrict entry, landing pads or other corridor infrastructures may be prepared to accommodate UAVs that need to wait in the corridor prior to being allowed to enter the neighboring corridor.

Another function that may be performed at the control of the UAV corridor is to broadcast and/or communicate temporary or recent changes to the flight conditions of the corridor and/or changing flights plans and/or taking control of UAVs in the corridor as needed due to the changes to the flight conditions. For example, a recent change closing off an area of airspace within the corridor may be first known or informed to the control of the UAV corridor. Also, the control of the UAV corridor may have the best information as to how to respond to such a change (e.g., sufficiently complete information of the UAVs in operation within the corridor). As such, the control of the UAV corridor may be best suited to formulate an alternate plan of UAVs operation within the corridor that causes the least disruption.

Since the UAV corridors may require active maintenance with infrastructures and systems the corridor may implement a system for collecting revenue or toll from UAV owners and/or operators. In an embodiment, information related to the UAV owners and/or operators may be obtained (e.g., through communications with the communication UAVs and/or stations of the corridor) and usage data of the UAV in the corridor may be tracked. The UAV owners and/or operators may be billed for the usage.

With regards to the FAA's small UAV rules, there are special cases wherein the FAA Part 107 rules would not be applicable. Special waivers are required in at least some of these cases. A UAV operator that could not fly purely under the Part 107 operating rules would need obtain authorization via a waiver, Public Certificate of Waiver or Authorization (COA), a special Section 333 Exemption, or a Special Airworthiness Certification (SAC)/COA combination. Some of these cases are outlined as follows:

Beyond Visual Line of Sight
        Power line inspections
        Search and rescue (SAR)
    Night Operations
        SAR at night
        Firefighting at night
        Inspections using thermal equipment in hot environments and night is the best time to use the equipment
        Cinematography for TV/movie night scenes
        Inspections on critical time/sensitive material that require 24/7 monitoring (example: turbidity monitoring for dredging operations)
        Sports at night
    55 Pounds and Heavier
        Package delivery
        Crop dusting
        Firefighting retardant delivery
        High-end LIDAR to monitor crops such as lumber. The LIDAR is used to detect the diameter of the wood so the loggers know which forest to harvest first
        Cinematography (Dual Red Epics for 3-D filming or full Arri Alexa with lens and large stack of batteries for extra flight time)
    Higher than 400 ft and 400 ft away from the object
    100 MPH and Faster
        Survey large areas fast
        Fast package/medical delivery
    Operation Over Persons
        Concerts
        Live news events
        Sports
    Operations from a Moving Vehicle in non-sparsely populated areas As such, a well-defined UAV corridor may assist UAV operators in dealing with the myriad of federal and state regulations, city policies, land owner interests, security concerns, and weather and wind (including wind shearing conditions), that will vary substantially around the country. Acceptable UAV flight plans and flight corridors will vary by the hour, given the huge number of unique situations that can occur.

It is anticipated the FAA waiver may provide opportunities that, upon showing working devices and configurations that satisfies the FAA's concern for safety, airspace usage, and other concerns (e.g., when the systems and methods such as the UAV corridor system as disclosed above and herein this disclosure), that the FAA will grant waivers that allows UAV operators to (1) operate and be responsible for, multiple UAVs (the current rules only allows each operator to operate 1 UAV) and (2) operate UAVs beyond a line-of-sight restriction (e.g., by using the UAV corridor and/or the communication UAV system as disclosed above and herein this disclosure to enable and enhance the reliability and bandwidth of communication for such beyond a line-of-sight operation).

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

As the foregoing discussion has been presented for purposes of illustration and description, the foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The headings, titles, or other descriptions of sections contained in this disclosure have been inserted for readability and convenience of the reader and are mainly for reference only and are not intended to limit the scopes of embodiments of the invention.

What is claimed is:

1. An unmanned aerial vehicle system for providing communication service to a plurality of unmanned aerial vehicles (UAVs) operating within a predetermined operational area of an airspace for the unmanned aerial vehicle system, comprising:
   a communication unmanned aerial vehicle (UAV), the communication UAV including (A) through (C) following:
      (A) a first communication component for communicating with the plurality of UAVs;
      (B) a second communication component for communicating with a communication point, the communication point being one of (a) a terrestrial communication station, (b) a communication satellite, and (c) another of the communication UAVs; and
      (C) a third communication component for communicating with another communication point including at least a wireless receiver,
      wherein the communication UAV is active for providing the communication service within the predetermined operational area of the unmanned aerial vehicle system; and
   a processor for performing a channel bonding operation of (i) communication with the communication point through the second communication component, and (ii) communication with the another communication point through the third communication component;
   wherein the communication UAV provides the plurality of UAVs with communication with the communication point and the another communication point.

2. The unmanned aerial vehicle system of claim 1, wherein communication with the plurality of UAVs through the first communication component uses an unallocated spectrum.

3. The unmanned aerial vehicle system of claim 1, wherein the communication through the second communication component and the communication through the third communication component each uses a different one of an allocated spectrum.

4. The unmanned aerial vehicle system of claim 1, wherein the communication through the second communication component and the communication through the third communication component each uses a same one of an allocated spectrum.

5. The unmanned aerial vehicle system of claim 1, wherein one or more of the first, second, and third communication components perform their corresponding communicating within the predetermined operational area.

6. An unmanned aerial vehicle system for providing an aerial traffic service to a plurality of unmanned aerial vehicles (UAVs) operating within a predetermined operational area of an airspace for the unmanned aerial vehicle system, comprising:
   a communication station, the communication station including (i) a communication component for communicating with the plurality of UAVs, and (ii) a second communication component for communicating with another system providing the aerial traffic service, wherein the communication station is active for providing the aerial traffic service within the predetermined operational area;
   wherein information related to communications for the aerial traffic service through the second communication component is provided by the communication station to the plurality of UAVs through the communication component.

7. The unmanned aerial vehicle system of claim 6, wherein the communication station is a communication unmanned aerial vehicle (UAV).

8. The unmanned aerial vehicle system of claim 6, wherein the aerial traffic service includes one of an air traffic control (ATC) system, aircraft communications addressing and reporting system (ACARS), traffic collision avoidance system (TCAS), and automatic dependent surveillance—broadcast (ADS-B) system.

9. The unmanned aerial vehicle system of claim 6, wherein the communication station further comprises a processor for determining an applicability of a communication from the system providing the aerial traffic service to at least one of the plurality of the UAVs; and
   wherein, responsive to a determination of the applicability, information related to the communication is sent to an operator of the at least one UAV.

10. The unmanned aerial vehicle system of claim 6, wherein the communication station further comprises a processor for determining an applicability of at least one of the plurality of the UAVs to the system providing the aerial traffic service for a direct communication between an operator of the at least one UAV and the system providing the aerial traffic service; and
    wherein information for establishing the direct communication is transmitted to the system providing the aerial traffic service.

11. The unmanned aerial vehicle system of claim 10, wherein the information includes information for establishing a voice communication over a packet network.

12. The unmanned aerial vehicle system of claim 6, wherein the communication station further comprises a processor for aggregating communications related to the aerial traffic service from the plurality of UAVs; and
    wherein the aggregated communications is transmitted through the second communication component.

13. An unmanned aerial vehicle system for tracking a plurality of unmanned aerial vehicles (UAVs) operating within a predetermined operational area of an airspace for the unmanned aerial vehicle system, comprising:
    a plurality of communication stations, each of the communication stations including a first communication component for communicating with at least one of the plurality of UAVs, wherein the communication station is active within the operational area for the tracking, wherein the plurality of communication stations are arranged spatially for providing a communication coverage, through their respective first communication component, within the predetermined operational area for the plurality of UAVs; and a station including a processor for estimating a path of one of the plurality of UAVs operating in the operational area using one or more previous location estimates of the one UAV, the previous location estimates based on one or more of (a) signal characteristics of communication with the at least one UAV and one or more the communication stations, (b) a location estimate from a geolocation component of the at least one UAV, (c) a location estimate provided by an aerial traffic service, and (d) a location estimate based on tracking data of the plurality of UAVs from the unmanned aerial vehicle system.

14. The unmanned aerial vehicle system of claim 13, wherein the one UAV is not communicating with the plurality of communication stations.

15. The unmanned aerial vehicle system of claim 13, wherein the one UAV has exited the predetermined operational area.

16. The unmanned aerial vehicle system of claim 13, wherein the estimating the path by the processor includes comparing a previous path of the one UAV with a plurality of flight patterns of UAVs.

17. The unmanned aerial vehicle system of claim 13, wherein the one UAV is the at least one UAV.

\* \* \* \* \*